(12) United States Patent
Ishimoto

(10) Patent No.: US 7,733,747 B2
(45) Date of Patent: Jun. 8, 2010

(54) INFORMATION RECORDING OR REPRODUCING DEVICE AND RECORDING OR REPRODUCING METHOD

(75) Inventor: Tsutomu Ishimoto, Saitama (JP)

(73) Assignee: Sony Corporation, Tokyo (JP)

( * ) Notice: Subject to any disclaimer, the term of this patent is extended or adjusted under 35 U.S.C. 154(b) by 1364 days.

(21) Appl. No.: 10/542,082

(22) PCT Filed: Jan. 16, 2004

(86) PCT No.: PCT/JP2004/000303

§ 371 (c)(1),
(2), (4) Date: Jul. 13, 2005

(87) PCT Pub. No.: WO2004/066290

PCT Pub. Date: Aug. 5, 2004

(65) Prior Publication Data

US 2006/0187773 A1    Aug. 24, 2006

(30) Foreign Application Priority Data

Jan. 17, 2003    (JP)    ............... 2003-010313

(51) Int. Cl.
*G11B 7/00*    (2006.01)
(52) U.S. Cl. .............. 369/44.27; 369/44.25; 369/44.35; 369/124.01
(58) Field of Classification Search ........................ None
See application file for complete search history.

(56) References Cited

U.S. PATENT DOCUMENTS

2002/0196719 A1 * 12/2002 Morishima ............... 369/47.53
2006/0187773 A1 * 8/2006 Ishimoto .................. 369/44.25

FOREIGN PATENT DOCUMENTS

| JP | 64-46240 | 2/1989 |
|---|---|---|
| JP | 1-184638 | 7/1989 |
| JP | 1-237936 | 9/1989 |
| JP | 10-149614 | 6/1998 |
| JP | 2000-90472 | 3/2000 |
| JP | 2000-339712 | 12/2000 |
| JP | 2001-76358 | 3/2001 |
| JP | 2001-319358 | 11/2001 |
| JP | 2002-92906 | 3/2002 |
| JP | 2002-319160 | 10/2002 |

* cited by examiner

*Primary Examiner*—Muhammad N. Edun
(74) *Attorney, Agent, or Firm*—Oblon, Spivak, McClelland, Maier & Neustadt, L.L.P.

(57) ABSTRACT

An information recording and/or reproducing apparatus using a removable disk-shaped optical recording medium (51) is provided which includes a storage unit (31) to store an axial-runout amount in a predetermined radial position on the disk-shaped optical recording medium (51) being rotated, a near-field light projector (7) provided to condense a light beam emitted from a light source (3) and which projects the condensed light beam as near-field light when located in a field near the information recording surface of the disk-shaped optical recording medium (51), a first controller (30) which multiplies an axial-runout amount read from the storage unit (31) by a predetermined gain to generate a control signal and controls the near-field light projector (7) to follow the axial-runout amount of the disk-shaped optical recording medium (51), and a second controller (40) to control the near-field light projector (7) on the basis of the linear characteristic of the return-light amount of the near-field light to keep a predetermined distance in the near field from the information recording surface.

7 Claims, 50 Drawing Sheets

INFORMATION RECORDING OR REPRODUCING DEVICE AND RECORDING OR REPRODUCING METHOD

TECHNICAL FIELD

The present invention relates to an information recording apparatus and information recording controlling method, for writing information with evanescent light, and an information reproducing apparatus and information reproduction controlling method, for reproducing information with evanescent light.

This application claims the priority of the Japanese Patent Application No. 2003-10313 filed on Jan. 17, 2003, the entirety of which is incorporated by reference herein.

BACKGROUND ART

Of the conventional recording media, a removable optical disk for use with a disk recording and/or playback apparatus is rotatable on and with a turntable included in a disk rotation driving mechanism when it is set in the apparatus and clamped to the turntable. Being rotated, the optical disk clamped at the center thereof to the turntable will easily incur a so-called axial runout. Namely, the optical disk will be oscillated vertically about its clamped center while being rotated.

The axial runout, if any, of the optical disk set in the disk recording and/or playback apparatus and being rotated by the disk rotation driving mechanism is likely to cause primarily a focusing error when recording or reproducing information.

Therefore, the clamping to the turntable in the recording and/or playback apparatus should desirably be done with the removable optical disk being mounted horizontally on the turntable without being tilted. However, it is difficult to mount and clamp the optical disk precisely horizontally on the turntable.

On this account, in the recording and/or playback apparatus using a removable optical disk as a recording medium, a focusing servo mechanism is provided in the recording and/or playback apparatus to address an axial runout which will possibly arise to some extent while the optical disk is being rotated by the disk rotation driving mechanism. For example, a DVD (digital versatile disk) recording and/or playback apparatus includes a focusing servo mechanism designed to prevent any focusing error from occurring even when an axial runout of about ±300 μm takes place in relation to the plane of rotation.

Recently, it has been proposed to use evanescent light in an apparatus that records or reads predetermined information by projecting a light beam to an optical recording medium such as an optical disk, in order to enable a high-density recording or reproduction beyond the diffraction-limited.

For writing or reading information to or from an optical recording medium with evanescent light, there has been proposed to use an SIL (solid immersion lens) for producing the evanescent light.

For writing or reading information to or from an optical recording medium with the use of evanescent light, the optical system to collect or condense light beam for projection onto the optical recording medium should use a two-group lens composed of an SIL and aspheric lens and having a numerical aperture (NA) of more than one (1) and have a light-emitting surface provided a distance which is smaller than a half of the wavelength of the light beam incident upon the SIL apart from the information recording surface of the optical recording medium. For example, when the wavelength $\lambda$ of the light beam is 400 nm, the distance is less than 200 nm.

For quality recording or reproduction of information, the distance between the light-emitting surface of the light-condensing optical system and the information recording surface of the optical recording medium should be kept constant. On this account, there has been proposed a technique of controlling the position of the light-condensing optical system in relation to the light recording medium by controlling the actuator of the optical head according to a variation of return-light amount from the optical recording medium as an error signal, as disclosed in the Japanese Patent Application Laid Open No. 2001-76358.

As mentioned above, to enable quality recording and reproduction with the evanescent light, it is necessary to have the optical head follow the information recording surface of the optical recording medium while controlling the position of the light-emitting surface of the light-condensing optical system and that of the information recording surface of the recording medium at extremely short intervals of the order of nano-meters.

It is difficult to rotate a removable optical recording medium being mounted precisely horizontally on the disk rotation driving mechanism of a disk recording and/or playback apparatus and prevent an axial runout of the recording medium being rotated. Specifically, it is extremely difficult to limit the axial runout relative to the plane of rotation of the recording medium to less than ±300 μm. Thus, in a recording and/or playback apparatus using evanescent light of 400 nm in wavelength, it is extremely difficult to limit the gap between the light-emitting surface of the light-condensing optical system and the information recording surface of the optical recording medium to less than 200 nm for writing or reading information to or from the optical recording medium.

On the assumption that in a recording and/or playback apparatus using evanescent light of 400 nm in wavelength, the gap between the light-emitting surface of the light-condensing optical system and the information recording surface of the optical recording medium is 100 nm and a gap error of ±1% is allowable, it is necessary to control gap error to less than ±1 nm. In such an apparatus, if an axial runout of about 300 μm which is allowable in DVDs etc. takes place, focusing servo control needs a DC gain of more than 100 dB. Designing a stable control system while maintaining a DC gain of more than 100 dB is extremely difficult.

In a recording and/or playback apparatus in which an optical recording medium is removably set in a rotation drive, it is very difficult to limit the axial runout of the optical recording medium being rotated to less than ±10 μm for example in advance.

Making the allowable gap error higher than the current requirement is also possible but it will degrade read RF signal or the like and will thus lead to impossibility of quality recording or reproduction of information.

Also, the recording and/or playback apparatus to write or read information to or from an optical recording medium using the aforementioned evanescent light will not be able to use any recording medium having widely been prevailing as a large information source, such as CD (compact disk), DVD (digital versatile disk) or the like.

The recording and/or playback apparatus to write or read information by evanescent light and recording and/or playback apparatus to write or read information by condensing laser light from a laser source and projecting it onto the information recording surface of a disk such as CD, DVD or the like are different from each other in configuration of the optical system and optical head thereof. Therefore, to implement interchangeability between the optical recording medium for recording and/reading information by evanescent light and the CD and DVD, it is necessary to design a recording and/or playback apparatus including optical systems for the evanescent light-type recording medium and the CD and DVD, respectively, can selectively be used for each of such media. However, there remain problems such as addressing the incorrect selection of the optical system for an optical recording medium to be used, larger size of the apparatus, increased costs due to the larger size, etc.

DISCLOSURE OF THE INVENTION

Accordingly, the present invention has an object to overcome the above-mentioned drawbacks of the related art by providing an improved and novel information recording or reproducing apparatus and a recording or reproduction controlling method.

The present invention has another object to provide an information recording or reproducing apparatus and a recording or reproduction controlling method, in which a removable recording medium is used and information can be recorded or read with a high performance by preventing any axial runout of the recording medium being rotated.

The present invention has still another object to provide an information recording or reproducing apparatus and a recording or reproduction controlling method, in which a simple mechanism is used to implement near-field recording or reproduction of information and far-field recording or reproduction of information.

The above object can be attained by providing an information recording apparatus including according to the present invention:

a mounting means on which a removable disk-shaped optical recording medium is set in place;

a rotation driving means for rotating the disk-shaped optical recording medium set on the mounting means at a predetermined velocity;

a pulse signal generating means for generating N (N is a natural number) pulse signals in a predetermined cycle while the disk-shaped optical recording medium is being rotated one full turn by the rotation driving means;

a counting means for counting the N pulse signals generated by the pulse generating means;

a storage means for storing an axial-runout amount detected in a predetermined radial position on the disk-shaped optical recording medium in timing of generation of the pulse signals by the pulse signal generating means in correspondence with the count value in the counting means;

a light source to emit a light beam of a predetermined wavelength modulated with information to be written to the information recording surface of the disk-shaped optical recording medium;

a near-field light projecting means for condensing a light beam emitted from the light source and projecting the condensed light beam as near-field light to the information recording surface when it is located in a field near the information recording surface of the disk-shaped optical recording medium;

a radial-position information detecting means for detecting radial-position information indicative of a radial position on the information recording surface of the disk-shaped optical recording medium being irradiated with the light beam from the near-field light projecting means;

a gain generating means for generating a predetermined gain corresponding to radial-position information detected by the radial-position information detecting means;

an axial-runout amount reading means for reading an axial-runout amount stored in the storage means correspondingly to the count of pulse signals counted by the counting means;

a first controlling means for generating a control signal by multiplying the axial-runout amount read by the axial-runout amount reading means by the predetermined gain generated by the gain generating means to control the near-field light projecting means to follow the axial-runout amount;

a return-light amount detecting means for detecting a return-light amount of the near-field light projected to the information recording surface; and a second controlling means for controlling the near-field light projecting means on the basis of the linear characteristic of the return light amount of the near-field light detected by the return-light amount detecting means to keep a predetermined distance within the near field from the information recording surface.

Also the above object can be attained by providing an information recording apparatus including according to the present invention:

a mounting means on which a removable disk-shaped optical recording medium is set in place;

a rotation driving means for rotating the disk-shaped optical recording medium set on the mounting means at a predetermined velocity;

a pulse signal generating means for generating (N is a natural number) pulse signals in a predetermined cycle while the disk-shaped optical recording medium is being rotated one full turn by the rotation driving means;

a counting means for counting the N pulse signals generated by the pulse generating means;

a storage means for storing an axial-runout amount detected in timing of generation of the pulse signals by the pulse signal generating means in correspondence with the count value in the counting means and radial-position information;

a light source to emit a light beam of a predetermined wavelength modulated with information to be written to the information recording surface of the disk-shaped optical recording medium;

a near-field light projecting means for condensing a light beam emitted from the light source and projecting the condensed light beam as near-field light to the information recording surface when it is located in a field near the information recording surface of the disk-shaped optical recording medium;

a radial-position information detecting means for detecting radial-position information indicative of a radial position on the information recording surface of the disk-shaped optical recording medium being irradiated with the light beam from the near-field light projecting means;

an axial-runout amount reading means for reading an axial-runout amount stored in the storage means correspondingly to the count of pulse signals counted by the counting means and radial-position information detected by the radial-position information detecting means;

a first controlling means for controlling the near-field light projecting means on the basis of the axial-runout amount read by the axial-runout amount reading means to follow the axial-runout amount;

a return-light amount detecting means for detecting a return-light amount of the near-field light projected to the information recording surface; and a second controlling means for controlling the near-field light projecting means on the basis of the linear characteristic of the return light amount of the near-field light detected by the return-light amount detecting means to keep a predetermined distance within the near field from the information recording surface.

Also the above object can be attained by providing an information recording apparatus including according to the present invention:

a mounting means on which a removable disk-shaped optical recording medium is set in place;

a light source to emit a light beam of a predetermined wavelength modulated with information to be written to the information recording surface of the disk-shaped optical recording medium;

an optical means for condensing the light beam emitted from the light source and projecting it to the information recording surface of the disk-shaped optical recording medium;

an axial-runout detecting means for detecting an axial-runout amount of the disk-shaped optical recording medium from the return light of the light beam projected by the optical means;

a near-field light projecting means for condensing a light beam emitted from the light source and projecting the condensed light beam as near-field light to the information recording surface when it is located in a field near the information recording surface of the disk-shaped optical recording medium;

a return-light amount detecting means for detecting a return-light amount of the near-field light projected to the information recording surface;

a first controlling means for controlling, when the axial-runout amount detected by the axial-runout amount detecting means is larger than a first threshold, the near-field light projecting means to follow the axial-runout amount; and a second controlling means for controlling, when the axial-runout amount detected by the axial-runout amount detecting means is smaller than the first threshold, the near-field light projecting means on the basis of the linear characteristic of the return light amount of the near-field light detected by the return-light amount detecting means to keep a predetermined distance within the near field from the information recording surface.

Also the above object can be attained by providing an information reproducing apparatus including according to the present invention:

a mounting means on which a removable disk-shaped optical recording medium is set in place;

a rotation driving means for rotating the disk-shaped optical recording medium set on the mounting means at a predetermined velocity;

a pulse signal generating means for generating N (N is a natural number) pulse signals in a predetermined cycle while the disk-shaped optical recording medium is being rotated one full turn by the rotation driving means;

a counting means for counting the N pulse signals generated by the pulse generating means;

a storage means for storing an axial-runout amount detected in a predetermined radial position on the disk-shaped optical recording medium in timing of generation of the pulse signals by the pulse signal generating means in correspondence with the count value in the counting means and radial-position information;

a light source to emit a light beam of a predetermined wavelength to read predetermined information recorded on the information recording surface of the disk-shaped optical recording medium;

a near-field light projecting means for condensing a light beam emitted from the light source and projecting the condensed light beam as near-field light to the information recording surface when it is located in a field near the information recording surface of the disk-shaped optical recording medium;

a radial-position information detecting means for detecting radial-position information indicative of a radial position on the information recording surface of the disk-shaped optical recording medium being irradiated with the light beam from the near-field light projecting means;

an axial-runout amount reading means for reading an axial-runout amount stored in the storage means correspondingly to the count of pulse signals counted by the counting means and radial-position information detected by the radial-position information detecting means;

a first controlling means for controlling the near-field light projecting means on the basis of the axial-runout amount read by the axial-runout amount reading means to follow the axial-runout amount;

a return-light amount detecting means for detecting a return-light amount of the near-field light projected to the information recording surface; and a second controlling means for controlling the near-field light projecting means on the basis of the linear characteristic of the return light amount of the near-field light detected by the return-light amount detecting means to keep a predetermined distance within the near field from the information recording surface.

Also the above object can be attained by providing an information reproducing apparatus including according to the present invention:

a mounting means on which a removable disk-shaped optical recording medium is set in place;

a rotation driving means for rotating the disk-shaped optical recording medium set on the mounting means at a predetermined velocity;

a pulse signal generating means for generating N (N is a natural number) pulse signals in a predetermined cycle while the disk-shaped optical recording medium is being rotated one full turn by the rotation driving means;

a counting means for counting the N pulse signals generated by the pulse generating means;

a storage means for storing an axial-runout amount in a predetermined radial position on the disk-shaped optical recording medium, detected in timing of generation of the pulse signals by the pulse signal generating means, in correspondence with the count value in the counting means;

a light source to emit a light beam of a predetermined wavelength to read predetermined information recorded in the disk-shaped optical recording medium;

a near-field light projecting means for condensing a light beam emitted from the light source and projecting the condensed light beam as near-field light to the information recording surface when it is located in a field near the information recording surface of the disk-shaped optical recording medium;

a radial-position information detecting means for detecting radial-position information indicative of a radial position on the information recording surface of the disk-shaped optical recording medium being irradiated with the light beam from the near-field light projecting means;

a gain generating means for generating a predetermined gain corresponding to the radial-position information detected by the radial-position information detecting means;

an axial-runout amount reading means for reading an axial-runout amount stored in the storage means correspondingly to the count of pulse signals counted by the counting means;

a first controlling means for generating a control signal by multiplying the axial-runout amount read by the axial-runout amount reading means by the predetermined gain generated by the gain generating means to control the near-field light projecting means to follow the axial-runout amount;

a return-light amount detecting means for detecting a return-light amount of the near-field light projected to the information recording surface; and a second controlling means for controlling the near-field light projecting means on the basis of the linear characteristic of the return light amount of the near-field light detected by the return-light amount detecting means to keep a predetermined distance within the near field from the information recording surface.

Also the above object can be attained by providing an information reproducing apparatus including according to the present invention:

a mounting means on which a removable disk-shaped optical recording medium is set in place;

a light source to emit a light beam of a predetermined wavelength to read predetermined information recorded on the information recording surface of the disk-shaped optical recording medium;

an optical means for condensing the light beam emitted from the light source and projecting it to the information recording surface of the disk-shaped optical recording medium;

an axial-runout detecting means for detecting an axial-runout amount of the disk-shaped optical recording medium from the return light of the light beam projected by the optical means;

a near-field light projecting means for condensing a light beam emitted from the light source and projecting the condensed light beam as near-field light to the information recording surface when it is located in a field near the information recording surface of the disk-shaped optical recording medium;

a return-light amount detecting means for detecting a return-light amount of the near-field light projected to the information recording surface;

a first controlling means for controlling, when the axial-runout amount detected by the axial-runout amount detecting means is larger than a first threshold, a driving means on the basis of the axial-runout amount; and a second controlling means for controlling, when the axial-runout amount detected by the axial-runout amount detecting means is smaller than the first threshold, the near-field light projecting means on the basis of the linear characteristic of the return light amount of the near-field light detected by the return-light amount detecting means to keep a predetermined distance within the near field from the information recording surface.

Also the above object can be attained by providing an information recording apparatus including according to the present invention:

a mounting means on which a removable disk-shaped optical recording medium is set in place;

a rotation driving means for rotating the disk-shaped optical recording medium set on the mounting means;

a pulse signal generating means for generating N (N is a natural number) pulse signals in a predetermined cycle while the disk-shaped optical recording medium is being rotated one full turn by the rotation driving means;

a frequency-to-voltage transducing means for transducing the frequency of a pulse signal generated by the pulse signal generating means into a voltage value;

a voltage value comparing means for making a comparison between the voltage value supplied from the voltage-to-frequency transducing means and a predetermined reference voltage value;

a first velocity controlling means for controlling the velocity of rotation of the rotation driving means on the basis of the result of comparison in the voltage value comparing means;

a phase comparing means for making a comparison between the phase of the pulse signal generated by the pulse signal generating means and the phase of a predetermined reference signal;

a second velocity controlling means for controlling the velocity of rotation of the rotation driving means on the basis of the result of comparison in the phase comparing means;

a light source to emit a light beam of a predetermined wavelength modulated with information to be written to the information recording surface of the disk-shaped optical recording medium;

a near-field light projecting means for condensing a light beam emitted from the light source and projecting the condensed light beam as near-field light to the information recording surface when it is located in a field near the information recording surface of the disk-shaped optical recording medium;

a return-light amount detecting means for detecting the return-light amount of the near-field light projected to the information recording surface;

a first gap controlling means for controlling the near-field light projecting means on the basis of the linear characteristic of the return-light amount of the near-field light detected by the return-light amount detecting means to keep a predetermined distance within the near field from the information recording surface; and a controlling means for having the first velocity controlling means control the rotation driving means to rotate the disk-shaped optical recording medium at a predetermined velocity, having the second velocity controlling means control the rotation driving means to start driving the rotation of the disk-shaped optical recording medium when the predetermined velocity is reached, and having the first gap controlling means to start controlling the near-field light projecting means when the result of phase comparison supplied from the phase comparing means is smaller than the predetermined threshold.

Also the above object can be attained by providing an information reproducing apparatus including according to the present invention:

a mounting means on which a removable disk-shaped optical recording medium is set in place;

a rotation driving means for rotating the disk-shaped optical recording medium set on the mounting means;

a pulse signal generating means for generating N (N is a natural number) pulse signals in a predetermined cycle while the disk-shaped optical recording medium is being rotated one full turn by the rotation driving means;

a frequency-to-voltage transducing means for transducing the frequency of a pulse signal generated by the pulse signal generating means into a voltage value;

a voltage value comparing means for making a comparison between the voltage value supplied from the voltage-to-frequency transducing means and a predetermined reference voltage value;

a first velocity controlling means for controlling the velocity of rotation of the rotation driving means on the basis of the result of comparison in the voltage value comparing means;

a phase comparing means for making a comparison between the phase of the pulse signal generated by the pulse signal generating means and the phase of a predetermined reference signal;

a second velocity controlling means for controlling the velocity of rotation of the rotation driving means on the basis of the result of comparison in the phase comparing means;

a light source to emit a light beam of a predetermined wavelength to read predetermined information from the information recording surface of the disk-shaped optical recording medium;

a near-field light projecting means for condensing a light beam emitted from the light source and projecting the condensed light beam as near-field light to the information recording surface when it is located in a field near the information recording surface of the disk-shaped optical recording medium;

a return-light amount detecting means for detecting the return-light amount of the near-field light projected to the information recording surface;

a first gap controlling means for controlling the near-field light projecting means on the basis of the linear characteristic of the return-light amount of the near-field light detected by the return-light amount detecting means to keep a predetermined distance within the near field from the information recording surface; and a controlling means for having the first velocity controlling means control the rotation driving means to rotate the disk-shaped optical recording medium at a predetermined velocity, having the second velocity controlling means control the rotation driving means to start driving the rotation of the disk-shaped optical recording medium when the predetermined velocity is reached, and having the first gap controlling means to start controlling the near-field light projecting means when the result of phase comparison supplied from the phase comparing means is smaller than the predetermined threshold.

Also the above object can be attained by providing an information recording apparatus including according to the present invention:

a first light source to emit a light beam of a first wavelength, modulated with information to be written to the information recording surface of an optical recording medium;

a second light source to emit a light beam of a second wavelength, modulated with information to be written to the information recording surface of the optical recording medium;

a light projecting means for condensing the second-wavelength light beam emitted from the first light source, projecting the condensed first-wavelength light beam as near-field light to the information recording surface of the optical recording medium when it is located in a field near the information recording surface, and projecting the second-wavelength light beam emitted from the second light source for focusing on the information recording surface;

a return-light amount detecting means for detecting a return-light amount of the near-field light projected to the information recording surface;

a reflected-light amount detecting means for detecting a reflected-light amount of the reflected part of the second-wavelength light beam focused on the information recording surface;

a first controlling means for controlling the light projecting means on the basis of the linear characteristic of the return-light amount of the near-field light detected by the return-light amount detecting means to keep a predetermined distance within the near field from the information recording surface when writing information with the near-field light; and a second controlling means for controlling the light projecting means on the basis of the linear characteristic of the reflected-light amount of the reflected light detected by the reflected-light amount detecting means to keep a predetermined distance beyond the near field from the information recording surface when writing information with the second-wavelength light beam.

Also the above object can be attained by providing an information reproducing apparatus including according to the present invention:

a first light source to emit a light beam of a first wavelength to read predetermined information recorded on the information recording surface of an optical recording medium;

a second light source to emit a light beam of a second wavelength to read predetermined information recorded on the information recording surface of the optical recording medium;

a light projecting means for condensing the second-wavelength light beam emitted from the first light source, projecting the condensed first-wavelength light beam as near-field light to the information recording surface of the optical recording medium when it is located in a field near the information recording surface, and projecting the second-wavelength light beam emitted from the second light source for focusing on the information recording surface;

a return-light amount detecting means for detecting a return-light amount of the near-field light projected to the information recording surface;

a reflected-light amount detecting means for detecting a reflected-light amount of the reflected part of the second-wavelength light beam focused on the information recording surface;

a first controlling means for controlling the light projecting means on the basis of the linear characteristic of the return-light amount of the near-field light detected by the return-light amount detecting means to keep a predetermined distance within the near field from the information recording surface when reading information with the near-field light; and a second controlling means for controlling the light projecting means on the basis of the linear characteristic of the reflected-light amount of the reflected light detected by the reflected-light amount detecting means to keep a predetermined distance beyond the near field from the information recording surface when reading information with the second-wavelength light beam.

Also the above object can be attained by providing an information recording apparatus including according to the present invention:

a light source to emit a light beam of a predetermined wavelength modulated with information to be written to the information recording surface of an optical recording medium;

a light projecting means for condensing the predetermined-wavelength light beam emitted from the light source, projecting the condensed predetermined-wavelength light beam as near-field light to the information recording surface of the optical recording medium when it is located in a field near the information recording surface, and projecting the predetermined-wavelength light beam emitted from the light source for focusing on the information recording surface;

a return-light amount detecting means for detecting a return-light amount of the near-field light projected to the information recording surface;

a reflected-light amount detecting means for detecting a reflected-light amount of the reflected part of the predetermined-wavelength light beam focused on the information recording surface;

a first controlling means for controlling the light projecting means on the basis of the linear characteristic of the return-light amount of the near-field light detected by the return-light amount detecting means to keep a predetermined distance within the near field from the information recording surface when writing information with the near-field light; and a second controlling means for controlling the light projecting means on the basis of the linear characteristic of the reflected-light amount of the reflected light detected by the reflected-light amount detecting means to keep a predetermined distance beyond the near field from the information recording surface when writing information with the predetermined-wavelength light beam.

Also the above object can be attained by providing an information reproducing apparatus including according to the present invention:

a light source to emit a light beam of a predetermined wavelength to read predetermined information recorded on the information recording surface of an optical recording medium;

a light projecting means for condensing the predetermined-wavelength light beam emitted from the light source, projecting the condensed predetermined-wavelength light beam as near-field light to the information recording surface of the optical recording medium when it is located in a field near the information recording surface, and projecting the predetermined-wavelength light beam emitted from the light source for focusing on the information recording surface;

a return-light amount detecting means for detecting a return-light amount of the near-field light projected to the information recording surface;

a reflected-light amount detecting means for detecting a reflected-light amount of the reflected part of the predetermined-wavelength light beam focused on the information recording surface;

a first controlling means for controlling the light projecting means on the basis of the linear characteristic of the return-light amount of the near-field light detected by the return-light amount detecting means to keep a predetermined distance within the near field from the information recording surface when reading information with the near-field light; and a second controlling means for controlling the light projecting means on the basis of the linear characteristic of the reflected-light amount of the reflected light detected by the reflected-light amount detecting means to keep a predetermined distance beyond the near field from the information recording surface when reading information with the predetermined-wavelength light beam.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

Figure 1:
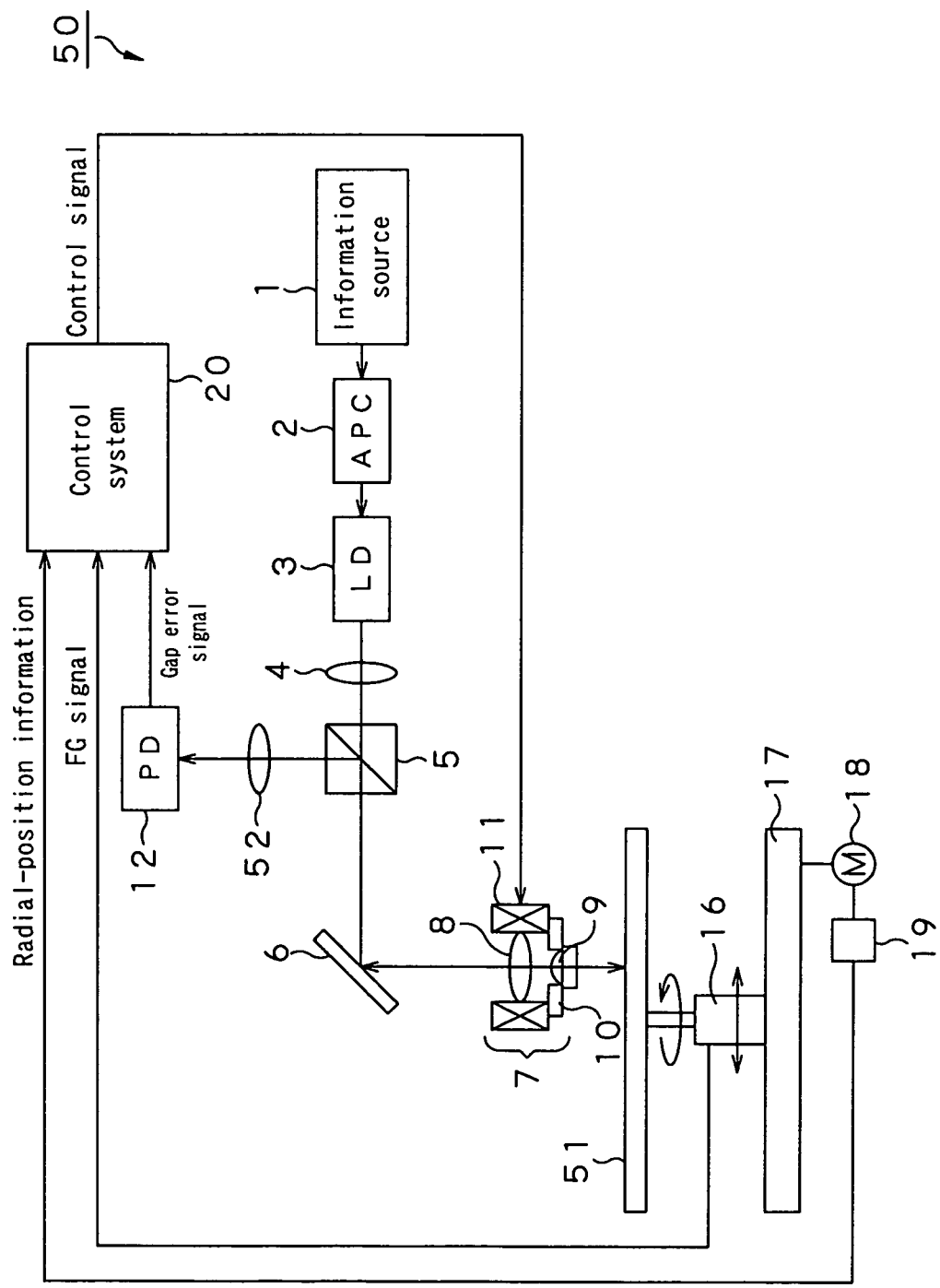
FIG. 1 is a block diagram of an information recorder as a first embodiment of the present invention.

The present invention will be described in detail below concerning an information recording apparatus and information recording controlling method, and information reproducing apparatus and information reproduction controlling method as embodiments thereof with reference to the accompanying drawings.

First, the present invention will be described concerning an information recorder 50 as a first embodiment of thereof with reference to FIG. 1. The information recorder 50 shown in FIG. 1 has a removable disk-shaped optical recording medium 51 loaded on a disk mount thereof (not shown) and records information to the disk-shaped optical recording medium 51 by irradiating evanescent light detected in a near field to the disk-shaped optical recording medium 51.

The information recorder 50 includes as an information source 1 to supply information for recording to the disk-shaped optical recording medium 51, APC (auto power controller) 2, laser diode (LD) 3, collimator lens 4, beam splitter (BS) 5, mirror 6, optical head 7, condenser lens 52, photodetector (PD) 12, spindle motor 16, feed base 17, feed motor 18, potentiometer 19 and control system 20.

At the time of information recording, the APC 2 controls the power to modulate laser light emitted from the downstream laser diode (LD) 3 according to information supplied from the information source 1.

The laser diode (LD) 3 emits laser light of a predetermined wavelength under the control of the APC 2. It may be a red semiconductor laser, blue-violet semiconductor laser or the like, for example.

The collimator lens 4 forms the incident laser light from the laser diode 3 into a light beam parallel to the optical axis.

The beam splitter 5 allows the incident laser light from the collimator lens 4 to pass by and go to the mirror 6. Also, the beam splitter 5 reflects return light from the optical head 7 and reflected by the mirror 6 for incidence upon the condenser lens 52.

The mirror 6 reflects the incident light beam from the beam splitter 5 for incidence upon beam splitter 5.

The optical head 7 condenses and projects the incident light beam from the mirror 6 onto the information recording surface of the disk-shaped optical recording medium 51. The light projected from the optical head 7 onto the information recording surface is evanescent light permitting information write or read by a light spot of a size beyond the diffraction-limited of the lens.

Figure 2:
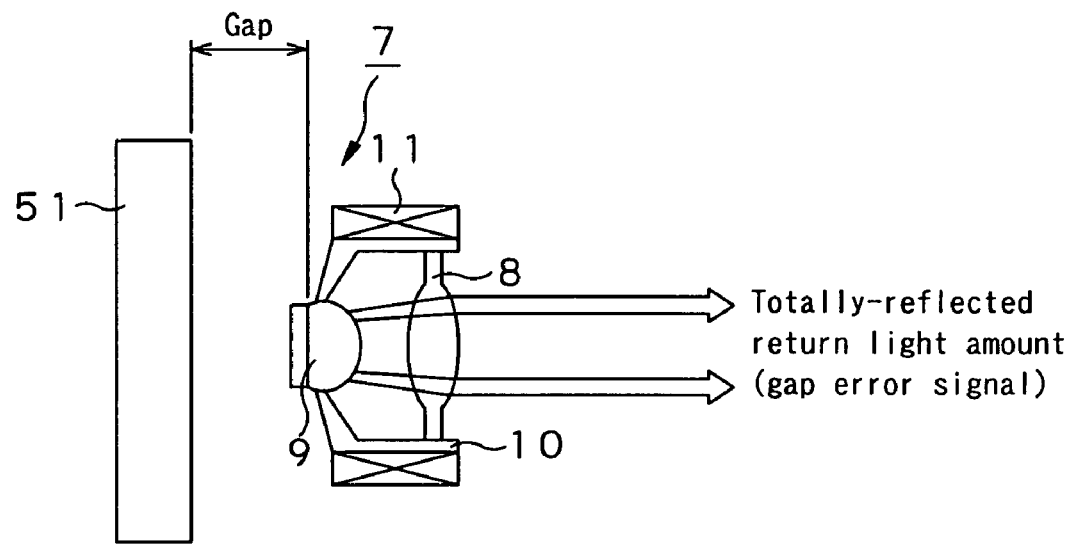
FIG. 2 is a side elevation of an optical head included in the information recorder shown in FIG. 1.

As shown in FIG. 2, the optical head 7 includes an objective lens 8, SIL (solid immersion lens) 9, lens holder 10 and actuator 11.

The objective lens 8 converges the light beam emitted from the laser diode 3 and incident through the collimator lens 4, beam splitter 5 and mirror 6, and supplies the light to the SIL 9.

The SIL 9 is a high refractive-index lens formed by cutting a part of a spherical lens to be flat. In the SIL 9, the light beam condensed through the objective lens 8 is incident from the spherical side and condensed at the center at the opposite side (end face) to the spherical side.

Also, the SIL 9 may be an SIM (solid immersion mirror) having a reflecting mirror formed thereon and functionally equivalent to the SIL 9.

The lens holder 10 holds the objective lens 8 and SIL 9 together in a predetermined physical relation. The SIL 9 is held by the lens holder 10 for the spherical side thereof to face the objective lens 8 and the opposite side (end face) to the spherical side to face the information recording surface of the disk-shaped optical recording medium 51.

With the SIL 9 having the high refractive index held between the objective lens 8 and disk-shaped optical recording medium 51 by the lens holder 10 as above, it is possible to have a larger numerical aperture (NA) than that when only the object lens 8 is used. Generally, since the size of a spot defined by a light beam projected through a lens is inversely proportional to the numerical aperture of the lens, the objective lens 8 and SIL 9 can form the light beam which will define a light spot having a much smaller size.

The actuator 11 moves the lens holder 10 in the focusing direction and/or tracking direction according to a control current supplied as a control signal from the control system 20.

In the optical head 7, the evanescent light is a part, that is oozing from the reflection boundary, of the light beam incident upon the end face of the SIL 9 at an angle larger than the critical angle and totally reflected. In case the end face of the SIL 9 is within a near field, which will be described in detail later, from the information recording surface of the disk-shaped optical recording medium 51, the evanescent light oozing out of the end face of the SIL 9 will be projected to the information recording surface.

Next, the "near field" will be explained. Generally, the near field is a field of d $\leq \lambda/2$ (where $\underline{d}$ is a distance from the light beam emitting surface of the lens and $\lambda$ is the wavelength of light incident upon the lens).

The near field will be explained in detail below concerning the optical head 7 and disk-shaped optical recording medium 51 shown in FIG. 2. The near field is a field of d$\leq\lambda/2$ where $\underline{d}$ is a distance (gap) from the end face of the SIL 9 included in the optical head 7 to the information recording surface of the disk-shaped optical recording medium 51 and $\lambda$ is the wavelength of light beam incident upon the SIL 9. Namely, a field whose gap $\underline{d}$ between the information recording surface of the disk-shaped optical recording medium 51 and end face of the SIL 9 meets d$\leq\lambda/2$ and in which evanescent light oozes from the end face of the SIL 9 to the information recording surface of the disk-shaped optical recording medium 51 is called "near field", while a field whose gap $\underline{d}$ meets d$>\lambda/2$ and in which no evanescent light oozes to the information recording surface is called "far field".

Figure 3:
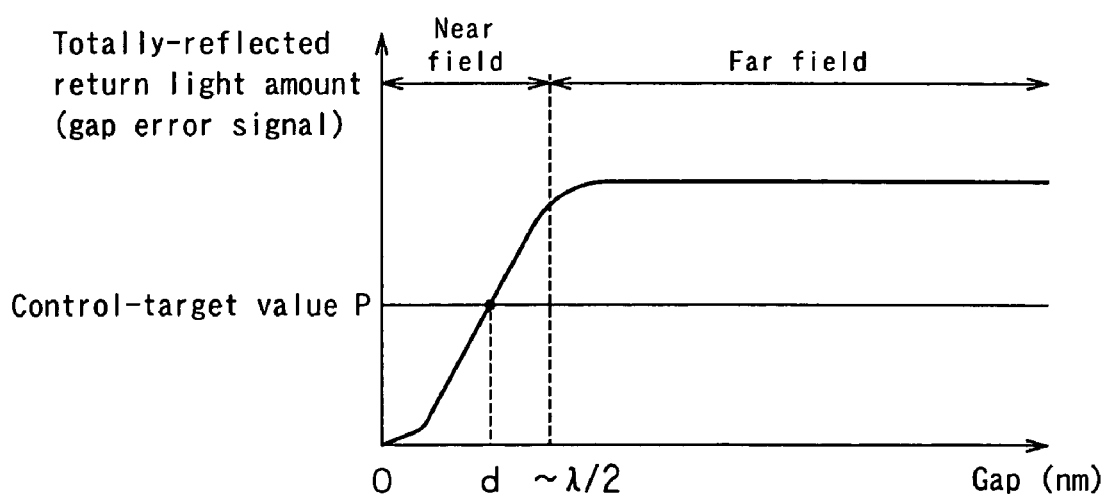
FIG. 3 shows the relation between return-light amount and inter-gap distance.

Note here that when the end face of the SIL 9 is in a far field, light beam incident upon the end face of the SIL 9 at an angle larger than the critical angle is totally reflected to provide return light. Therefore, when the end face of the SIL 9 is in a far field, the totally-reflected return light is constant in amount as shown in FIG. 3.

On the other hand, when the end face of the SIL 9 is in a near field, a part of the light beam incident upon the end face of the SIL 9 at a larger angle than the critical angle will ooze as evanescent light to the information recording surface of the disk-shaped optical recording medium 51 on the end face, namely, reflection boundary, of the SIL 9 as mentioned above. Therefore, the totally-reflected return light is smaller in amount than when the end face of the SIL 9 is in the far field as shown in FIG. 3. As will be known from FIG. 3, the totally-reflected return light amount when the end face of the SIL 9 is in the near field is exponentially smaller as the end face of the SIL 9 is nearer to the information recording surface of the disk-shaped optical recording medium 51.

Therefore, when the end face of the SIL 9 is in a near field, feedback servo control with a linear portion varying in totally-reflected return light amount correspondingly to the gap length permits to control the gap between the end face of the SIL 9 and information recording surface of the disk-shaped optical recording medium 51 to a constant value. For example, by making the feedback servo control for the totally-reflected return light amount to be a control target value P as shown in FIG. 3, the gap $\underline{d}$ will be kept constant.

The configuration of the information recorder 50 shown in FIG. 1 will be explained again.

The condenser lens 52 condenses, on the photodetector 12, the return light totally reflected at the end face of the SIL 9 included in the optical head 7, reflected by the mirror 6 and reflected by the beam splitter 5.

The photodetector 12 detects, as a value of current, the amount of return light condensed by the condenser lens 52. It should be noted that the current value detect by the photodetector 12 has already been transduced into a DC and is supplied as a totally-reflected return light amount to the control system 20.

The spindle motor 16 includes an encoder (not shown) to generate a predetermined number of pulse signals called "FG signal" for a period of one full turn of the spindle motor 16. It is known from a count of the FG signals generated by the encoder (not shown) to which circumferential position on the information recording surface of the disk-shaped optical recording medium 51 the light beam emitted from the optical head 7 is currently being irradiated.

That is, the FG signals generated by the encoder (not shown) included in the spindle motor 16 indicate to which circumferential position on the disk-shaped optical recording medium 51 the light beam emitted from the optical head 7 is being irradiated. The FG signals generated by the encoder (not shown) are supplied to the control system 20.

The feed base 17 has mounted thereon the spindle motor 16 as a rotation drive and moves the disk-shaped optical recording medium 51 set on the disk mount (not shown) radially of the disk-shaped optical recording medium 51. The feed base 17 is moved by the feed motor 18 radially of the disk-shaped optical recording medium 51. With the feed base 17 moved by the feed motor 18, the optical head 7 can be moved from one track to another on the disk-shaped optical recording medium 51.

The potentiometer 19 is installed on the feed motor 18 to detect an angle of rotation of the feed motor 18. The detected angle of rotation indicates how far the feed base 17 has been moved. The moving distance of the feed base 17 is equal to the distance over which the optical head 7 is moved radially of the disk-shaped optical recording medium 51. Therefore, the angle of rotation of the feed motor 18, detected by the potentiometer 19, indicates a position of the optical head 7 along the radius of the disk-shaped optical recording medium 51.

The angle of rotation of the feed motor 18, detected by the potentiometer 19, indicates where the optical head 7 is positioned radially of the disk-shaped optical recording medium 51. This information will be referred to as "radial-position information" hereunder wherever appropriate. The radial-position information output from the potentiometer 19 is supplied to the control system 20.

Figure 4:
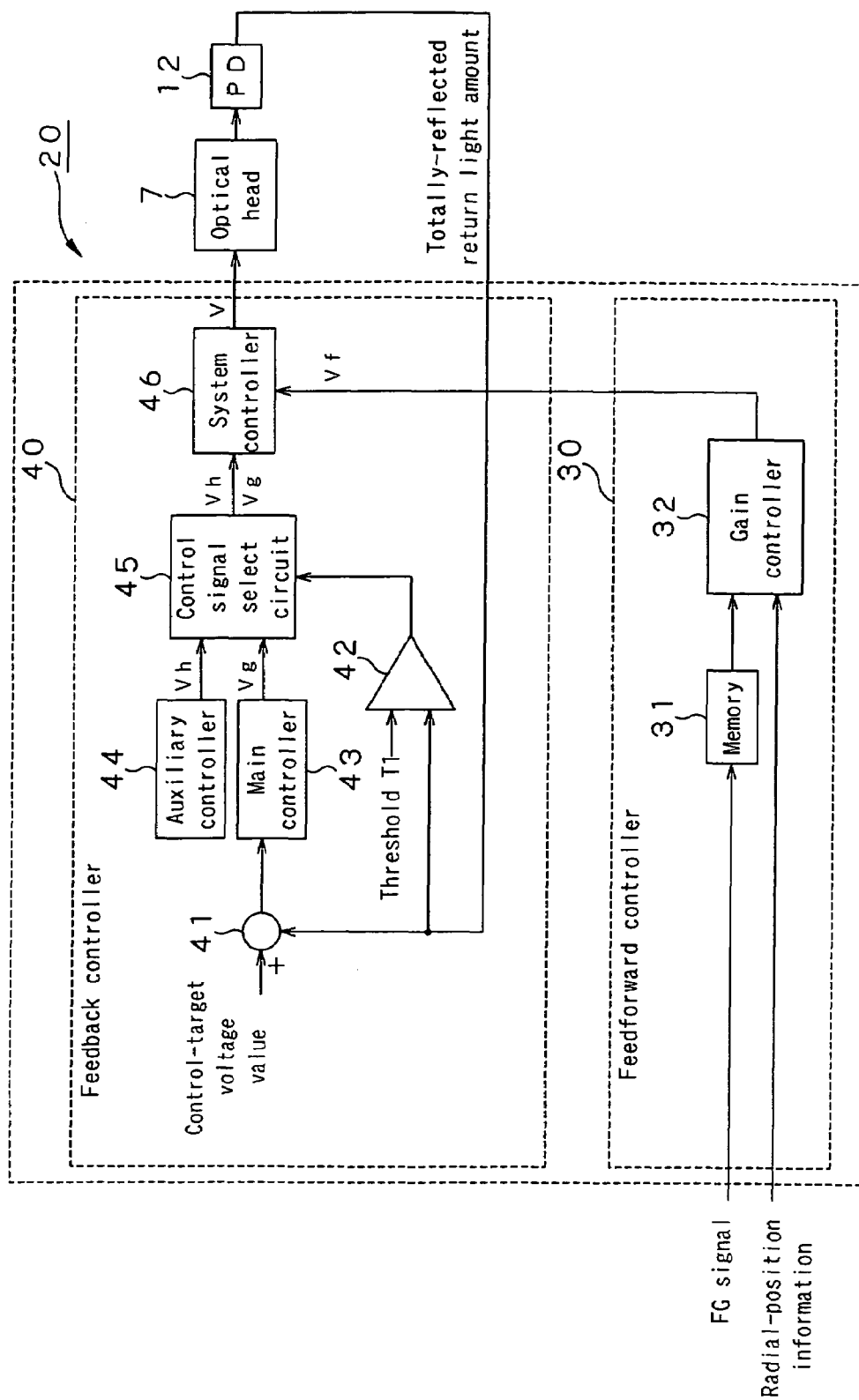
FIG. 4 is a block diagram of a control system included in the information recorder.

Next, the control system 20 will be described below with reference to FIG. 4. As shown in FIG. 4, the control system 20 includes a feedforward controller 30 to control the gap which is a distance between the information recording surface of the disk-shaped optical recording medium 51 and SIL 9 of the optical head 7 on the basis of the FG signals and radial-position information, and a feedback controller 40 to control the gap on the basis of the totally-reflected return light amount.

The disk-shaped optical recording medium 51 used in the information recorder 50 according to the present invention is a recording medium removably settable in the information recorder 50. Therefore, the disk-shaped optical recording medium 51 cannot be held on the disk rotation driving mechanism with a higher precision than any recording medium that is pre-fixed to the disk rotation driving mechanism in the information recorder. Thus, when the disk-shaped optical recording medium 51 is rotated on and with the disk rotation driving mechanism, it is difficult to prevent the recording medium from incurring any an axial runout.

The feedforward controller 30 of the control system 20 is provided primarily to have the optical head 7 follow an axial runout caused by a disturbance. The feedforward controller 30 detects and stores an axial runout in a predetermined position on the disk-shaped optical recording medium 51 clamped to the disk rotation driving mechanism, and reads out the stored axial runout to have the optical head 7 follow the axial runout when recording or reading information to or from the disk-shaped optical recording medium 51.

The feedforward controller 30 includes a memory 31 and gain controller 32.

The memory 31 is a RAM (random-access memory) to store the amount of an axial-runout error taking place after the disk-shaped optical recording medium 51 is clamped inside the information recorder 50.

The amount of an axial-runout error is measured for storage into the memory 31 as will be described below with reference to FIG. 5. The "amount of axial-runout error" is a control voltage value used in the control operation of the feedforward controller 30 to have the optical head 7 follow an axial-runout error taking place on the information recording surface of the disk-shaped optical recording medium 51. When the axial-runout error signal is applied to the actuator 11 of the optical head 7, the optical head 7 will follow the axial runout having taken on the information recording surface of the disk-shaped optical recording medium 51.

Figure 5:
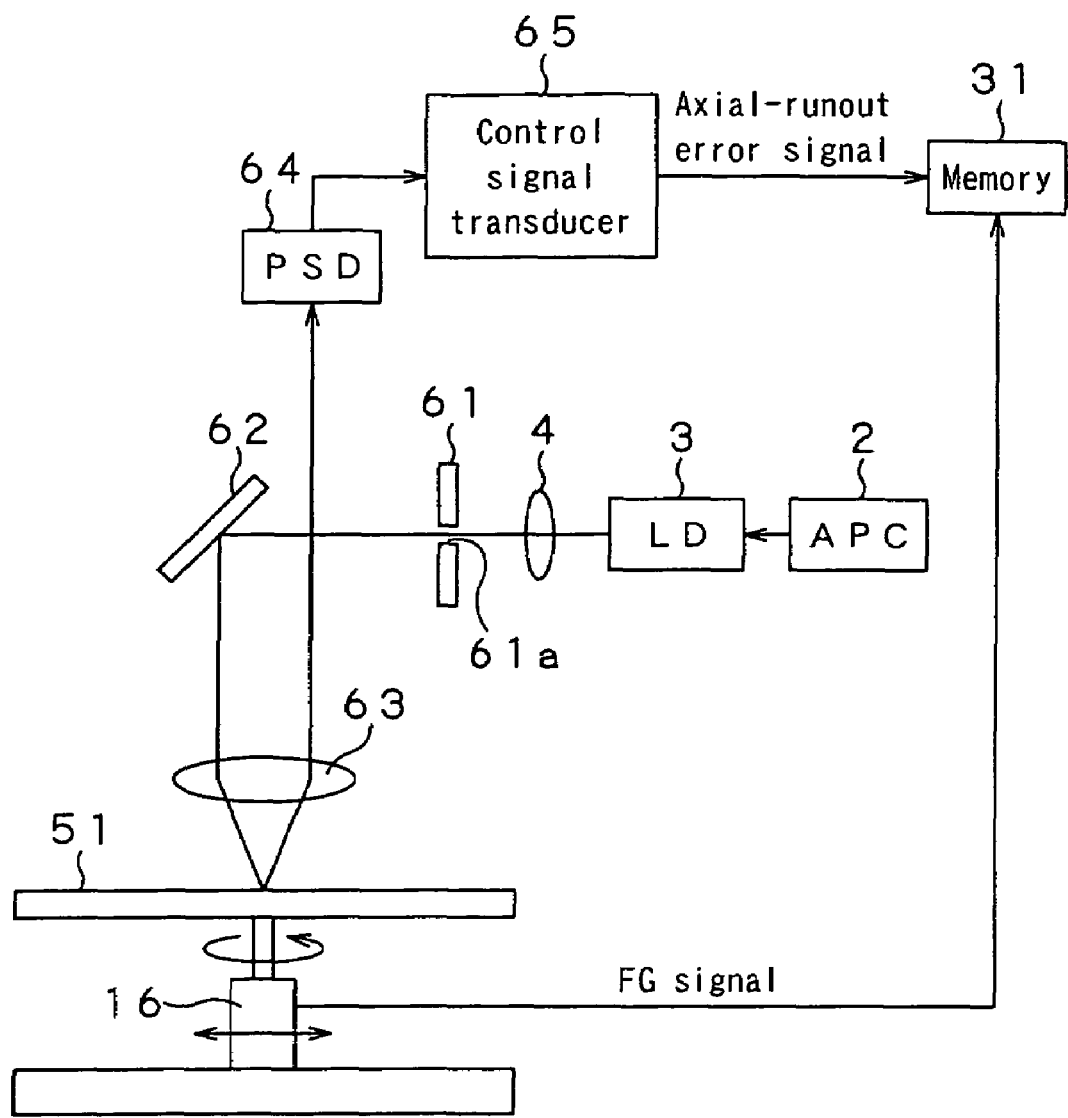
FIG. 5 is a block diagram of a mechanism to detect an axial runout of the optical recording medium in the information recorder.

In order to detect an axial runout of the disk-shaped optical recording medium 51, which is to be stored into the memory 31, the information recorder 50 includes a collimator 61, mirror 62, objective lens 63, position-sensitive detector (PSD) 64 and control signal transducer 65, all provided downstream of the APC 2, laser diode (LD) 3 and collimator lens 4, as shown in FIG. 5. The collimator 61 is provided to limit the amount of a light beam incident thereupon from the collimator 4.

The mirror 62 is provided to reflect the light beam having passed through a pin hole in the collimator 61 for incidence upon the condenser lens 63.

The objective lens 63 is provided to condense the light beam incident thereupon from the mirror 62 for irradiation as a light spot on the information recording surface of the disk-shaped optical recording medium 51.

The position-sensitive detector 64 is a light sensor capable of detect the position of the light spot as a current value. A return part of the light beam incident upon the information recording surface of the disk-shaped optical recording medium 51 from the objective lens 63 is irradiated to the position-sensitive detector 64, and a light beam-irradiated position on the information recording surface is detected as a current value.

As shown in FIG. 5, the amount of an axial-runout error taking place on the information recording surface 50 can be detected by passing the light beam emitted from the laser diode 3 through the pin hole in the collimator 61 by mechanically moving the APC2, laser diode 3 and collimator lens 4 shown in FIG. 1 or by an optical method.

For the detection of an axial-runout error as shown in FIG. 5, a technique commonly called "yawing method" is used. This yawing method will be described below with reference to FIGS. 6 and 7.

Figure 6:
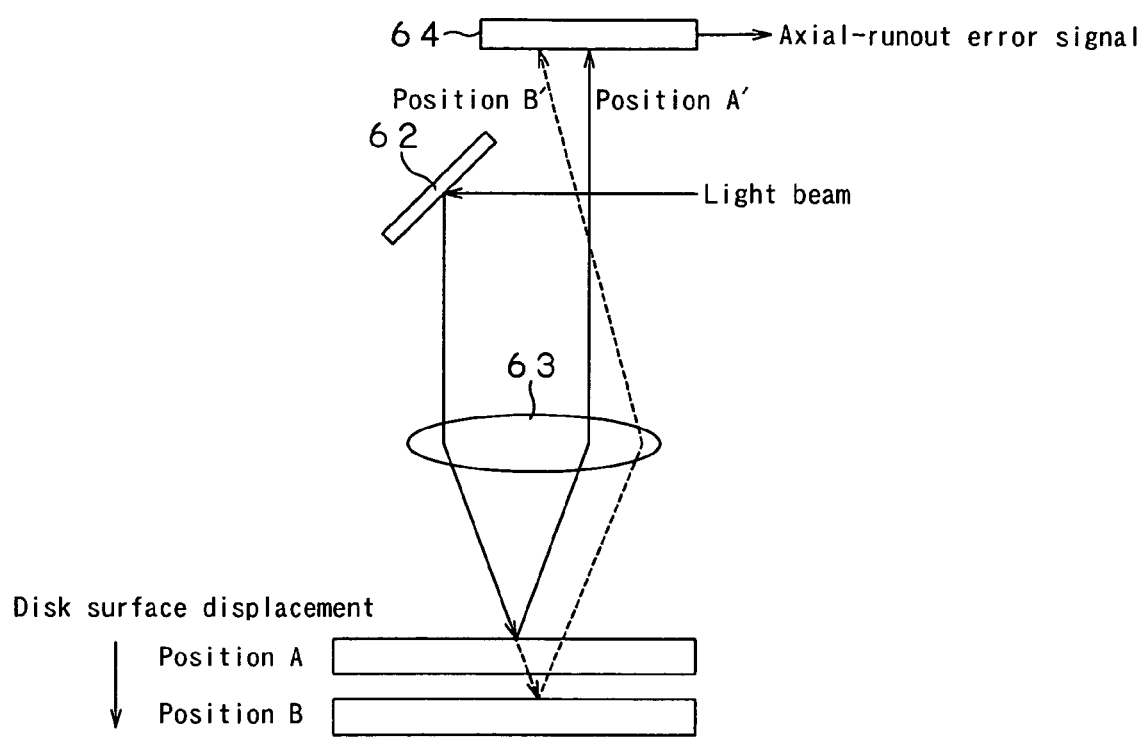
FIG. 6 explains the detection of an axial runout by the yawing method in the information recorder.

For example, when the information recording surface of the disk-shaped optical recording medium 51 is in a position A as shown in FIG. 6 and a light beam is incident upon the information recording surface in the position A via the objective lens 63, return light is incident upon a position A' on the position-sensitive detector 64 and the position of a spot defined by the incident return light is detected as a current value by the position-sensitive detector 64.

Also, when the information recording surface of the disk-shaped optical recording medium 51 is in a position B and a light beam is incident upon the information recording surface in the position B via the objective lens 63, return light is incident upon a position B' on the position-sensitive detector 64 and the position of a spot defined by the incident return light is detected as a current value by the position-sensitive detector 64.

As above, when the information recording surface of the disk-shaped optical recording medium 51 is located in different positions in the focusing direction, the return light from the disk-shaped optical recording medium 51 will be incident upon the position-sensitive detector 64 in corresponding different positions. Therefore, by detecting the position of the return light incident upon the position-sensitive detector 64, it is possible to detect how far the information recording surface of the disk-shaped optical recording medium 51 is displaced in the focusing direction. The displacement in the focusing direction, detected as a current value by the position-sensitive detector 64, is transduced into a voltage value by the control signal transducer 65 which makes a predetermined calculation. The voltage value provides an axial-runout error signal indicating an axial runout of the information recording surface of the disk-shaped optical recording medium 51.

Figure 7:
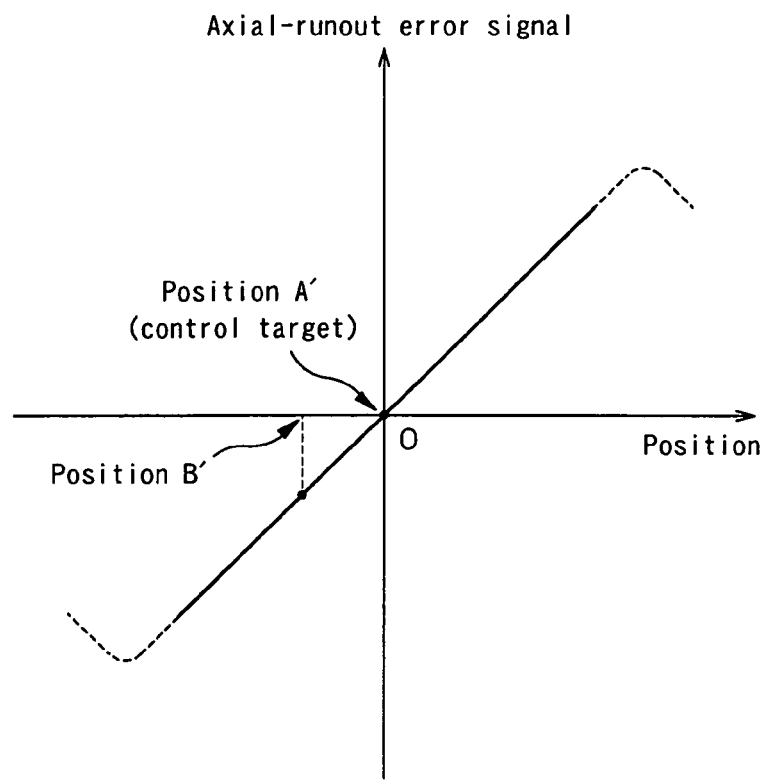
FIG. 7 shows axial-runout error and positions of the optical recording medium in the information recorder.

FIG. 7 shows the relation between a position on the position-sensitive detector 64 in which a spot is defined by the incident return light and an axial-runout error signal.

As will be known from FIG. 7, the information recording surface of the disk-shaped optical recording medium 51 is in the position A in FIG. 6, detection of a return-light spot in the position A' on the position-sensitive detector 64 indicates that the axial-runout error signal is zero and detection of a return-light spot in the position B' on the position-sensitive detector 64 indicates that the axial-runout error signal has a predetermined value. More specifically, such a position A of the information recording surface that the return light defines a spot on the position-sensitive detector 64 in the position A' is a control-target position of the feedforward controller 30. If the information recording surface is found displaced from the control-target position, the axial-runout error signal which is a control voltage to be applied to the actuator 11 of the optical head 7 will be detected to have the predetermined value.

To detect an axial-runout error value, the well-known Michelson-interferrometer method, triangular-surveying method or the like may be adopted in addition to the aforementioned yawing method.

The axial-runout error signal thus resulted from the processing, by the control signal transducer 65, the displacement of the information recording surface that has been detected by the position-sensitive detector 64 is stored into the memory 31 of the feedforward controller 30.

Figure 8:
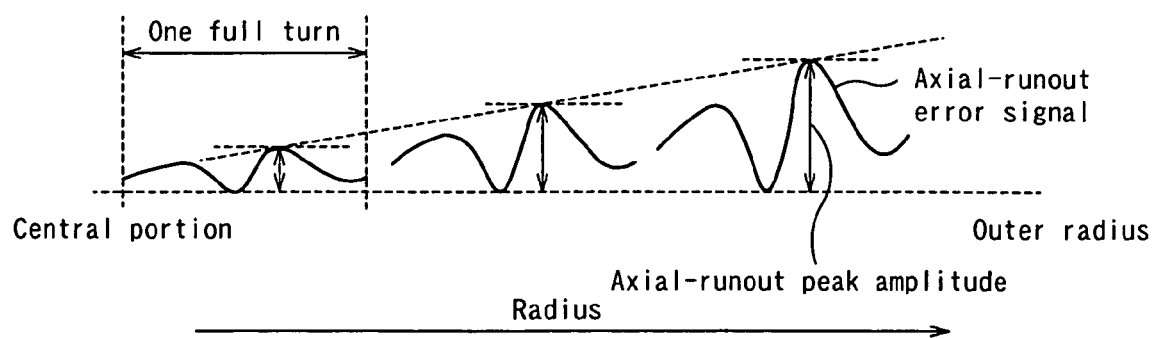
FIG. 8 is a first illustration of the relation between the radius of the optical recording medium and peak amplitude of the axial runout in the information recorder.

The memory 31 stores an axial-runout error signal for one full turn of a predetermined radial position of the disk-shaped optical recording medium 51. The axial-runout error signal for one full turn of the predetermined radial position of a removable disk-shaped optical recording medium 51 set in the information recorder 50 with the central portion thereof being clamped will be almost proportionately increased as the radial position moves from the central portion toward the outer radius of the disk-shaped optical recording medium 51 as shown in FIG. 8.

Therefore, once an axial-runout error signal for one full turn of a radial position on the disk-shaped optical recording medium 51 is obtained and stored in the memory 31, an axial-runout error signal of an arbitrary radial position can be determined by multiplying a given rate of change by the stored axial-runout error signal.

Figure 9:
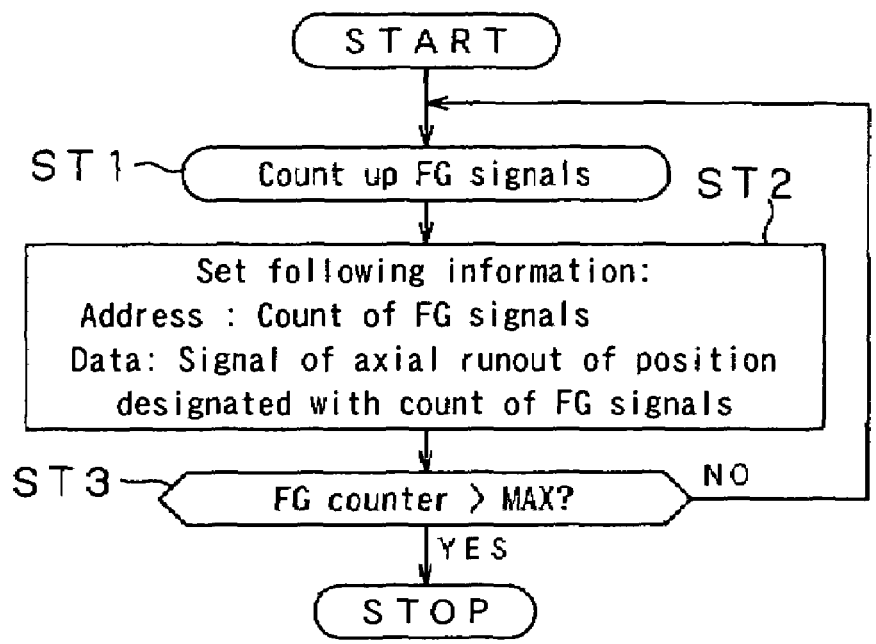
FIG. 9 shows a flow of operations made in storing an axial-runout signal into a memory in the information recorder.

The axial-runout error signal is stored into the memory 31 as will be described below with reference to the flow diagram shown in FIG. 9.

As above, the memory 31 stores an error signal of a circumferential axial runout of the disk-shaped optical recording medium 51 in a predetermined radial position. When the FG signal is generated by an encoder (not shown) connected to the spindle motor 16, the circumferential axial-runout error signal for storage into the memory 31 is resulted from the conversion by the control signal transducer 65 of the light beam emitted to the optical head 7 and detected by the position-sensitive detector 64. Therefore, since the encoder (not shown) generates the FG signal which is a pulse signal at every one full turn of the spindle motor 16 and outputs the FG signals a predetermined number of times, axial-runout error signals corresponding to the FG signals will be stored into the memory 31 when the light beam is projected onto a predetermined radial position on the disk-shaped optical recording medium 51.

First in step ST1, FG signals are outputted from the encoder (not shown) installed to the spindle motor 16 and counted up by an FG counter (not shown).

At this time, the axial-runout error signals are continuously supplied from the position-sensitive detector 64 and control signal transducer 65.

In step ST2, upon counting an FG signal by the FG counter (not shown), the count of the FG signals by the FG counter (not shown) is stored into the memory 31 as an address value of the axial-runout error signal for storage into the memory 31.

Further, the axial-runout error signal supplied from the control signal transducer 65 is stored into the memory 31 in association with the address value stored in the memory 31.

In step ST3, it is judged whether the FG counter (not shown) has counted FG signals for one full turn of the disk-shaped optical recording medium 51. If the FG signals for the one full turn have not been counted, the process is returned to step ST1. If it is determined in step ST3 that the FG counter has counted the FG signals for the one full turn, the procedure is terminated.

As above, the address value which is the count of the FG signals and error signal of an axial runout taking place in the position where the FG signal arises will be stored in one-to-one association with each other into the memory 31.

Also during recording operation of the information recorder 50, the axial-runout error signal stored in the memory 31 is read correspondingly to the value of an FG signal output from the encoder (not shown) installed on the spindle motor 16, and supplied to the gain controller 32 provided downstream.

Next, the gain controller 32 included in the feedforward controller 30 will be explained. The gain controller 32 calculates an error signal of an axial runout taking place in an arbitrary radial position by multiplying each FG signal by a gain that depends upon the proportional relation of the axial-runout error signal shown in FIG. 8 for one full turn of a predetermined radial position on the disk-shaped optical recording medium 51, stored in the memory 31.

The "multiplier" gain in the multiplication made in the gain controller 32 will be explained herebelow. It is assumed here that the memory 31 has stored axial-runout error signals for one full turn of a position at a radius Rm on the disk-shaped optical recording medium 51, for example, the maximum one of the amplitudes in a position on the disk-shaped optical recording medium 51 where the largest one of the axial-runout error signals stored in the memory 31 is detected is an axial-runout peak amplitude β and that the axial-runout peak value which is the maximum amplitude of the axial runout at an arbitrary radius Rn on the disk-shaped optical recording medium 51 is γ. The radius of the disk-shaped optical recording medium 51 and the axial-runout peak values are in a relation shown in FIG. 10. Theoretically, no axial runout will take place at the clamped center of the disk-shaped optical recording medium 51 and the axial-runout peak amplitude is "0".

Thus, the axial-runout peak amplitude γ at the arbitrary radius Rn is given by the following equation (1):

$$\gamma = \beta \times (Rn/Rm) \quad (1)$$

By specifying the arbitrary radius Rn as a parameter in the above equation (1), the axial-runout peak amplitude γ at the radius Rn can be determined.

Also, when the axial-runout error signal stored in the memory 31 is taken as Vfg, the axial-runout error signal Vf at the arbitrary radius Rn can be estimated as given by the following equation (2):

$$Vf = Vfg \times \gamma = Vfg \times \{\beta \times (Rn/Rm)\} \quad (2)$$

In the equation (2), the axial-runout peak amplitude γ at the arbitrary radius Rn is taken as a gain and the axial-runout error signal Vfg stored in the memory 31 is multiplied by the axial-runout peak amplitude γ. With the axial-runout peak amplitude being taken as the gain, there can be generated the axial-runout error signal Vf proportional to the value of the arbitrary radius Rn and which is a control signal taking the maximum variation of the axial-runout amplitude in consideration.

When the information recorder 50 operates for information recording, the gain controller 32 uses the above equation (2) to generate the axial-runout error signal Vf by multiplying the axial-runout error signal Vfg at the radius Rm, supplied from the memory 31, by a gain obtained from radial-position information output from the potentiometer 19 installed to the feed motor 18, and supplies the axial-runout error signal Vf as a control voltage to the system controller 46.

The feedback controller 40 included in the control system 20 will be explained referring back to FIG. 4 again. As shown, the feedback controller 40 includes an adder 41, comparator 42, main controller 43, auxiliary controller 44, control signal selection circuit 45 and the system controller 46.

A voltage value equivalent to the totally-reflected return light amount detected by the aforementioned photodetector 12 is supplied to the adder 41 and comparator 42.

The adder 41 makes a comparison between the control-target voltage value P for controlling a gap to a control target value and the voltage value equivalent to the totally-reflected return light amount from the photodetector 12 to determine a variation. The control-target voltage value is a preset constant voltage or the like.

The comparator 42 compares the voltage value equivalent to the totally-reflected return light amount from the photodetector(PD)12 with a threshold T1 which is a predetermined voltage value. The threshold T1 is a value selected to be in a relation of T1>P with the control target value P When the voltage value equivalent to the totally-reflected return light amount is larger than the threshold T1, the SIL 9 of the optical head 7 is in the far field. On the contrary, if the voltage value equivalent to the totally-reflected return light amount is smaller than the threshold T1, the SIL 9 is in the near field.

Therefore, when it is determined based on the result of comparison in voltage value that the SIL 9 is in the far field, the comparator 42 supplies a select signal "0", for example, to the control signal selection circuit 45 which will thus be caused to select a control voltage value generated by the auxiliary controller 44. When the SIL 9 is in the near field, the comparator 42 supplies a select signal "1", for example, to the control signal selection circuit 45 which will thus select a control voltage value generated by the main controller 43.

The main controller 43 generates a control signal Vg that is a control voltage that will have the gap $\underline{d}$ approximate to the control target value P when the SIL 9 is in the near field. The main controller 43 includes a phase compensation filter etc. designed based on a frequency response, for example, and generates the control signal Vg on the basis of a deviation having been calculated by the adder 41.

The auxiliary controller 44 generates a control signal Vh which will have the SIL 9 of the optical head 7 approach the information recording surface of the disk-shaped optical recording medium 51 to a distance at which the SIL 9 will be in the near field.

The control signal selection circuit 45 outputs the control signal Vh generated by the auxiliary controller 44 or control signal Vg generated by the main controller 43 depending upon the select signal supplied from the comparator 42.

The system controller 46 controls the control system 20 as a whole. It puts each of the feedforward controller 30 and feedback controller 40 into operation to generate a control signal, and supplies the control signal to the actuator 11 of the optical head 7.

Next, an information reproducing apparatus as a second embodiment of the present invention will be described with reference to FIGS. 11 and 12. The information reproducing apparatus is generally indicated with a reference numeral 50A.

The information reproducing apparatus 50A reads predetermined information recorded in the disk-shaped optical recording medium 51. The information reproducing apparatus 50A is quite the same the information recorder 50 in control by the control system 20 etc. except that when reading information, the laser diode (LD) 3 is controlled by the APC (auto power controller) 2 to emit a light beam having a constant power and read signal is acquired from the return part of the laser beam projected to the disk-shaped optical recording medium 51. So, the same or similar functional elements in the information reproducing apparatus 50A as or to those in the information recorder 50 will be indicated with the same or similar reference numerals as or to those used in the explanation of the information recorder 50 and will not be explained any more. Also, the information reproducing apparatus 50A includes a mechanism to detect an axial-runout error amount for storage into the memory 31 thereof, having been explained above with reference to FIG. 5 or the like and which is quite the same as that in the information recorder 50.

Figure 11:
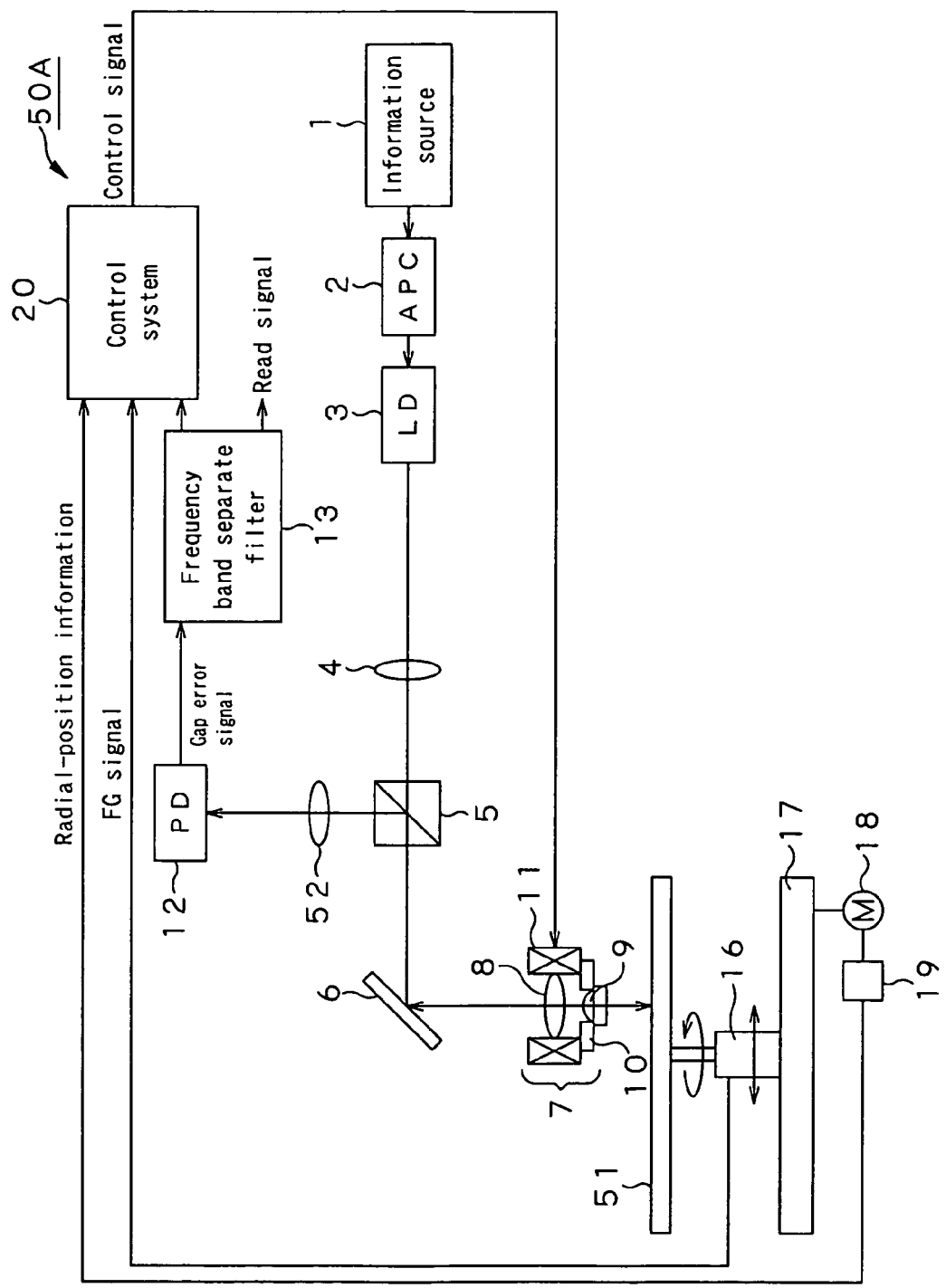
FIG. 11 is a block diagram of an information reproducing apparatus as a second embodiment of the present invention.
Figure 12:
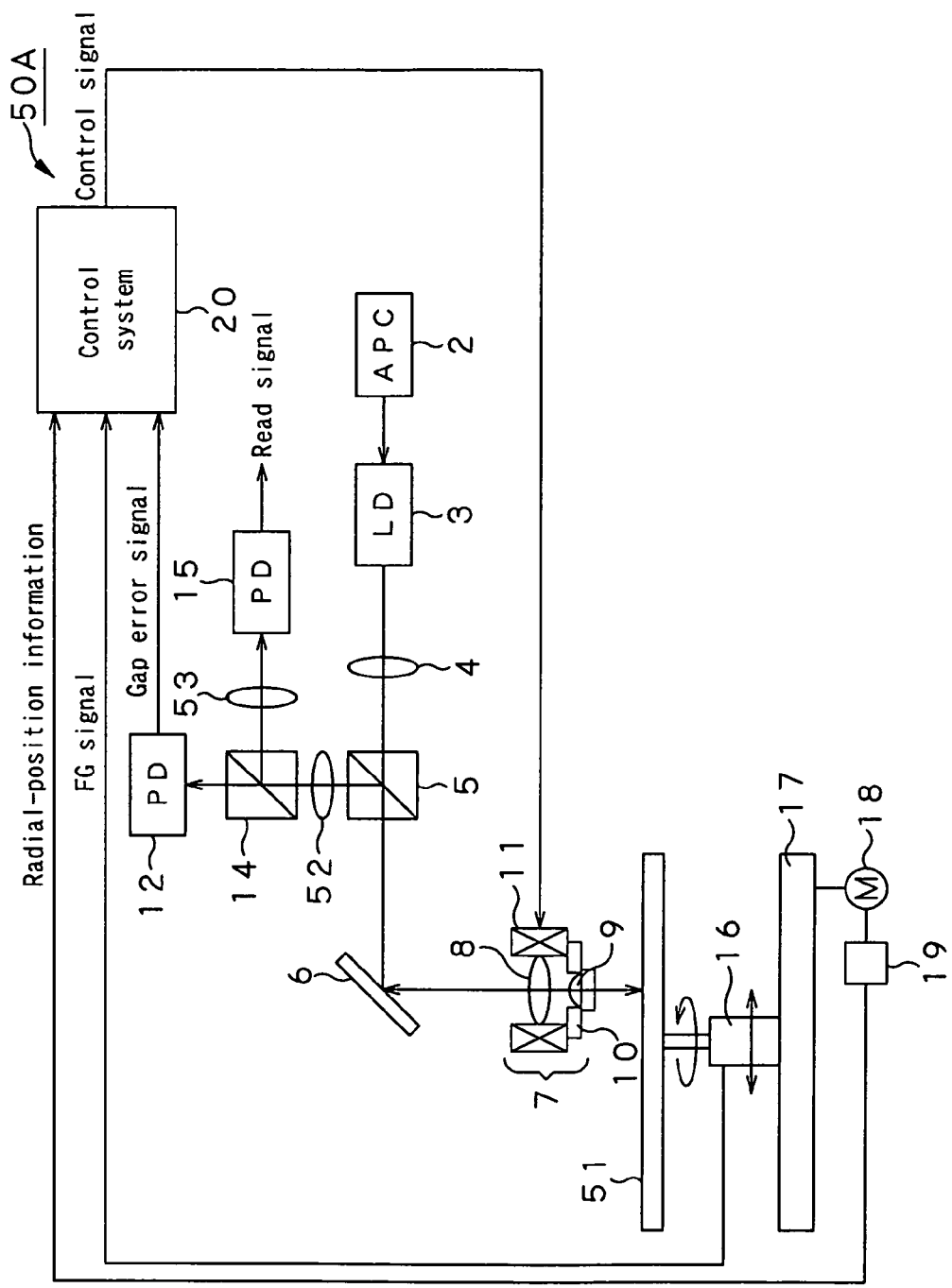
FIG. 12 is a block diagram of a variant of the information reproducing apparatus shown in FIG. 11 as the second embodiment of the present invention.

The read signal is acquired from the return light by using a difference in frequency band between a read signal shown in FIG. 11 and a gap error signal or by using a difference in polarization plane shown in FIG. 12.

For the method of acquiring a read signal on the basis of a difference in frequency band between the read signal and gap error signal, a frequency band separation filter 13 is provided downstream of the photodetector 12 as shown in FIG. 11. The frequency band separation filter 13 separates a read signal that is information to be read from the value of return light detected by the photodetector 12 and a gap error signal to be used in the gap control. The gap error signal is supplied to the control system 20 as in the information recorder 50.

For the method of acquiring a read signal on the basis of a difference in polarization plane, a polarization beam splitter 14 is provided between the condenser lens 52 and photodetector 12 as shown in FIG. 12. The return light condensed by the condenser lens 52 is allowed to pass by, or reflected by, the polarization beam splitter 14 depending upon the difference in polarization plane. The return light allowed to pass by the polarization beam splitter 14 is detected by the photodetector 12 as in the information recorder 50, and supplied as a gap error signal to the control system 20. Also, the return light reflected by the polarization beam splitter 14 passes through the condenser lens 53 and then is detected by the photodetector 12 to provide a read signal.

Figure 13:
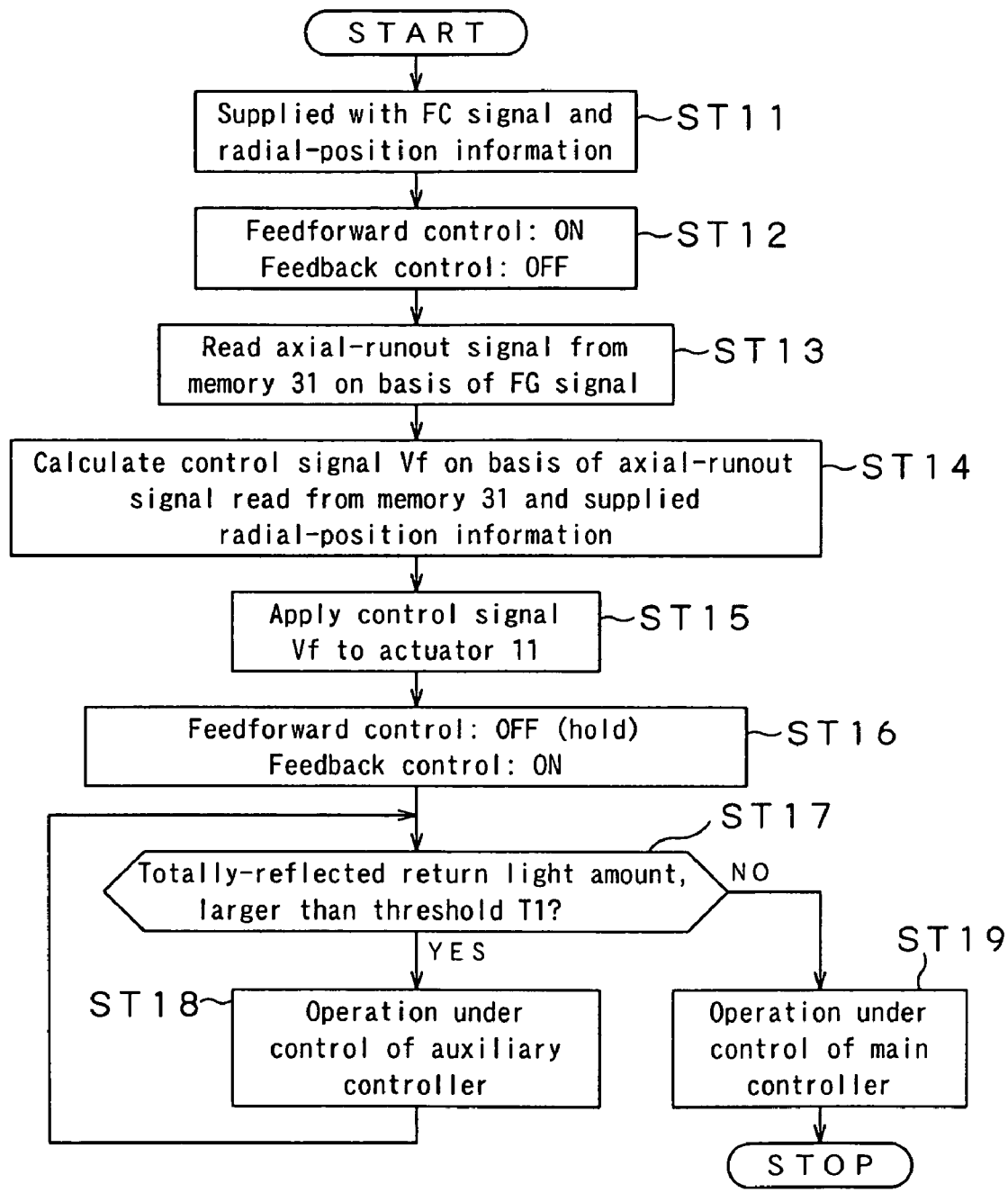
FIG. 13 shows a flow of operations made under the control of a control system included in the information recorder and reproducing apparatus according to the present invention.

Next, the control of the optical head 7 by the control system 20 will be explained with reference to the flow diagram shown in FIG. 13.

In step ST11, the feedforward controller 30 of the control system 20 is supplied with an FG signal and radial-position information.

In step ST12, the control system 20 controls the feedforward controller 30 to stop the feedback controller 40 from operating. Thus, the feedforward controller 30 makes feedforward control.

In step ST13, the gain controller 32 in the feedforward controller 30 reads an axial-runout error signal corresponding to the FG signal from the memory 31.

In step ST14, the gain controller 32 multiplies the axial-runout error signal read from the memory 31 by a predetermined gain calculated by the aforementioned equation (2) on the basis of the supplied radial-position information to generate a control signal Vf. The control signal Vf thus generated is supplied to the system controller 46.

In step ST15, the system controller 46 applies the control signal Vf generated by the feedforward controller 30 to the actuator 11 of the optical head 7 to make a feedforward control of the actuator 11.

In step ST16, the control system 20 controls the actuator 11 to hold the applied control signal Vf and continuously applies the control signal Vf to the actuator 11 while stopping the feedforward controller 30 from operating. The control system 20 stops the feedforward controller 30 from operating and then puts the feedback controller 40 into operation.

In step ST17, the feedback controller 40 controls the comparator 42 to make a comparison between the voltage value equivalent to a totally-reflected return light amount detected by the photodetector 12 and a threshold T1. When the voltage value equivalent to the totally-reflected return light amount is found larger the threshold T1, the comparator 42 will supply the control signal selection circuit 45 with a select signal for supplying the control signal Vh generated by the auxiliary controller 44 to the system controller 46, and shift the process to step ST18.

Also, when the threshold T1 is found larger than the voltage value, the comparator 42 will supply the control signal selection circuit 45 with a select signal for supplying the control signal Vg generated by the main controller 43 to the system controller 46, and shift the process to step ST19.

The voltage value equivalent to the totally-reflected return light amount, larger than the threshold T1 as above means that the SIL 9 is in the far field. The voltage value smaller than the threshold T1 means that the SIL 9 is in the near field.

In step ST18, the feedback controller 40 supplies the control signal Vh generated by the auxiliary controller 44 to the system controller 46 via the control signal selection circuit 45.

Also, the system controller 46 applies, to the actuator 11 of the optical head 7, the control signal Vh generated by the auxiliary controller 44 in addition to the control signal Vf generated by the feedforward controller 30 and applied to and held in the actuator 11. That is, the control signal V supplied to the actuator 11 of the optical head 7 will take a value as will be described below:

$$V=Vf+Vh$$

The operation in step ST18 will be repeatedly done until the totally-reflected return light amount detected by the photodetector 12 becomes smaller than the threshold T1 as judged in step ST17.

In step ST19, as the voltage value equivalent to the totally-reflected return light amount is smaller than the threshold TI, a control signal Vh' generated by the auxiliary controller 44 at that time will be held while the control signal Vg from the main controller 43 will be supplied from the control signal selection circuit 45. The control signal Vg is supplied to the system controller 46 via the control signal selection circuit 45.

The system controller 46 applies, to the actuator 11 of the optical head 7, the held control signal Vh' from the auxiliary controller 44 and control signal Vg generated by the main controller 43 in addition to the control signal Vf generated by the feedforward controller 30 and applied to and held in the actuator 11. That is, the control signal V supplied to the actuator 11 of the optical head 7 will take a value as will be described below:

$$V=Vf+(Vg+Vh')$$

Note that the control may be done only by the main controller 43 with holding the held voltage Vh' from the auxiliary controller 44 during the control or with copying the held voltage from the auxiliary controller 44 to the main controller 43 to release the held voltage Vh' when the main controller 43 is selected.

By the two steps of control by the two controllers, namely, the feedforward controller 30 and feedback controller 40 included in the control system 20, the totally-reflected return light amount detected by the photodetector 12 can be pulled to the control-target value P to control the gap $\underline{d}$ as a distance between the end face of the SIL 9 of the optical head 7 and information recording surface of the disk-shaped optical recording medium 51 to a constant value.

Figure 10:
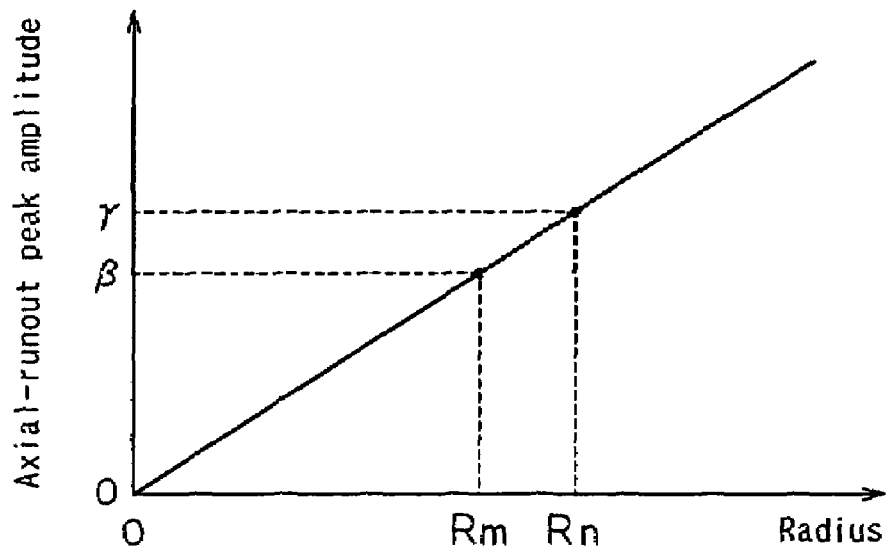
FIG. 10 is a second illustration of the relation between the radius of the optical recording medium in the information recorder and peak amplitude of the axial runout.
Figure 14:
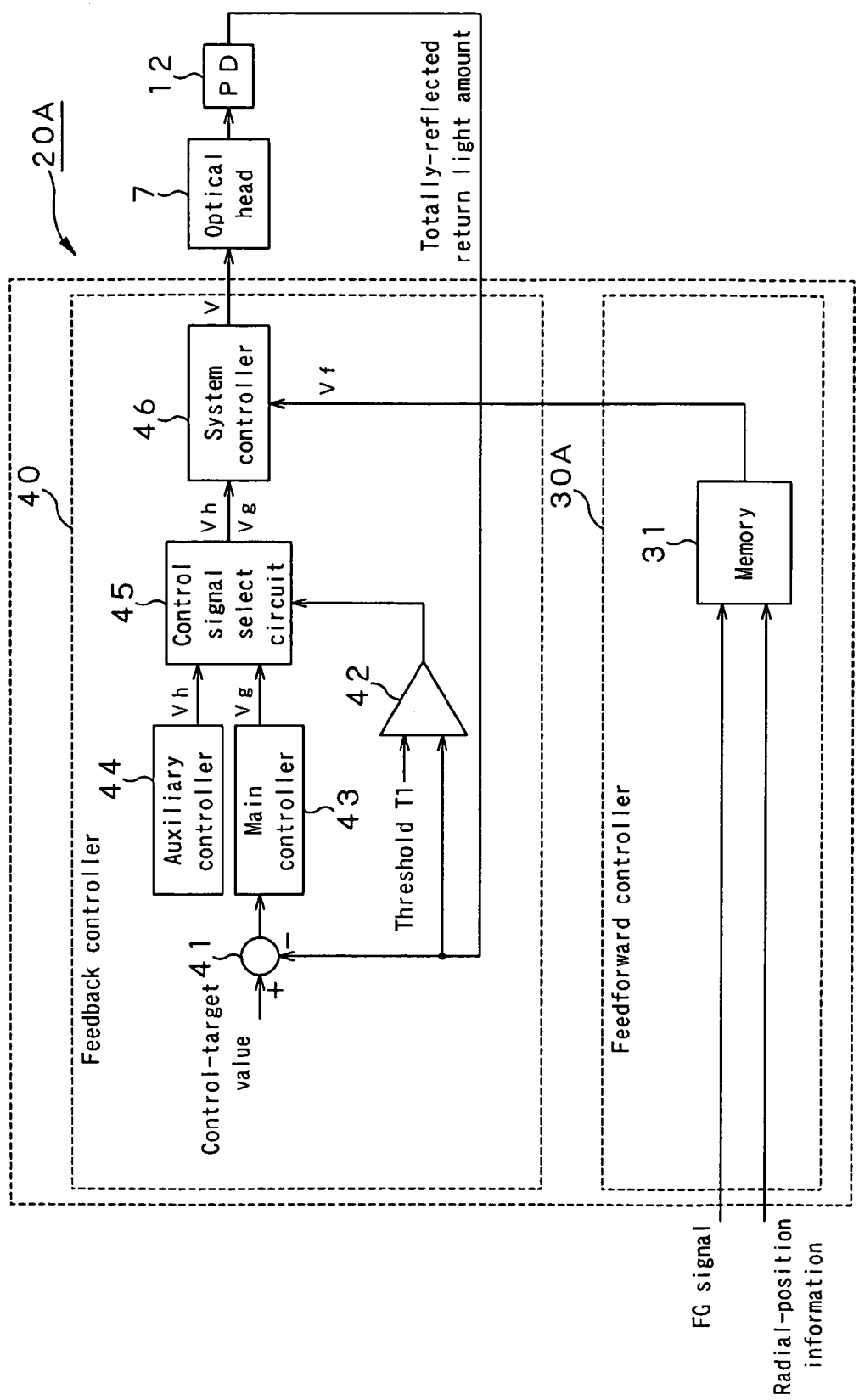
FIG. 14 is a block diagram of a variant of the control system shown in FIG. 13.

Also, when the disk-shaped optical recording medium 51 going to be loaded in the information recorder 50 or information reproducing apparatus 50A is not clamped only at the central portion thereof but at both the central portion and periphery or at the whole surface thereof, the radial position thereof and axial-runout peak amplitude value at the radial position will not be in any proportional relation with each other as shown in FIGS. 8 and 10. This problem can be solved by modifying the control system 20 of the information recorder 50 or information reproducing apparatus 50A to a control system 20A including a feedforward controller 30A as shown in FIG. 14, pre-acquiring axial-runout error signals as to the whole information recording surface of the disk-shaped optical recording medium 51 and storing radial-position information and FG signal as address signals into the memory 31.

The feedforward controller 30A reads the axial-runout error signal from the memory 31 on the basis of the radial-position information and FG signal to perform the feedforward control. The control by the feedforward controller 30 is quite the same as that as in the control system 20 shown in FIG. 4.

Therefore, in the information recorder 50 and information reproducing apparatus 50A, including the control systems 20 and 20', respectively, it is possible to control the gap $\underline{d}$ as a distance between the end face of the SIL 9 of the optical head 7 and the information recording surface of the disk-shaped optical recording medium 51 to a constant value.

Note that in the information recorder 50 and information reproducing apparatus 50A according to the present invention, the feed base 17 is moved by the feed motor 18 radially of the disk-shaped optical recording medium 51 set in place to attain an inter-track movement on the disk-shaped optical recording medium 51, and radial-position information is acquired by the potentiometer 19 that detects the angle of rotation of the feed motor 18.

In the information recorder 50 and information reproducing apparatus 50A, the laser diode 3, collimator lens 4, beam splitter 5, mirror 6, optical head 7, condenser lens 52 and photodetector 12 form together an optical pickup. The optical pickup may be moved between tracks on the disk-shaped optical recording medium 51. In such a case, a potentiometer may be provided on a linear motor that moves the optical pickup between tracks to acquire radial-position information.

Figure 15:
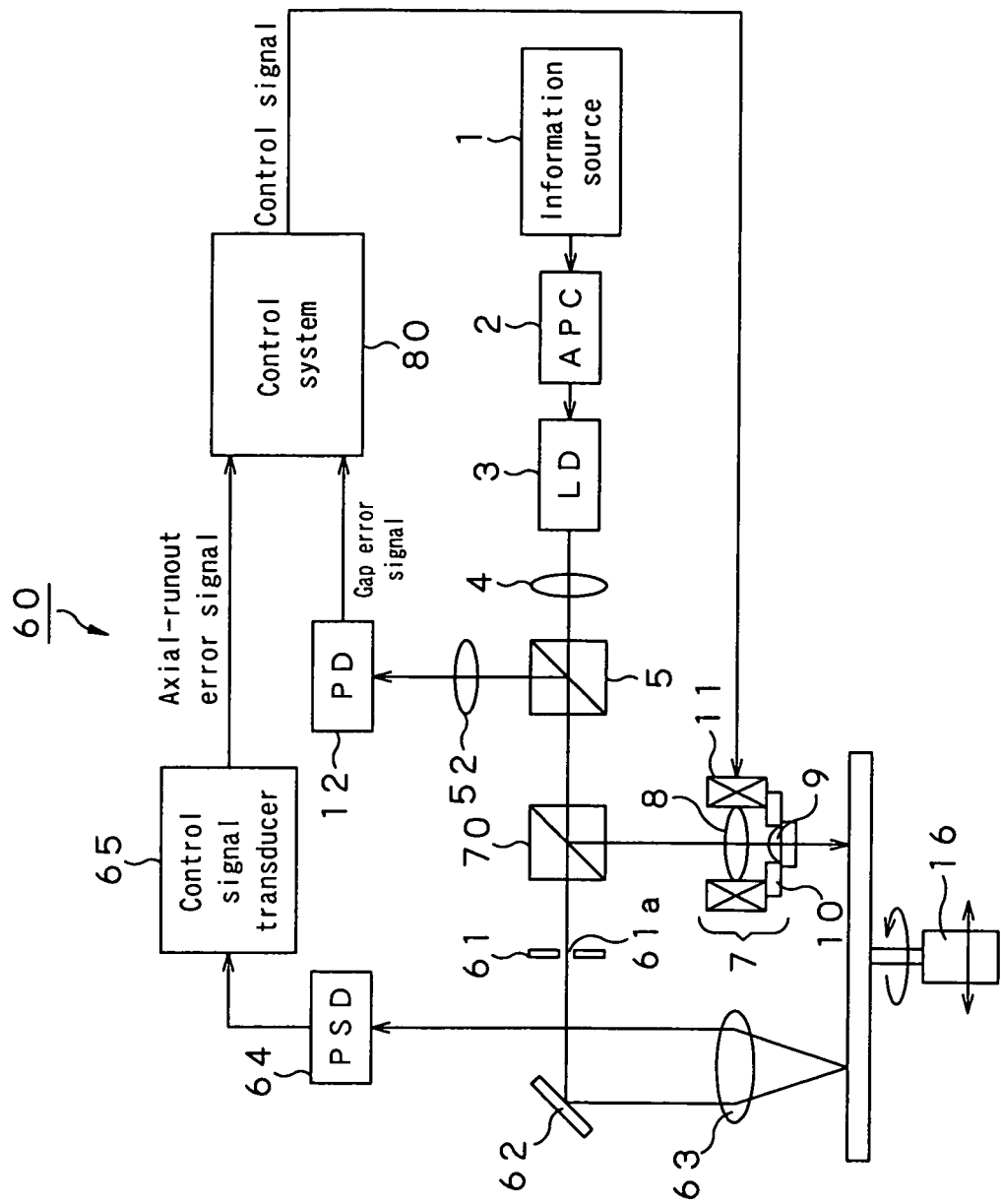
FIG. 15 is a block diagram of an information recorder as a third embodiment of the present invention.

Also, the present invention is applied to an information recorder shown in FIG. 15. This information recorder is a third embodiment of the present invention, and generally indicated with a reference numeral 60. Similar to the information recorder 50 having been illustrated and described in the foregoing, the information recorder 60 records information to a removable disk-shaped optical recording medium 51 set in place by projecting evanescent light detected in the near field to the disk-shaped optical recording medium 51.

The information recorder 60 includes a polarization beam splitter 70 provided in place of the mirror 6 of the information recorder 50 shown in FIG. 1, a mechanism to detect axial runout of the disk-shaped optical recording medium 51 shown in FIG. 5, and a control system 80 provided in place of the control system 20 in the information recorder 50.

The objective lens 8 and SIL 9 of the optical head 7 are fixed in relation to each other, and also the objective lens 63 and the objective lens 8 and SIL 9 of the optical head 7 are fixed in relation to each other. Thus, only servo control with an axial-runout error signal detected by the objective lens 63 permits the objective lens 63 as well as the objective lens 8 and SIL 9 to follow the information recording surface of the disk-shaped optical recording medium 51.

The functional elements in the information reproducing apparatus 60 except for the polarization beam splitter 70 and control system 80 will be indicated with the same or similar reference numerals as or to those used in the explanation of the information recorder 50, made with reference to FIGS. 1 and 5, and hence will not be explained any more.

A light beam emitted from the laser diode 3 and passed through the beam splitter 5 via the collimator lens 4 is incident upon the polarization beam splitter 70.

The polarization beam splitter 70 allows the light beam incident thereupon from the beam splitter 5 to pass by, or reflects the light beam depending upon the difference in polarized component. For example, the polarization beam splitter 70 reflects P-polarized component of the light beam while allowing S-polarized component to pass by. More specifically, the polarization beam splitter 70 reflects the light beam incident thereupon from the beam splitter 5 to the optical head 7 while allowing the light beam incident thereupon from the beam splitter 5 to pass by and go to the objective lens 63 via the pin hole in the collimator lens 61 and mirror 62.

The return part of the light beam supplied to the optical head 7 and incident upon the information recording surface of the disk-shaped optical recording medium 51 is reflected by the polarization beam splitter 70 and also by the beam splitter 5, detected by the photodetector 12 via the condenser lens 52 and supplied as a gap error signal to the control system 80.

The return part of the light beam supplied to the objective lens 63 and then upon the information recording surface of the disk-shaped optical recording medium 51 is detected by the position-sensitive detector 64, transduced into an axial-runout error signal by the control signal transducer 65 and the axial-runout error signal is supplied to the control system 80.

Figure 16:
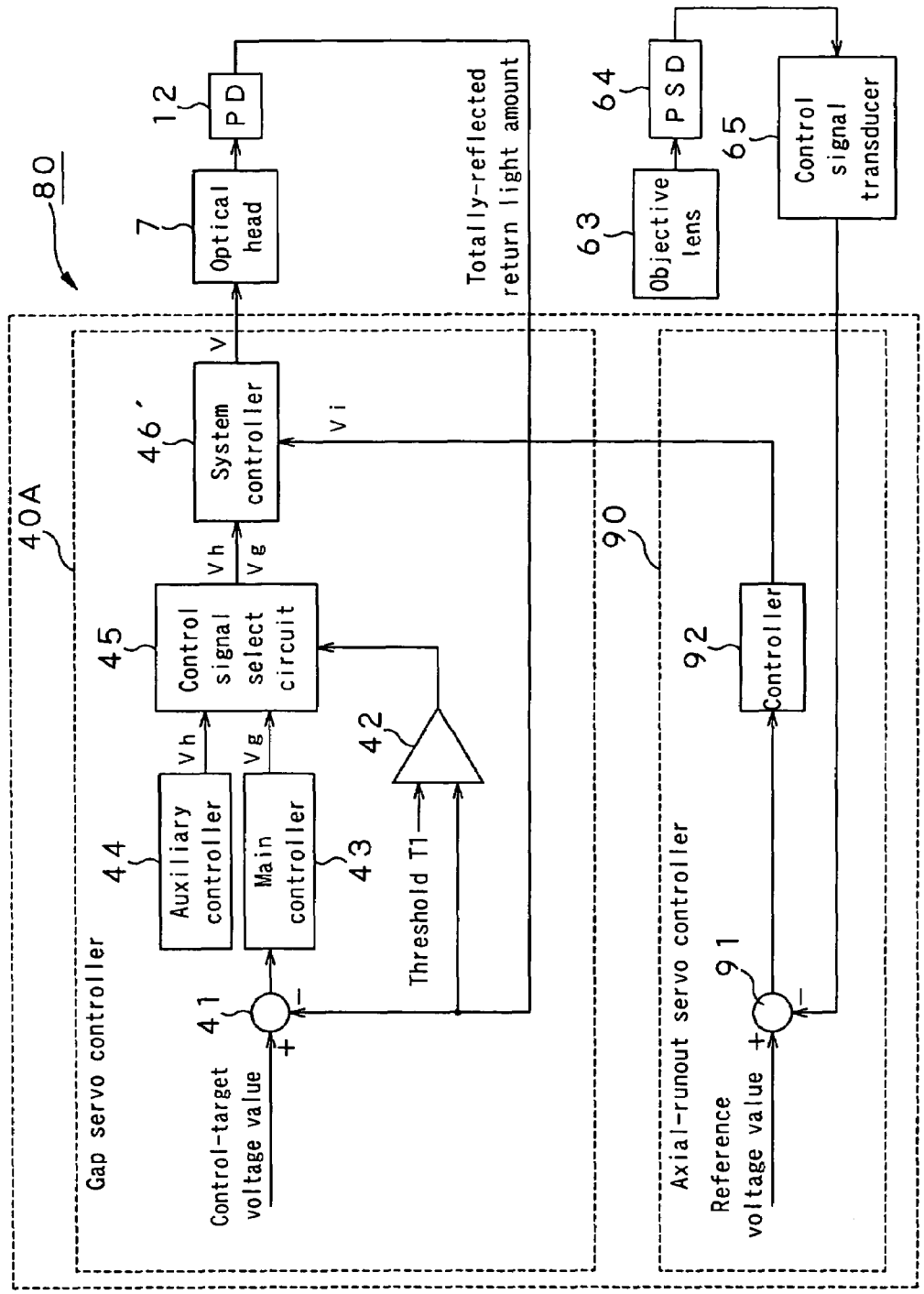
FIG. 16 is a block diagram of a control system in the information recorder shown in FIG. 15.

As shown in FIG. 16, the control system 80 includes an axial-runout servo controller 90 to control the gap between the SIL 9 and information recording surface of the disk-shape recording medium 51 by moving the optical head 7 on the basis of the axial-runout error signal or totally-reflected return right amount, and a gap servo controller 40A.

The axial-runout servo controller 90 includes an adder 91 and controller 92.

The adder 91 calculates a deviation of the voltage value of an axial-runout error signal, resulted from detection of an axial runout by the position-sensitive detector 64 and conversion of the axial-runout error signal by the control signal transducer 65, from a standard voltage value of the axial-runout error signal which will be a control-target value Q, and supplies it to the controller 92.

Figure 17:
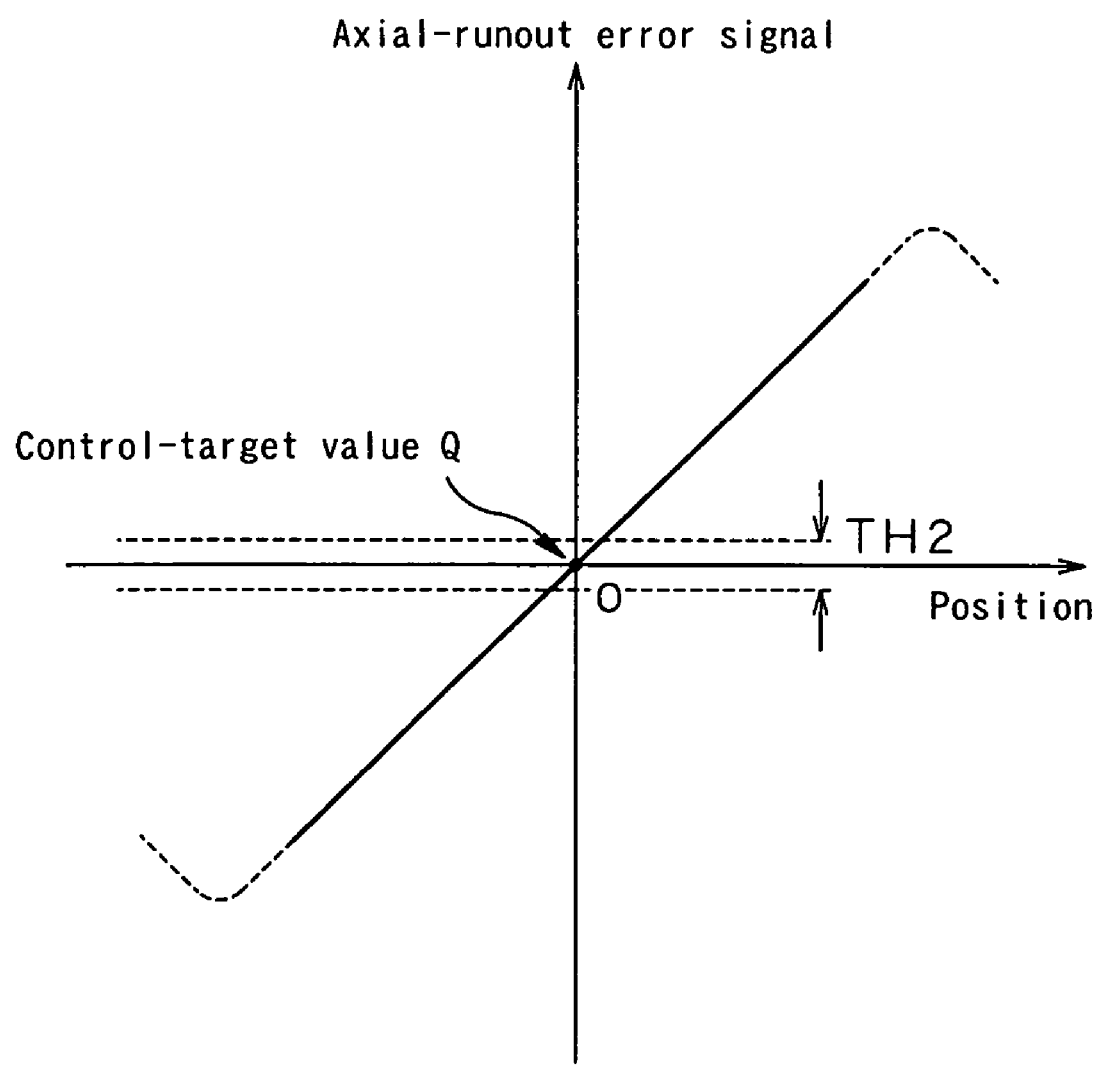
FIG. 17 explains a threshold set in the control system included in the information recorder.

The controller 92 generates a control signal Vi on the basis of the axial-runout error signal supplied from the adder 91 and supplies it to the system controller 46A. Also, the controller 92 makes a comparison between the absolute value of the axial-runout error signal supplied from the adder 91 and a threshold TH2, and supplies the result of comparison to the system controller 46A. The threshold TH2 is an axial-runout error signal detected when the end face of the SIL 9 is at the boundary between the far and near fields. FIG. 17 shows the threshold TH2.

When the axial-runout error signal supplied from the adder 91 is larger than the threshold TH2, the control based on the axial-runout error signal is compensated. In case the axial-runout error signal supplied from the adder 91 is smaller than the threshold TH2, the gap servo controller 40A can make a control using the totally-reflected return light amount.

The gap servo controller 40A is quite the same in configuration as the feedback controller 40 except that it includes the system controller 46A which is supplied with the control signal Vi from the controller 92 of the axial-runout servo controller 90 in place of the system controller 46A included in the feedback controller 40.

The totally-reflected return light amount detected by the photodetector 12, that is, a voltage value equivalent to the totally-reflected return light amount, is supplied to the adder 41 and comparator 42.

Depending upon the result of comparison, made by the comparator 42, between the threshold TH1 based on which it is judged whether the end face of the SIL 9 is in the far or near field and the voltage equivalent to the totally-reflected return light amount, either the main or auxiliary controller 43 or 44 is selected, and a control voltage generated by the controller thus selected is supplied to the system controller 46A.

When the main controller 43 is selected, the near-field feedback control using the voltage value equivalent to the totally-reflected return-light amount is effected. In case the auxiliary controller 44 is selected, it means that the SIL 9 is in the near field and the optical head 7 is slowly moved to near the near field.

The system controller 46A is to totally control the control system 80. It controls each of the axial-runout servo controller 90 and gap servo controller 40A to generate a control signal, and the control signal thus generated by each of the controllers is appropriately supplied to the actuator 11 of the optical head 7. Depending upon the result of comparison between the axial-runout error signal from the controller 92 and threshold TH2, the system controller 64A controls the axial-runout servo controller 90 to start or stop its servo control and the gap servo controller 40A to start or stop its servo control.

If the axial-runout error signal from the adder 91 is larger than the threshold TH2, the system controller 46A will stop the gap servo controller 40A from operating while putting the axial-runout servo controller 90 into operation. When the axial-runout error signal is smaller than the threshold TH2, the system controller 46A will put the gap servo controller 40A into operation while stopping the axial-runout servo controller 90 from operating.

Next, the present invention will be described concerning an information reproducing apparatus as a fourth embodiment thereof with reference to FIGS. 18 and 19. The information reproducing apparatus is generally indicated with a reference numeral 60A.

The information reproducing apparatus 60A reads predetermined information recorded in the disk-shaped optical recording medium 51. The information reproducing apparatus 60A is quite the same in control by the control system 80 etc. as the information recorder 60 except that when reading information, the laser diode 3 is controlled by the APC 2 to emit laser light having a constant power and a read signal is acquired from the return part of the light beam incident upon the disk-shaped optical recording medium 51. So, the same or similar functional elements thereof as or to those in the information recorder 60 will be indicated with the same or similar reference numerals as or to those used in the illustration and explanation of the information recorder 60 and will not be described any more.

Figure 18:
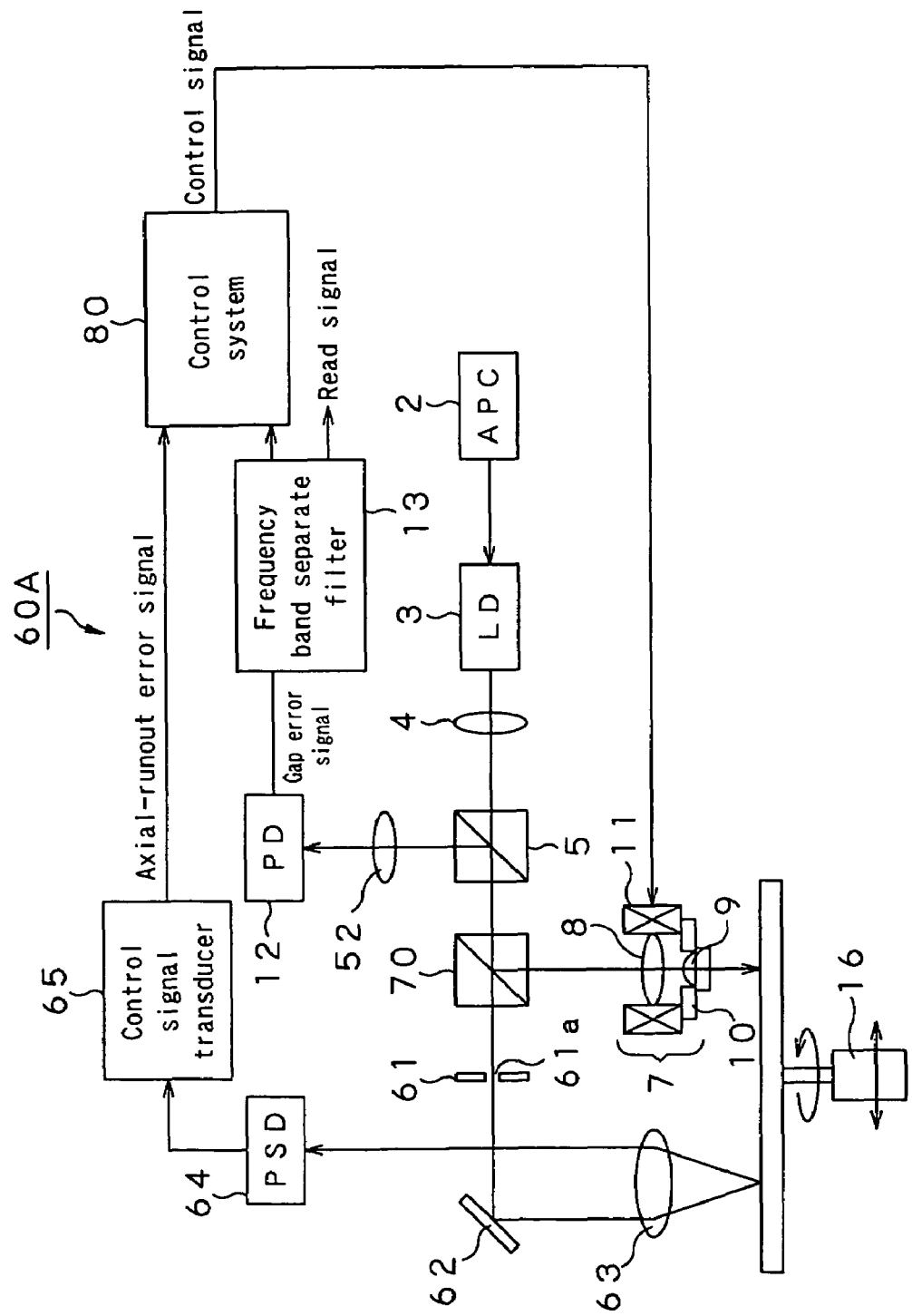
FIG. 18 is a block diagram of an information reproducing apparatus as a fourth embodiment of the present invention.
Figure 19:
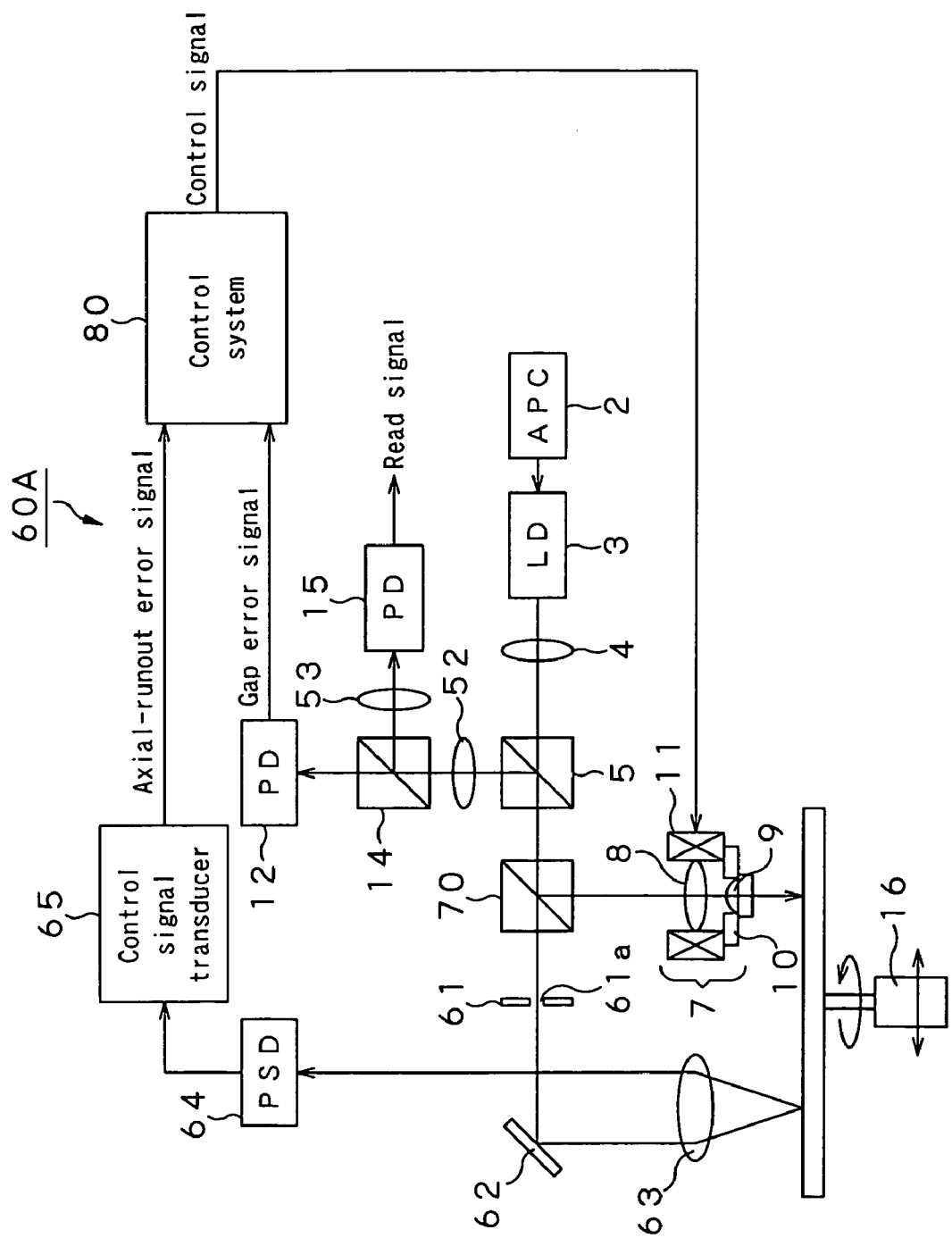
FIG. 19 is also a block diagram of a variant of the information reproducing apparatus in FIG. 18.

The read signal is acquired from the return light by using a difference in frequency band between a read signal and a gap error signal as shown in FIG. 18 or by using a difference in polarization plane as shown in FIG. 19.

For the method of acquiring a read signal on the basis of a difference in frequency band between a read signal and gap error signal, a frequency band separation filter 13 is provided downstream of the photodetector 12 as shown in FIG. 18. The frequency band separation filter 13 separates a read signal that is information to be read from the value of return light detected by the photodetector 12 and a gap error signal to be used in the gap control. The gap error signal is supplied to the control system 80 as in the information recorder 60.

For the method of acquiring a read signal on the basis of a difference in polarization plane, a polarization beam splitter 14 is provided between the condenser lens 52 and photodetector 12 as shown in FIG. 19. The return light condensed by the condenser lens 52 is allowed to pass by, or reflected by, the polarization beam splitter 14 depending upon the difference in polarization plane. The return light allowed to pass by the polarization beam splitter 14 is detected by the photodetector 12 as in the information recorder 50, and supplied as a gap error signal to the control system 80. Also, the return light reflected by the polarization beam splitter 14 passes is detected by the photodetector 15 to provide a read signal.

Figure 20:
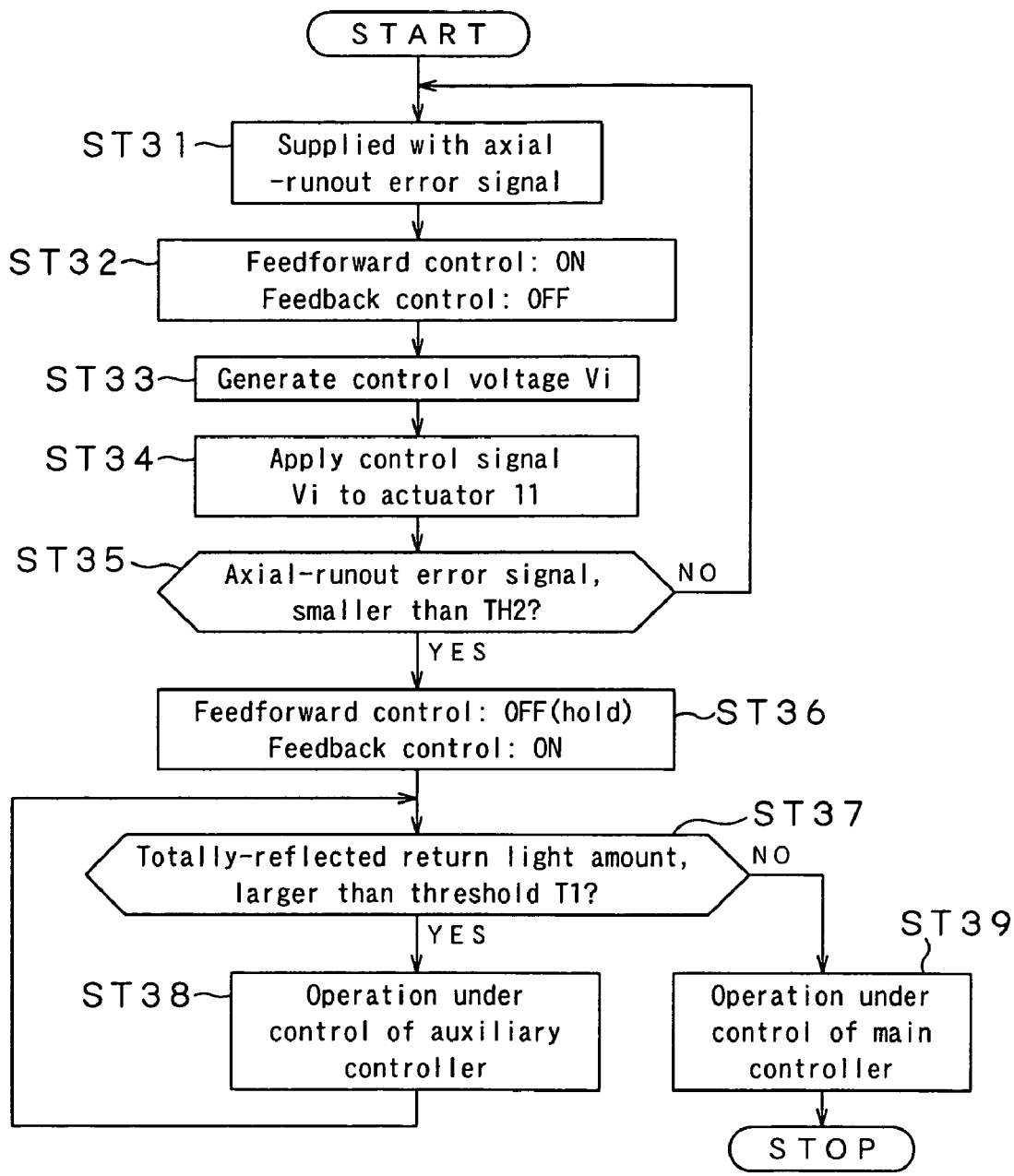
FIG. 20 shows a flow of operations made under the control of a control system included in the information recorder and information reproducing apparatus according to the present invention.

Next, the control of the optical head 7 by the control system 80 will be explained with reference to the flow diagram shown in FIG. 20.

In step ST31, the return part of the light beam emitted from the laser diode (LD) 3, irradiated to the information recording surface of the disk-shaped optical recording medium 51 is detected by the position-sensitive detector 64, and an axial-runout error signal resulted from conversion into a voltage value by the control signal transducer 65 by the aforementioned yawing method is supplied to the axial-runout controller 90 of the control system 80.

In step ST32, the control system 80 controls the axial-runout servo controller 90 to stop the gap servo controller 40A from operating. Thus, the axial-runout servo controller 90 starts a servo control.

In step ST33, the controller 92 generates a control voltage Vi which makes an axial-runout error signal calculated by the adder 91 coincide with the control-target voltage value, and supplies it to the system controller 46A.

In step ST34, the system controller 46A applies the control signal Vi generated by the axial-runout servo controller 90 to the actuator 11 of the optical head 7 to make an axial-runout servo control.

In step ST35, the control system 80 judges whether the absolute value of the axial-runout error signal has become smaller than a threshold TH2. If the axial-runout error signal has become smaller than the threshold TH2, the process goes to step ST36. When the threshold TH2 is larger than the axial-runout error signal, the process is returned to step ST31.

In step ST36, the control system 80 controls the actuator 11 to hold the applied control signal Vi and continuously applies the control signal Vi to the actuator 11 while stopping the axial-runout servo controller 90 from operating. The control system 20 stops the axial-runout servo controller 90 from operating and then puts the gap servo controller 40A into operation.

In step ST37, the gap servo controller 40A controls the comparator 42 to make a comparison between the voltage value equivalent to a totally-reflected return light amount detected by the photodetector 12 and a threshold T1. When the voltage value equivalent to the totally-reflected return light amount is found larger the threshold T1, the comparator 42 will supply the control signal selection circuit 45 with a select signal for supplying the control signal Vh generated by the auxiliary controller 44 to the system controller 46A, and shift the process to step ST38.

Also, when the threshold T1 is found larger than the voltage value, the comparator 42 will supply the control signal selection circuit 45 with a select signal for supplying the control signal Vg generated by the main controller 43 to the system controller 46A, and shift the process to step ST39.

The voltage value equivalent to the totally-reflected return light amount, larger than the threshold T1 as above means that the SIL 9 is in the far field. The voltage value smaller than the threshold T1 means that the SIL 9 is in the near field.

In step ST38, the gap servo controller 40A supplies the control signal Vh generated by the auxiliary controller 44 to the system controller 46A via the control signal selection circuit 45.

Also, the system controller 46A applies, to the actuator 11 of the optical head 7, the control signal Vh generated by the auxiliary controller 44 in addition to the control signal Vi generated by the axial-runout servo controller 90 and applied to and held in the actuator 11. That is, the control signal V supplied to the actuator 11 of the optical head 7 will take a value as will be described below:

$$V = Vi + Vh$$

The operation in step ST38 will be repeatedly done until the totally-reflected return light amount detected by the photodetector 12 becomes smaller than the threshold T1 as judged in step ST37.

In step ST39, as the voltage value equivalent to the totally-reflected return light amount is smaller than the threshold T1, a control signal Vh' generated by the auxiliary controller 44 at that time will be held while the control signal Vg from the main controller 43 will be supplied from the control signal selection circuit 45. The control signal Vg is supplied to the system controller 46A via the control signal selection circuit 45.

The system controller 46A applies, to the actuator 11 of the optical head 7, the held control signal Vh' from the auxiliary controller 44 and control signal Vg generated by the main controller 43 in addition to the control signal Vi generated by the axial-runout servo controller 90 and applied to and held in the actuator 11. That is, the control signal V supplied to the actuator 11 of the optical head 7 will take a value as will be described below:

$$V = Vi + (Vg + Vh')$$

Note that the control may be done only by the main controller 43 with holding the held voltage Vh' from the auxiliary controller 44 during the control or with copying the held voltage from the auxiliary controller 44 to the main controller 43 to release the held voltage Vh' from the auxiliary controller 44 when the main controller 43 is selected.

By the two steps of control by the two controllers, namely, the axial-runout servo controller 90 and gap servo controller 40A included in the control system 80, the totally-reflected return light amount detected by the photodetector 12 can be pulled to the control-target value P to control the gap $\underline{d}$ as a distance between the end face of the SIL 9 of the optical head 7 and information recording surface of the disk-shaped optical recording medium 51 to a constant value.

Next, there will be illustrated and explained a rotation control system to control the operation of the spindle motor 16 included in the information recorder 50 as the first embodiment of the present invention, information reproducing apparatus 50A as the second embodiment, information recorder 60 as the third embodiment and information reproducing apparatus 60A as the fourth embodiment.

Figure 21:
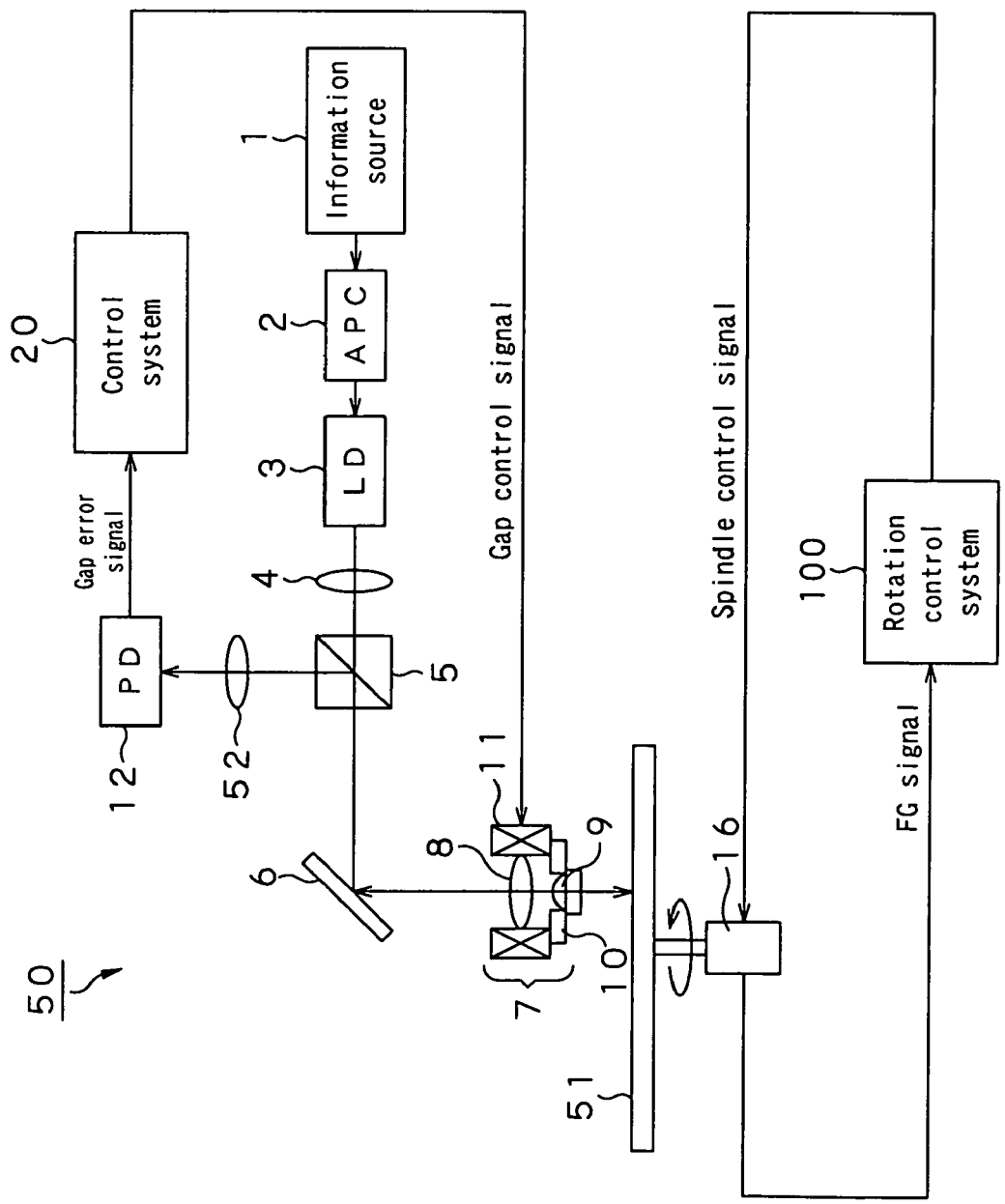
FIG. 21 is a block diagram of a rotation control system provided in the information recorder according to the present invention.

The rotation control systems in all the information recorder 50, information reproducing apparatus 50A, information recorder 60 and information reproducing apparatus 60A are of the same configuration. So, description will be made using the rotation control system in the information recorder 50 as the first embodiment having been described with reference to FIG. 21.

Figure 22:
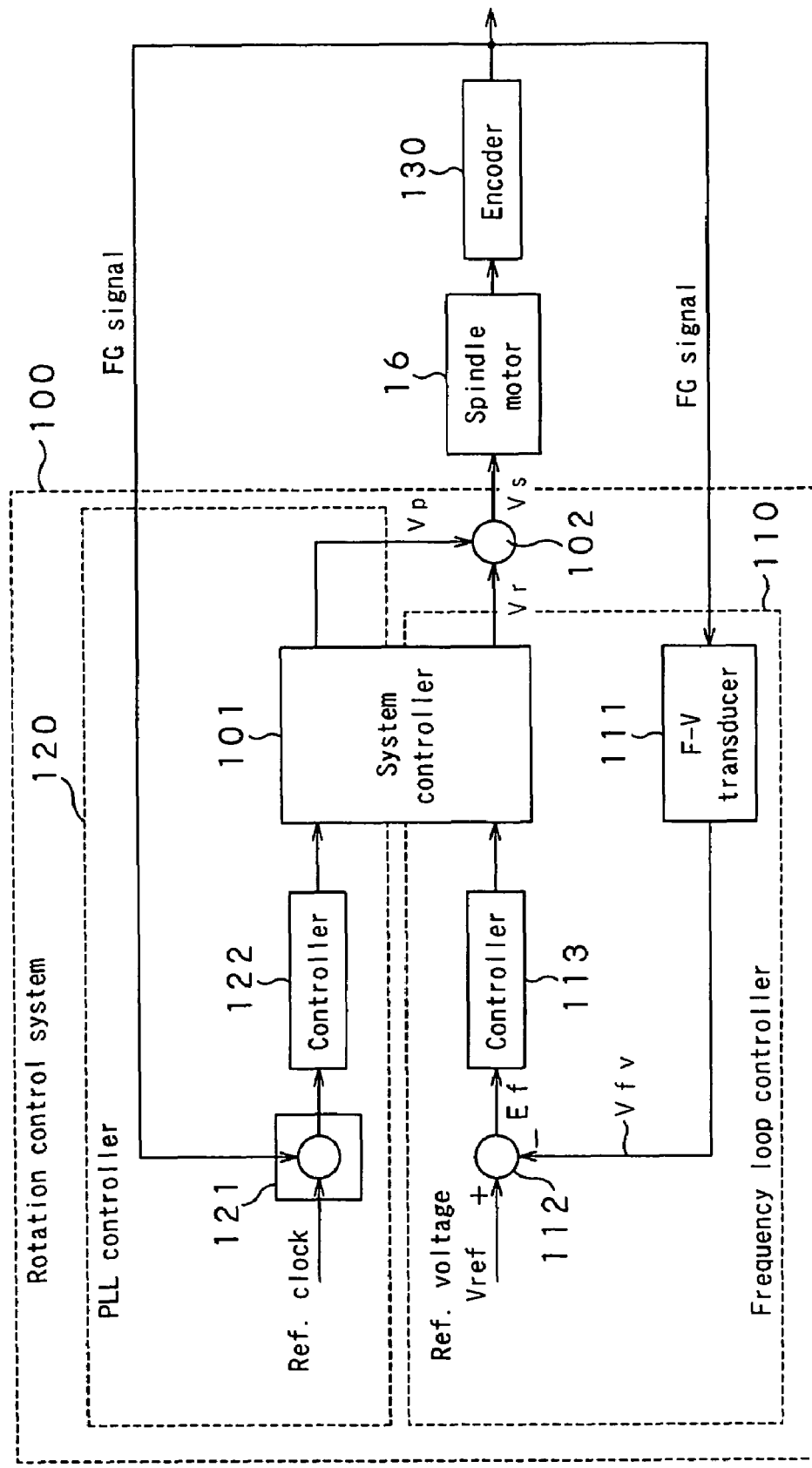
FIG. 22 is also a block diagram of the rotation control system.

As shown in FIG. 22, the rotation control system, generally indicated with a reference numeral 100, includes a frequency loop controller 110, PLL controller 120, system controller to totally control the frequency loop controller 110 and PLL controller 120, and an adder to add together control signals generated by the frequency lop controller 110 and PLL controller 120, respectively. The rotation control system 100 stabilizes the rotation of the spindle motor 16 by means of the frequency loop controller 110 and PLL controller 120.

The frequency loop controller 110 includes an F-to-V transducer 111, adder 112 and controller 113. The frequency loop controller 110 is put into operation before the PLL controller 120 makes a control based on the result of comparison, and locks the velocity of rotation of the spindle motor 16.

The F-to-V transducer 111 transduces the FG signal supplied from the encoder 130 into a voltage Vfv, and supplies it to the adder 112.

The adder 112 adds a reference voltage Vref and a negative-signed value of the voltage Vfv supplied from the F-to-V transducer 111 to provide a frequency loop error signal Ef.

The controller 113 generates a frequency loop control voltage Vr to cancel the frequency loop error signal Ef calculated by the adder 112, and supplies it to the spindle motor 16 via the system controller 101 and adder 102.

The PLL controller 120 includes a phase comparator 121 and controller 122. The PLL controller 120 is put into operation by the frequency loop controller 110 after the velocity of rotation of the spindle motor 16 is locked, and locks the phase of the spindle motor 16 on the basis of the result of comparison.

The phase comparator 121 makes a comparison between the phase of the FG signal supplied from the encoder 130 and that of the reference clock as a signal equal in frequency to the FG signal to determine a phase difference (phase error signal Pe).

The controller 122 generates a control voltage Vp to rotate the spindle motor 16 so that the phase error signal Pe determined by the phase comparator 121 will be zero, and supplies it to the spindle motor 16 via the system controller 101 and adder 102.

When the control is passed to the PLL controller 120, the frequency-control voltage Vr generated by the frequency loop controller 110 is held and continuously applied to the spindle motor 16. Therefore, because the control voltage Vp is generated by the PLL controller 120, a spindle motor control voltage Vs to finally be applied to the spindle motor 16 will be Vs=Vr+Vp.

Figure 23:
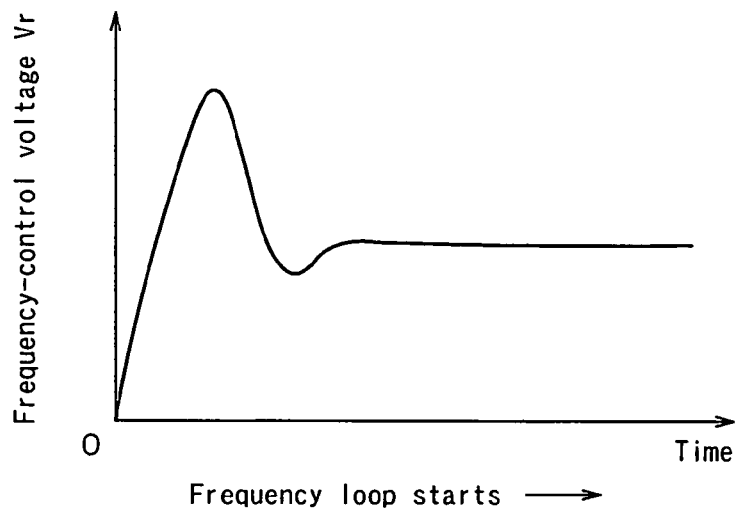
FIG. 23 shows the characteristic curve of a frequency-control voltage produced in a frequency loop controller.

When the frequency loop is controlled by the aforementioned frequency loop controller 110 for a predetermined velocity of rotation of the spindle motor 16, the frequency-control voltage Vr will show a characteristic shown in FIG. 23 as the time elapses.

Just after the frequency loop control is started, the spindle motor 16 will require a higher voltage than necessary in the steady state because of an inertia for continuation of the stationary state. Therefore, once the spindle motor 16 is put into run, the above-mentioned voltage will be an excessive one because of an inertia for continuation of the rotating state and overshoot as shown in FIG. 23.

The excessive frequency-control voltage Vr supplied for initial rotation of the disk-shaped optical recording medium 51 will cause the disk-shaped optical recording medium 51 to rapidly be accelerated. Thus, the axis of rotation of the disk-shaped optical recording medium 51 will sway and oscillate, resulting in an axial runout of the information recording surface.

Figure 24:
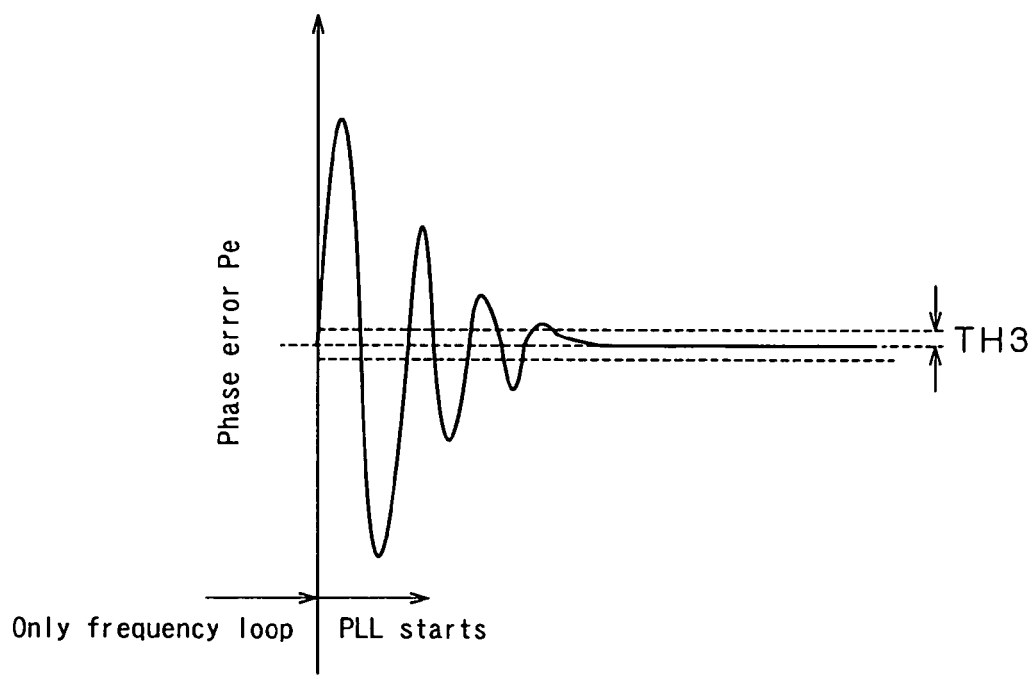
FIG. 24 shows the characteristic curve of an phase error signal in a PLL (phase-locked loop) controller.

Also, when a PLL control is effected by the PLL controller 120, the phase error Pe (phase difference) shows the characteristic as shown in FIG. 24 as the time elapses. The spindle motor 16 is applied with a control voltage corresponding to the phase error Pe. Therefore, when the phase error Pe varies largely before the steady state is attained, the rotating velocity of the spindle motor 16 will rapidly be accelerated or decelerated, the disk-shaped optical recording medium 51 will be caused to have a sway of the axial of rotation and thus oscillate as in the frequency loop control, resulting in an axial runout of the information recording surface.

In an information recording or reproducing apparatus using evanescent light with an SIL being in the near field, such as the information recorder 50, information reproducing apparatus 50A, information recorder 60 or information reproducing apparatus 60A, since the gap between the SIL 9 and information recording surface of the disk-shaped optical recording medium 51 is on the order of several tens nanometers, the axial runout caused under the control of the rotation control system 100 will act as a large disturbance.

Therefore, the control operation of the control system 20 included in each of the information recorder 50 and information reproducing apparatus 50A as well as that of the control system 80 included in each of the information recorder 60 and information reproducing apparatus 60A should be started when the axial runout caused under the control of the rotation control system 100 over the rotation of the spindle motor 16 has become so small as not to influence the gap servo control.

On this account, there is set a threshold TH3 indicative of a phase error Pe with which the axial runout caused under the control of the rotation control system 100 will not have any influence on the gap servo control when the SIL 9 is in the near field as shown in FIG. 24.

Thus, by putting the control system 20 included in the information recorder 50 or information reproducing apparatus 50A or the control system 80 included in the information recorder 60 or information reproducing apparatus 60A when the phase error Pe is controlled to the threshold TH3 under the PLL control of the PLL controller 120, it is possible to prevent any axial runout from taking place in the operation control by the rotation control system 100.

Figure 25:
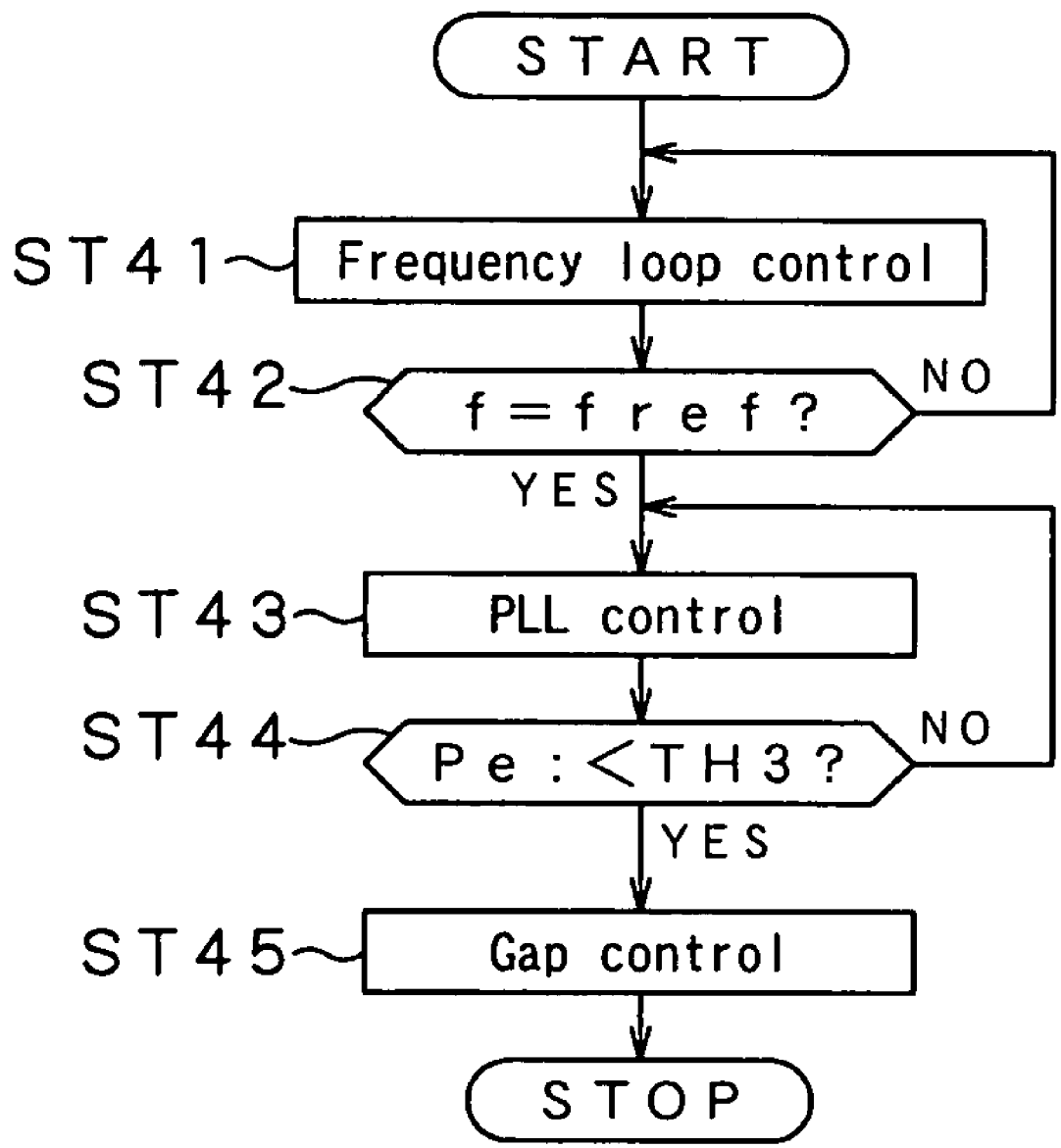
FIG. 25 is a flow of operations made under the control of the rotation control system and the operating timing of the rotation control system.

The timing in which the control by the rotation control system 100 and that by the control system 20 or 80 are carried out will be explained below with reference to the timing diagram in FIG. 25.

First, the rotation of the spindle motor 16 is controlled by the rotation control system 100. In step ST41, the system controller 101 controls the frequency loop controller 110 to make a frequency loop control until the spindle motor 16 arrives at a predetermined velocity, and judges in step ST42 whether the spindle motor 16 has arrived at the predetermined velocity.

When the spindle motor 16 has arrived at the predetermined velocity, the system controller 101 holds the frequency loop control voltage Vr to put the PLL controller 120 into operation in step ST42. If the spindle motor 16 has not arrived at the predetermined velocity, the system controller 101 returns to step ST41 where it will repeat the step ST41 and subsequent steps.

Next in step ST44, the system controller 101 judges whether the phase error Pe is smaller than the threshold hold TH3. If the phase error Pe is not yet smaller than the threshold hold TH3, the system controller 101 controls the PLL controller 120 to make a PLL control until the phase error Pe becomes smaller than the preset threshold TH3. Then, the system controller 101 puts the aforementioned control system 20 into operation to start a control in step ST45.

In an information recording or reproducing apparatus using evanescent light detected in the near field, such as the information recorder 50 as the first embodiment of the present invention, information reproducing apparatus 50A as the second embodiment, information recorder 60 as the third embodiment or information reproducing apparatus 60A as the fourth embodiment, the control system 20 or 80 is made to make a control after an axial runout caused by the rotation control system 100 will not have any influence on the gap servo control.

Note that the arrangement of the beam splitter and collimator lens, etc. in each of the information recorders as the first and third embodiments of the present invention may appropriately be different from that in each of the information reproducing apparatuses as the second and fourth embodiments.

Next, the present invention will be described below concerning an information recorder a fifth embodiment thereof with reference to FIG. 26. The information recorder is generally indicated with a reference numeral 260.

The information recorder 260 uses a removable disk-shaped optical recording medium 200 as the recording medium. It includes a near-field recording system in which evanescent light detected in the near field is irradiated to the information recording medium of the loaded disk-shaped optical recording medium 200 to write information to the recording medium 200, and also a far-field recording system in which a light beam emitted from a light source is irradiated to the disk-shaped optical recording medium 200 to write information to the recording medium 200.

First, the near-field recording system will be illustrated and explained.

The information recorder 260 includes, as components of the near-field recording system, an information source 201 to supply information for recording to the disk-shaped optical recording medium 200, APC (auto power controller) 202, laser diode (LD) 203, collimator lens 204, beam splitter (BS) 205, dichroic mirror 206, mirror 207, condenser lens 208, photodetector (PD) 209, optical head 221 and control system 230.

Note that the dichroic mirror 206, mirror 207, optical head 221 and control system 230 included in the near-field recording system are also used in common by the far-field recording system which will be described in detail later.

The APC 202 controls the laser light emitted from the laser diode 203 provided downstream correspondingly to information supplied from the information source 201.

The laser diode 203 emits laser light of a predetermined wavelength under the control of the APC 202. The laser diode 203 is a red semiconductor laser, blue-violet semiconductor laser or the like, for example. The laser diode 203 emits laser light of a different wavelength from that of laser light emitted from a laser diode included in the far-field recording system which will be described in detail later.

The collimator lens 204 forms the laser light incident thereupon from the laser diode 203 into a light beam parallel to the optical axis thereof.

The beam splitter 205 allows the light beam incident thereupon from the collimator lens 204 to pass by and go to the dichroic mirror 206. Also, the beam splitter 205 reflects the return light from the optical head 21, having passed through the dichroic mirror 206 for incidence upon the collimator lens 208.

The dichroic mirror 206 reflects, or allow to pass by, the incident light beam depending upon the wavelength of the light beam. The dichroic mirror 206 allows the light beam incident thereupon from the beam splitter 205 to pass by and go to the mirror 207.

The mirror 207 reflects the light beam incident thereupon from the dichroic mirror 206 for incidence upon the optical head 221. Also, the mirror 207 reflects return light from the optical head 221 for incidence upon the dichroic mirror 206.

The optical head 221 condenses the light beam incident thereupon from the mirror 207 toward the information recording surface of the disk-shaped optical recording medium 200. In case the optical head 221 is used in the near-field recording system, the light irradiated from the optical head 221 to the information recording surface is evanescent light having a spot size larger than the diffraction-limited of the lens and with which information can be written to or read from the information recording surface.

Figure 27:
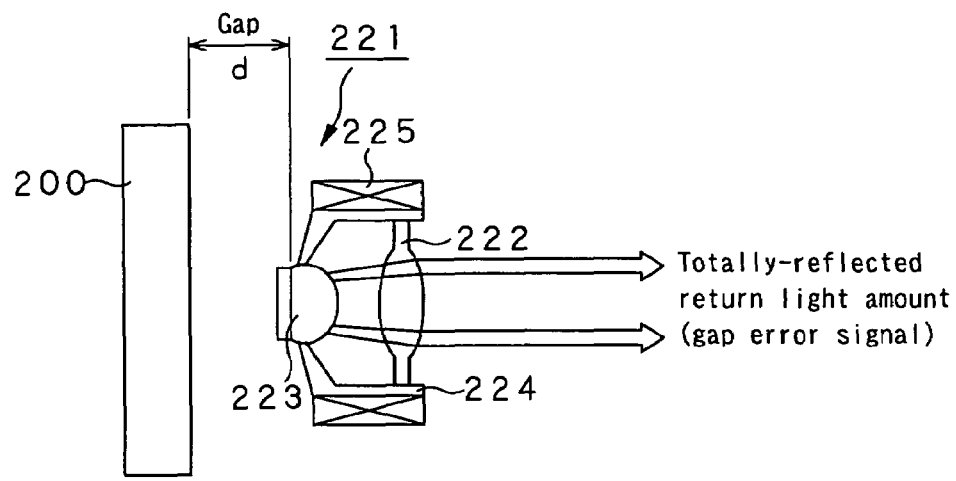
FIG. 27 is a side elevation of an optical head included in the information recorder shown in FIG. 26.

As shown in FIG. 27, the optical head 221 includes an objective lens 222, SIL (solid immersion lens) 223, lens holder 224 and actuator 225.

The objective lens 222 is an aspheric lens and focuses the light beam emitted from the laser diode 203 and incident thereupon through the collimator lens 204, beam splitter (BS) 205, dichroic mirror 206 and mirror 207 onto the SIL 223.

The SIL 223 is a lens shaped like a part of a spherical lens, cut by a plane, and having a high refractive index. The SIL 223 has a light beam incident thereupon from the objective lens 222 at the spherical side thereof and condenses the light beam on the central part thereof (end face) opposite to the spherical side.

Also, a SLM (solid immersion mirror) having a reflecting mirror surface and the same function as the SIL 223 may be used in place of the SIL 223.

The lens holder 224 holds the objective lens 222 and SIL 223 together in a predetermined physical relation with each other. The SIL 223 is supported by the lens holder 224 for the spherical side thereof to face the objective lens 222 and the end face thereof opposite to the spherical side to face the information recording surface of the disk-shaped optical recording medium 200.

With the high refractive-index SIL 223 disposed between the objective lens 222 and information recording surface of the disk-shaped optical recording medium 200 in the lens holder 224 as above, it is possible to have a larger numerical aperture than that with only the objective lens 222. Generally, since the spot size of the light beam incident upon the information recording surface from the lens is inversely proportional to the numerical aperture of the lens, the objective lens 222 and SIL 223 permit to define a more tiny spot size of the light beam.

The actuator 225 moves the lens holder 224 in the focusing and tracking directions correspondingly to a control voltage supplied as a control signal from the control system 230.

In the optical head 221, the evanescent light is light oozing from the reflection boundary of the light beam incident upon the end face of the SIL 223 at a larger angle than the critical angle and totally reflected. In case the end face of the SIL 223 is within the near field, which will be described in detail later, from the information recording surface of the disk-shaped optical recording medium 200, the evanescent light oozing out of the end face of the SIL 223 will be projected to the information recording surface.

Next, the "near field" will be explained. Generally, the near field is a field of $d \leq \lambda/2$ (where $\underline{d}$ is a distance from the light beam emitting surface of the lens and $\lambda$ is the wavelength of light incident upon the lens).

The near field will be explained in detail below concerning the optical head 221 and disk-shaped optical recording medium 200 shown in FIG. 27. The near field is a field of $d \leq \lambda/2$ where $\underline{d}$ is a distance (gap) from the end face of the SIL 223 included in the optical head 221 to the information recording surface of the disk-shaped optical recording medium 200 and $\lambda$ is the wavelength of light beam incident upon the SIL 223. Namely, a field whose gap $\underline{d}$ between the information recording surface of the disk-shaped optical recording medium 200 and end face of the SIL 223 meets $d \leq \lambda/2$ and in which evanescent light oozes from the end face of the SIL 223 to the information recording surface of the disk-shaped optical recording medium 200 is called "near field", while a field whose gap d meets d>λ/2 and in which no evanescent light oozes to the information recording surface is called "far field".

Figure 28:
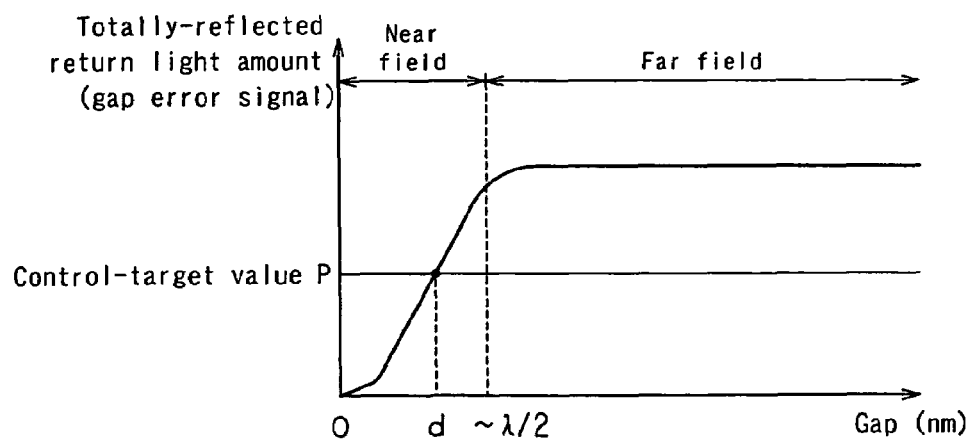
FIG. 28 explains the relation between return-light amount and inter-gap distance.

Note here that when the end face of the SIL 223 is in a far field, light beam incident upon the end face of the SIL 223 at an angle larger than the critical angle is totally reflected to provide return light. Therefore, when the end face of the SIL 223 is in a far field, the totally-reflected return light is constant in amount as shown in FIG. 28.

On the other hand, when the end face of the SIL 223 is in a near field, a part of the light beam incident upon the end face of the SIL 223 at a larger angle than the critical angle will ooze as evanescent light to the information recording surface of the disk-shaped optical recording medium 200 on the end face, namely, reflection boundary, of the SIL 223 as mentioned above. Therefore, the totally-reflected return light is smaller in amount than when the end face of the SIL 223 is in the far field as shown in FIG. 28. As will be known from FIG. 28, the totally-reflected return light amount when the end face of the SIL 223 is in the near field is exponentially smaller as the end face of the SIL 223 is nearer to the information recording surface of the disk-shaped optical recording medium 200.

Therefore, when the end face of the SIL 223 is in a near field, feedback servo control with a linear portion varying in totally-reflected return light amount correspondingly to the gap length permits to control the gap between the end face of the SIL 223 and information recording surface of the disk-shaped optical recording medium 200 to a constant value. For example, by making the feedback servo control for the totally-reflected return light amount to be a control target value P as shown in FIG. 28, the gap d will be kept constant.

The near-field recording system of the information recorder 260 shown in FIG. 26 will be explained again.

The condenser lens 208 condenses, on the photodetector 209, the return light totally reflected at the end face of the SIL 223 included in the optical head 221, reflected by the mirror 207, passed through the dichroic mirror 206 and reflected by the beam splitter 205.

The photodetector 209 detects, as a value of current, the amount of return light condensed by the condenser lens 208. It should be noted that the current value detect by the photodetector 209 has already been transduced into a DC and is supplied as a totally-reflected return light amount to the control system 230.

Next, the far-field recording system will be illustrated and explained.

The information recorder 260 includes, as components of the far-field recording system, an information source 211 to supply information for recording to the disk-shaped optical recording medium 200, APC (auto power controller) 212, laser diode 213, mirror 214, collimator lens 215, concave lens 216, beam splitter (BS) 217, dichroic mirror 206, mirror 207, optical head 221, mirror 218, condenser lens 210, cylindrical lens 219 and photodetector (PD) 220.

The dichroic mirror 206, mirror 207, optical head 221 and control system 230 included in the near-field recording system are also used in common by the far-field recording system as having previously been described.

The APC 212 controls the laser light emitted from the laser diode 213 provided downstream correspondingly to information supplied from the information source 211.

The laser diode 213 emits laser light of a predetermined wavelength under the control of the APC 212. The laser diode 213 is a red semiconductor laser, blue-violet semiconductor laser or the like, for example. The laser diode 213 emits laser light of a different wavelength from that of laser light emitted from the laser diode 203 included in the near-field recording system having been described in the foregoing.

The collimator lens 215 forms the laser light incident thereupon from the laser diode 213 into a light beam parallel to the optical axis thereof.

The concave lens 216 allows the light beam incident thereupon from the collimator lens 215 to pass by and go to the beam splitter 217 somewhat divergently.

The beam splitter 217 allows the light beam incident thereupon somehow divergently from the concave lens 216 to pass by and go to the dichroic mirror 206. Also, the beam splitter 217 reflects the return light from the optical head 221, reflected by the dichroic mirror 206 for incidence upon the mirror 218.

The dichroic mirror 206 reflects, or allow to pass by, the incident light beam depending upon the wavelength of the light beam. The dichroic mirror 206 reflects the light beam incident thereupon from the beam splitter 217 for incidence upon the mirror 207.

The mirror 207 reflects the light beam incident thereupon from the dichroic mirror 206 for incidence upon the optical head 221. Also, the mirror 207 reflects return light from the optical head 221 for incidence upon the dichroic mirror 206.

The optical head 221 condenses the light beam incident thereupon from the mirror 207 toward the information recording surface of the disk-shaped optical recording medium 200. The optical head 221 used as a component of the far-field recording system will focus the light beam on the information recording surface of the disk-shaped optical recording medium 200.

Figure 29A:
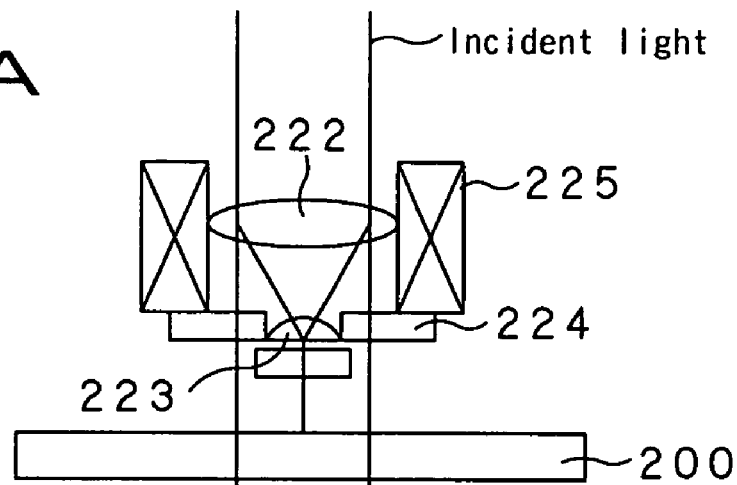
FIG. 29A is a side elevation showing the emission of evanescent light from the optical head.

In case the optical head 221 is used as the component of the near-field recording system as above, since the evanescent light is used to write information, the light beam is focused by the end face and central part of the SIL 223 as shown in FIG. 29A.

Figure 29B:
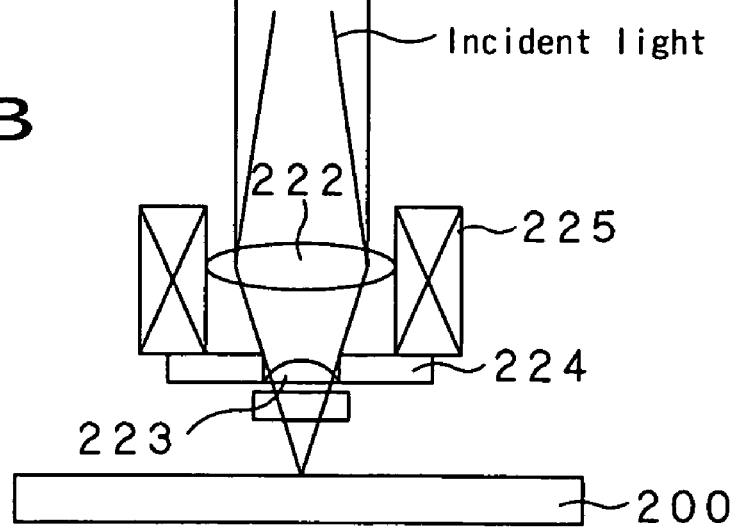
FIG. 29B is also a side elevation showing the condensation of the light beam emitted from the optical head onto an information recording surface.

On the other hand, in case the optical head 221 is used as the component of the far-field recording system, the light beam from the SIL 223 will be focused on the information recording surface of the disk-shaped optical recording medium 200 as shown in FIG. 29B to write information.

Since the concave lens 216 interposed between the collimator lens 215 in the far-field recording medium and beam splitter 217 directs the light beam for somewhat divergent incidence upon the objective lens 222, the light beam can be focused on the information recording surface of the disk-shaped optical recording medium 200 even in case the optical head 221 including the two-group lens formed from the objective lens 222 and SIL 223 is used.

The return part of the light beam focused from the optical head 221 onto the information recording surface of the disk-shaped optical recording medium 200 and reflected there is incident upon the mirror 207 via the optical head 221 again. The return light is reflected by the mirror 207, dichroic mirror 206 and then by the beam splitter 217 for incidence upon the mirror 218.

The mirror 218 directs the reflected light from the beam splitter 217 for incidence upon the condenser lens 210.

The condenser lens 210 condenses the reflected light from the mirror 218 toward the cylindrical lens 219. The cylindrical lens 219 is formed cylindrical at one side thereof to cause the incident light beam to incur astigmatism. The light beam caused to incur the astigmatism by the cylindrical lens 219 is incident upon the photodetector 220.

The photodetector 220 detects the light beam coming from the cylindrical lens 219, that is, the amount of light reflected on the information recording surface of the disk-shaped optical recording medium 200, and supplies it as a focusing error signal to the control system 230.

In the far-field recording system, the astigmatism method generally applied to the focus servo control in the CD and DVD is used to acquire the focusing error signal from the reflected light from the information recording surface of the disk-shaped optical recording medium 200.

Figure 30:
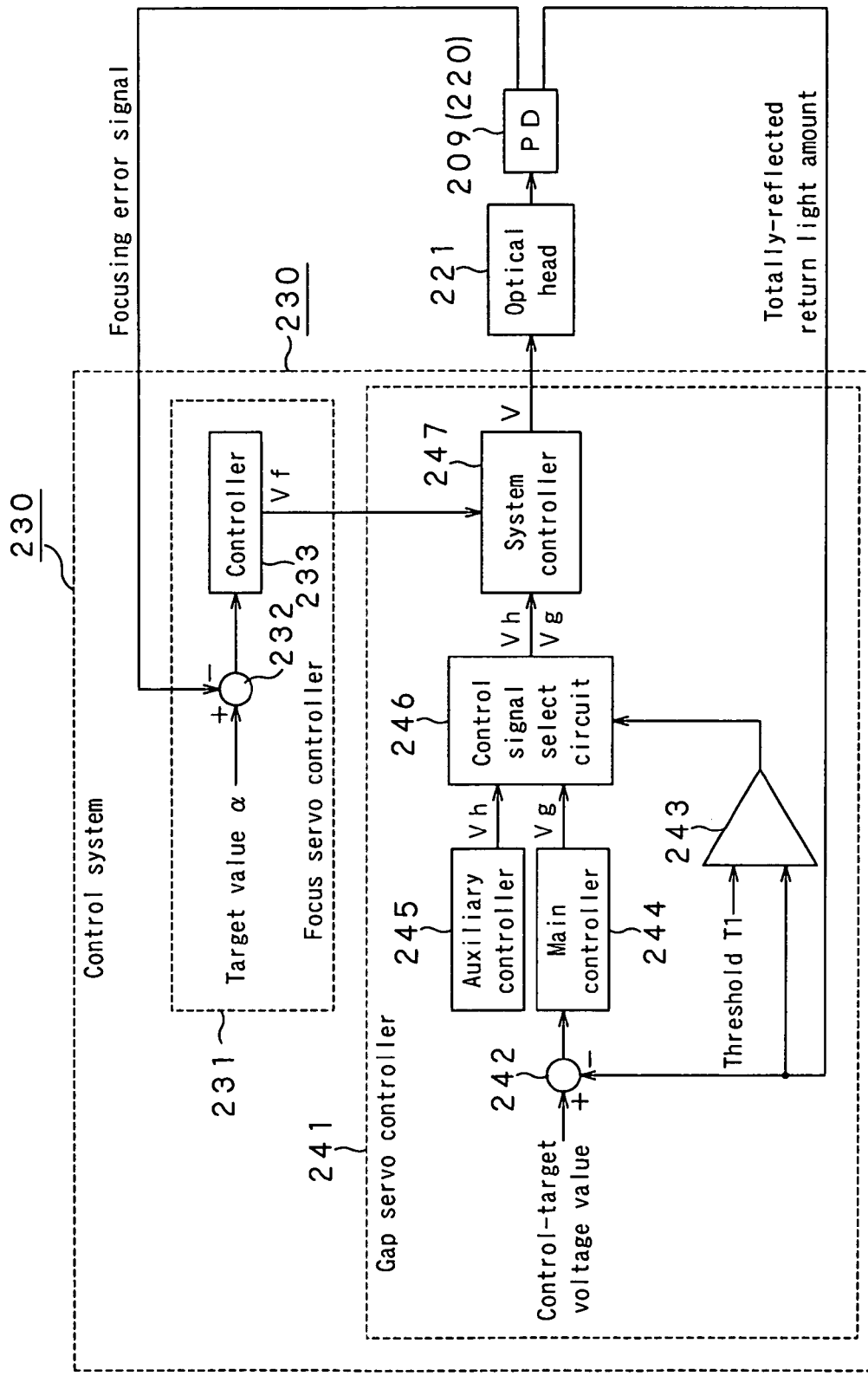
FIG. 30 is a block diagram of the control system included in the information recorder in FIG. 26.

Next, the control system 230 will be explained with reference to FIG. 30.

The control system 230 includes a focus servo controller 231 functioning as a controller for the far-field recording system to control the distance between the information recording surface of the disk-shaped optical recording medium 200 and SIL 223 of the optical head 221, and a gap servo controller 241 functioning as a controller for the near-field recording system to control the gap between the information recording surface of the disk-shaped optical recording medium 200 and SIL 223 of the optical head 221.

First, the focus servo controller 231 will be described. The focus servo controller 231 includes an adder 232 and controller 233 to make a focus servo control with a focusing error signal supplied from the aforementioned photodetector 220.

Figure 31:
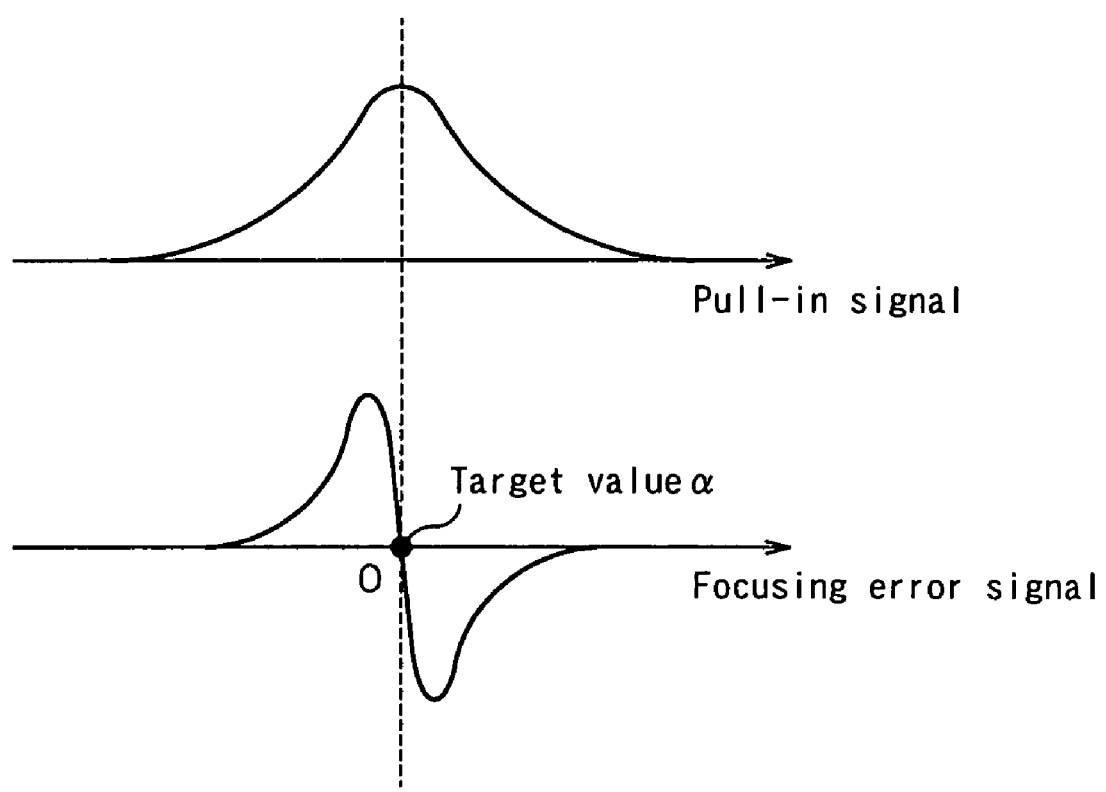
FIG. 31 shows pull-in and focusing-error signals.

FIG. 31 shows a pull-in signal and focusing error signal, detected by the photodetector 220 when the system is correctly pulled in the servo loop. When a pull-in signal shown in FIG. 31 is found, a linear part of the focusing error signal is used to effect a focus servo control.

The adder 232 adds a target value α (=0) and a negative-signed value of the focusing error signal supplied from the photodetector 220 together, and supplies the result of addition to the controller 233.

The controller 233 generates a control voltage value Vf to control the optical head 221 so that the result of addition made in the adder 232 will be zero, and supplies it to the system controller 247.

Next, the gap servo controller 241 will be explained. The gap servo controller 241 includes an adder 242, comparator 243, main controller 244, auxiliary controller 245, control signal selection circuit 246 and system controller 247.

A voltage value equivalent to the totally-reflected return light amount supplied from the photodetector 209 is supplied to the adder 242 and comparator 243.

The adder 242 makes a comparison between the control-target voltage value for having the gap d approximate to the control-target value P and voltage value equivalent to the totally-reflected return light amount supplied from the photodetector 209 to detect a deviation between them. The control-target voltage value is a preset constant voltage or the like.

The comparator 243 makes a comparison between the voltage value equivalent to totally-reflected return light amount supplied from the photodetector 209 and the threshold T1 which is a predetermined voltage value. The threshold T1 is a value selected to meet a relation T1>P (control-target value). When the voltage value equivalent to totally-reflected return light is larger than the threshold T1, it means that the SIL 223 of the optical head 221 is in the far field. On the contrary, when the voltage value equivalent to totally-reflected return light amount is smaller than the threshold T1, it means that the SIL 223 is in the near field.

Therefore, when it is known from the result of comparison in voltage value that the SIL 223 is in the far field, the comparator 243 will supply a select signal "0" for example to the control signal selection circuit 246 so that the control voltage value generated by the auxiliary controller 245 will be selected. When the SIL 223 is in th near field, the comparator 243 will supply a select signal "1" for example to the control signal selection circuit 246 so that the control voltage value generated by the main controller 244 will be selected.

When the SIL 223 is in the near field, the main controller 244 will generate a control signal Vg which is to make the gap d approximate to the control-target value P. The main controller 244 includes a phase compensation filter or the like designed based on the frequency response, for example, to generate a control signal Vg which is a control voltage from the deviation calculated by the adder 242.

The auxiliary controller 245 generates a control signal Vh which make the SIL 223 of the optical head 221 approach the information recording surface of the disk-shaped optical recording medium 200 to such a distance that the SIL 223 will be in the near field.

Depending upon the control signal select signal supplied from the comparator 43, the control signal selection circuit 246 supplies either the control signal Vh generated by the auxiliary controller 245 or control signal Vg generated by the main controller 244.

The system controller 247 totally controls the control system 230. It controls the focus servo controller 231 or gap servo controller 241 to generate a control signal, and supplies the control signal to the actuator 225 of the optical head 221.

It is assumed here that the control voltage supplied from the system controller 247 to the actuator 225 of the optical head 221 is V. The control voltage V may be expressed as given by the following equation (3) or (4) using the control voltage Vf supplied from the controller 233 in the focus servo controller 231 and control signal Vh or Vg supplied from the control signal selection circuit 246 of the gap servo controller 241:

$$V=Vf+Vh \quad (3)$$

$$V=Vf+Vg \quad (4)$$

In case the information recorder 260 is used as the far-field recording system, the system controller 247 controls the information recorder 260 to provide only the control voltage Vf supplied from the controller 233 on the assumption that Vh=0 or Vg=0.

Also, when the near-field recording system of the information recorder 260 is used, the system controller 247 controls the information recorder 260 to provide only the control voltage Vh or Vg supplied from the control signal selection circuit 246 on the assumption that Vf=0.

Figure 32:
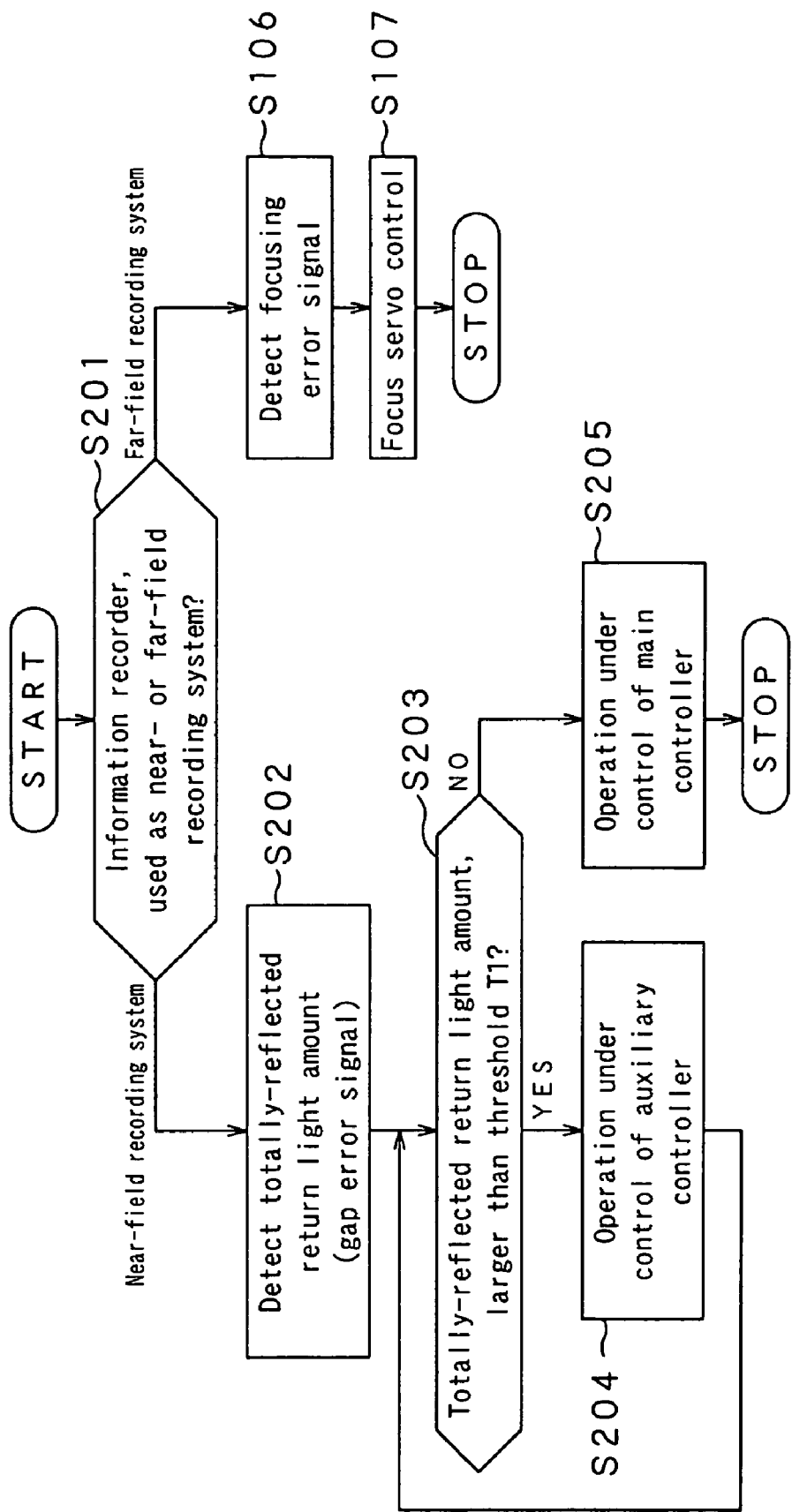
FIG. 32 shows a flow of operations of the control system included in the information recorder according to the present invention.

Next, the operation of the control system 230 will be explained with reference to the flow diagram shown in FIG. 32.

First in step S201, the control system 230 judges whether the information recorder 260 should be used as the near- or far-field recording system. When the information recorder 260 is to be used as the far-field recording system, the control system 230 puts the gap controller 241 of the control system 230 into operation and goes to step S202. If the near-field recording system of the information recorder 260 is to be used, the control system 230 puts the focusing error controller 31 and goes to step S206.

Steps S202 to S205 are applied to the near-field recording system.

In step S202, the photodetector 209 detects a totally-reflected return light amount of the light beam projected to the optical head 21 from the laser diode 203 via a predetermined optical system. The detected totally-reflected return light amount is supplied as a gap error signal to the control system 230.

In step S203, the gap servo controller 41 controls the comparator 243 to make a comparison between a voltage value equivalent to the totally-reflected return light amount and threshold T1. When the result of comparison shows that the voltage value equivalent to the totally-reflected return light amount is larger than the threshold T1, the comparator 243 will supply the control signal selection circuit 246 with a select signal intended for supply of the control signal Vh generated by the auxiliary controller 245 to the system controller 247, and the control system 230 goes to step S204.

Also, if the result of comparison shows that the threshold T1 is larger than the voltage value equivalent to the totally-reflected return light amount, the comparator 243 will supply the control signal selection circuit 246 with a select signal intended for supply of the control signal Vg generated by the main controller 244 to the system controller 247, and the control system 230 goes to step S205.

As above, in case the voltage value equivalent to the totally-reflected return light amount is larger than the threshold T1, it means that the SIL 223 is in the far field. If the voltage value equivalent to the totally-reflected return light amount is smaller than the threshold T1, it means that the SIL 223 is in the near field.

In step S204, the gap servo controller 241 supplies the control signal Vh generated by the auxiliary controller 245 to the system controller 247 via the control signal selection circuit 246.

This step S204 is repeatedly effected until the totally-reflected return light amount detected by the photodetector 220 is determined in step S203 to be smaller than the threshold T1.

In step S205, as the voltage value equivalent to the totally-reflected return light amount has become smaller than the threshold T1, the control system 230 holds the control signal Vh generated by the auxiliary controller 245 at that time (the held voltage will be referred to as "Vh'" hereunder) and controls the control signal selection circuit 246 to provide the control signal Vg generated by the main controller 244. The control signal Vg is supplied to the system controller 247 via the control signal selection circuit 246.

The system controller 247 applies the held control signal Vh' generated by the auxiliary controller 245 and control signal Vg generated by the main controller 244 to the actuator 225 of the optical head 221. That is, the control signal V supplied to the actuator 225 of the optical head 221 will take the following value:

$$V = Vg + Vh'$$

Note that the control may be done only by the main controller 244 with holding the held voltage Vh' from the auxiliary controller 245 during the control or with copying the held voltage from the auxiliary controller 245 to the main controller 244 to release the held voltage Vh' of the auxiliary controller 245 when the main controller 244 is selected.

Steps S206 and S207 are applied to the far-field recording system.

In step S206, light emitted from the laser diode 213 is projected to the information recording surface of the disk-shaped optical recording medium 200 via a predetermined optical system and optical head 221, and the return light from the information recording surface is detected by the photodetector 220. The detected return light is supplied as a focusing error signal to the control system 230.

In step S207, the focus servo controller 231 controls the controller 233 to generate a control voltage Vf which cancels the deviation between the supplied focusing error signal and target value α, and supplies it to the system controller 247. The system controller 247 applies the supplied control voltage Vf as a control voltage V to the actuator 225 of the optical head 221.

By correctly selecting an optical system and the focus servo controller 231 or gap servo controller 241 in the control system 230 depending upon whether the information recorder 260 is used as the far-field recording system or near-field recording system, the distance between the end face of the SIL 23 of the optical head 221 and information recording surface of the disk-shaped optical recording medium 200 can be controlled to a predetermined constant value for each of the recording system.

Next, there will be explained another method of focusing, on the information recording surface of the disk-shaped optical recording medium 200, the light beam emitted from the optical head 221 in the information recorder 260 as the far-field recording system.

Figure 26:
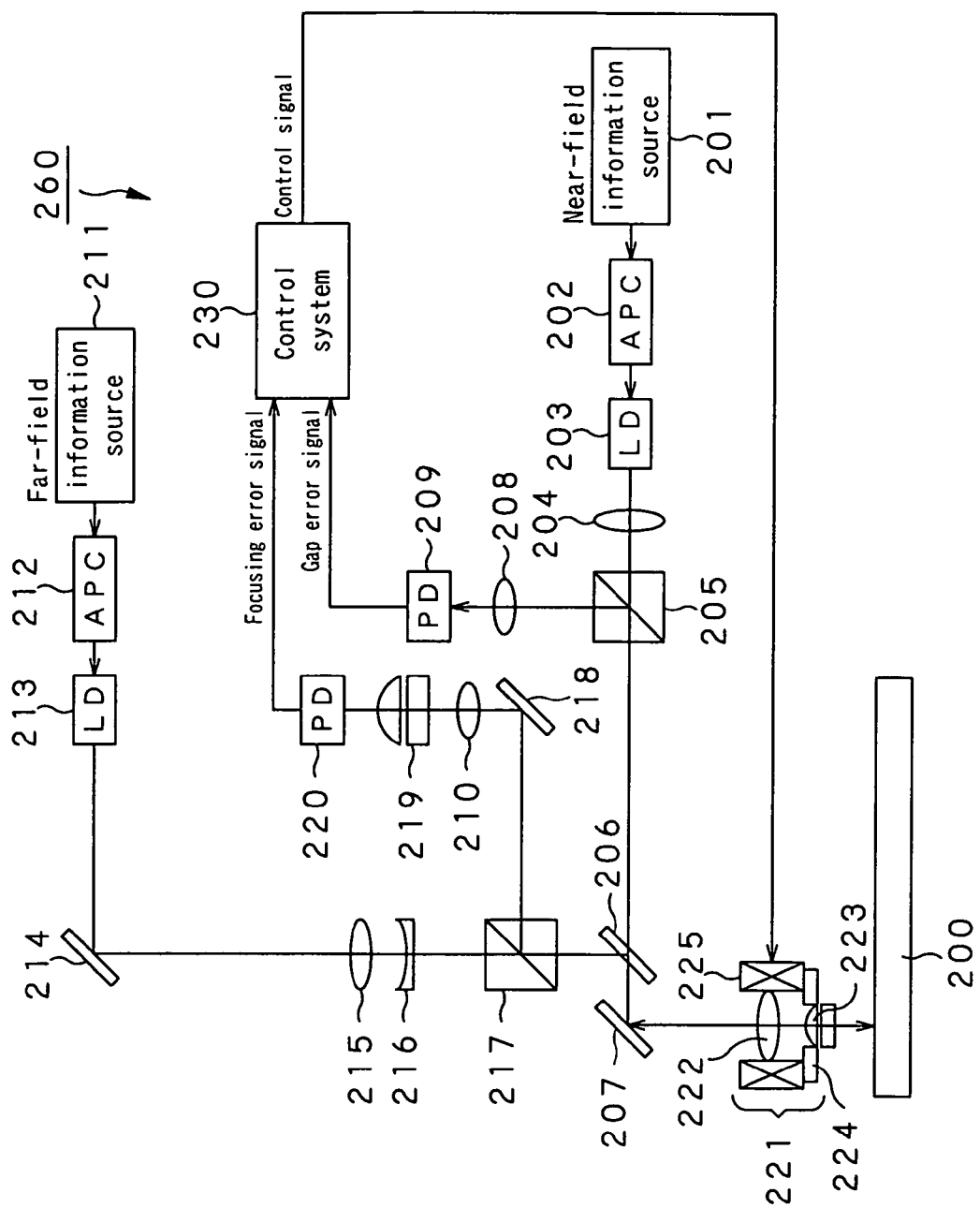
FIG. 26 is a block diagram of an information recorder as a fifth embodiment of the present invention.

In the information recorder 260 shown in FIG. 26, the concave lens 216 is used to direct the light beam incident thereupon from the collimator lens 215 somewhat divergently, thereby focusing the light beam on the information recording surface of the disk-shaped optical recording medium 200.

Figure 33:
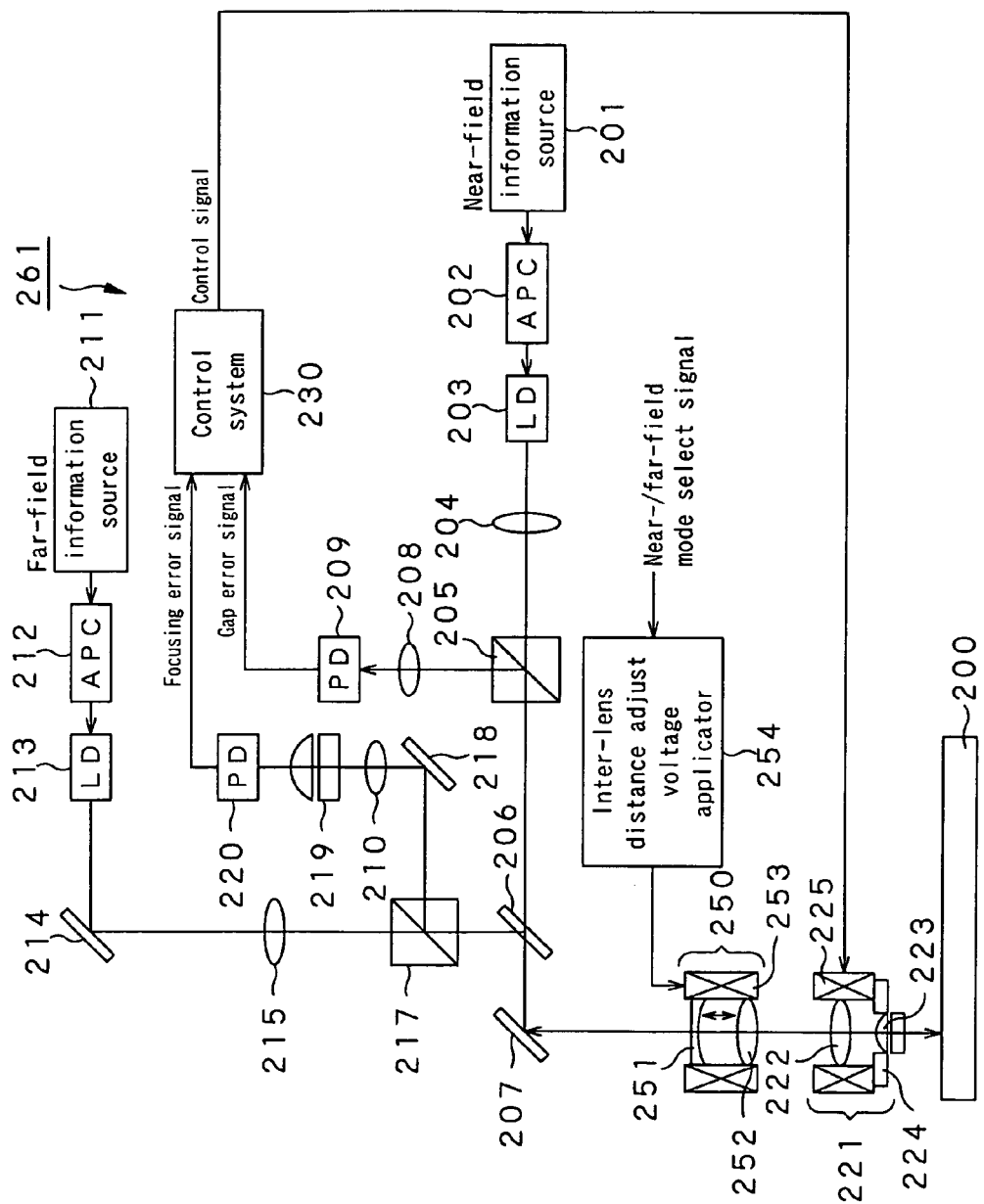
FIG. 33 is a block diagram of a variant of the information recorder in FIG. 26, including an expander.

FIG. 33 shows a variant of the information recorder 260 shown in FIG. 26. This variant is generally indicated with a reference numeral 261. It has the same configuration as the latter except that an expander 250 is interposed between the mirror 207 and optical head 221 and the concave lens 216 provided in the information recorder 260 is not provided.

The expander 250 includes a two-group lens formed from a concave lens 251 and collimator lens 252. The distance between the concave lens 251 and collimator lens 252 in the two-group lens is increased or decreased by the actuator 253.

The actuator 253 is put into operation with an adjusting voltage being supplied from an inter-lens distance adjusting voltage applicator 254. Supplied with a select signal for using the information recorder 261 as the near- or far-field recording system, the inter-lens distance adjusting voltage applicator 254 applies an adjusting voltage to the actuator 253.

Figure 34A:
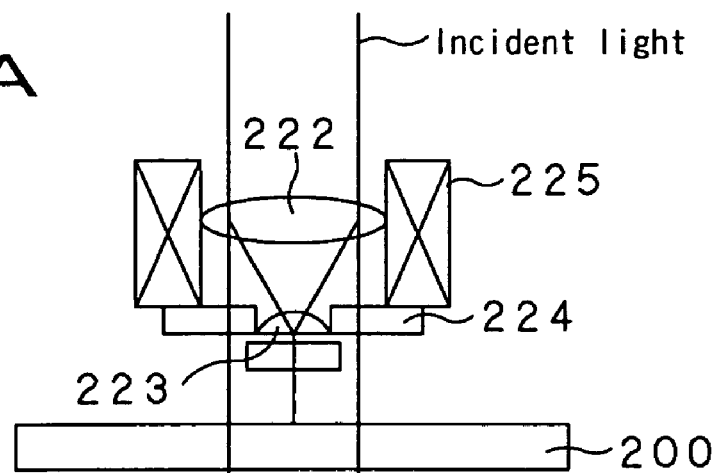
FIG. 34A is a side elevation showing the emission of evanescent light from the optical head.
Figure 34B:
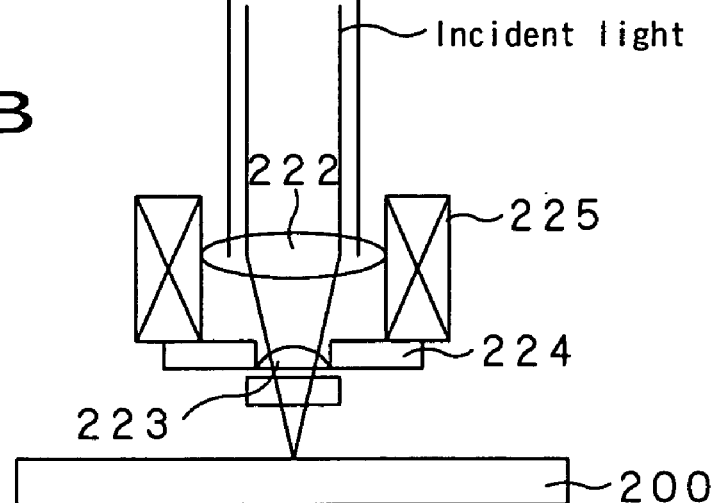
FIG. 34B is also a side elevation showing the condensation of the light beam emitted from the optical head onto an information recording surface.

When the information recorder 261 is used as the far-field recording system, correctly adjusting the distance between the lenses in the two-group lens of the expander 250 permits to decrease the diameter of the light beam incident upon the objective lens 222 of the optical head 221 and focus the light beam on the information recording surface of the disk-shaped optical recording medium 200 as shown in FIGS. 34A and 34B.

Figure 35:
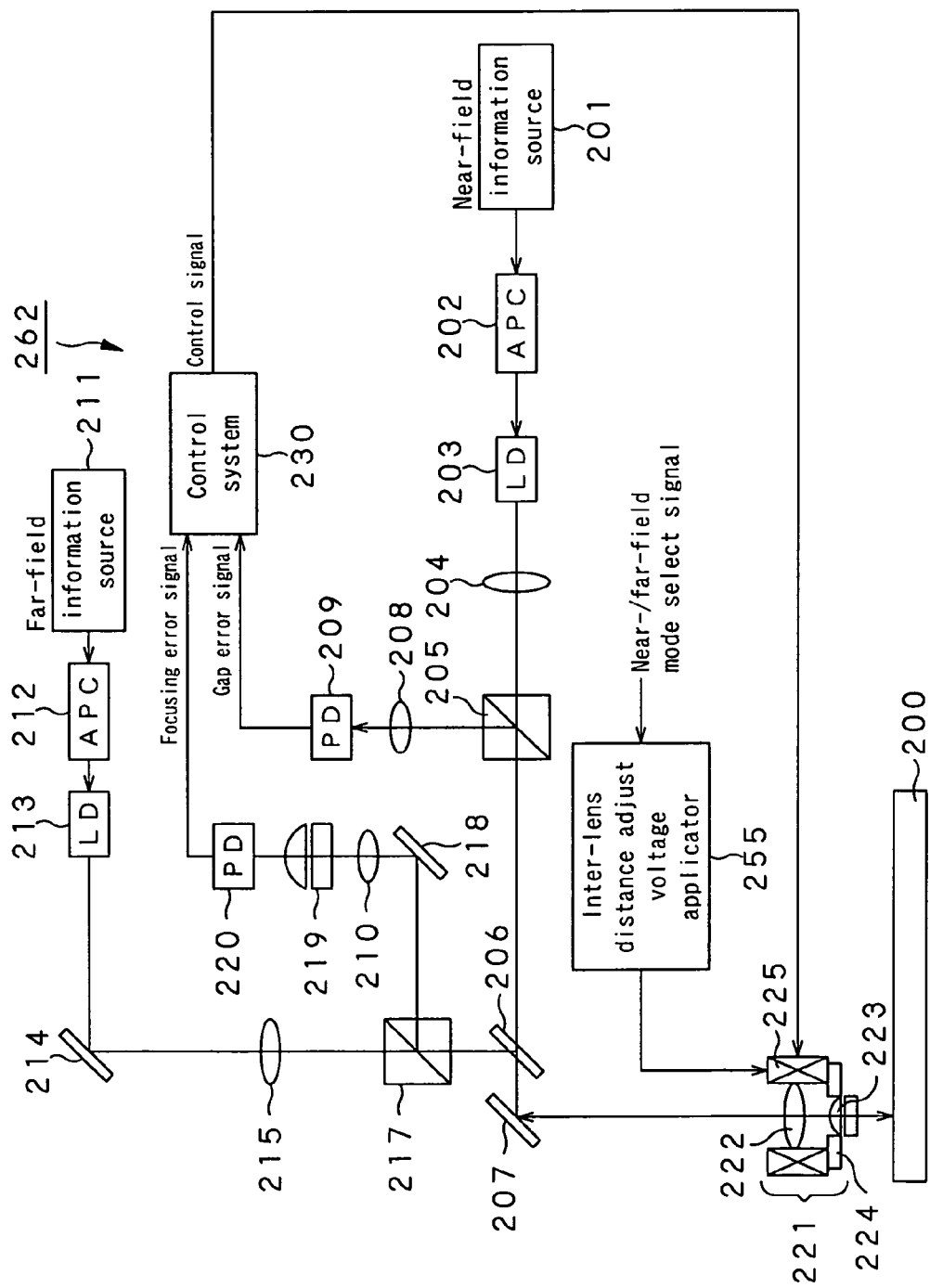
FIG. 35 is a block diagram of a mechanism to adjust inter-lens distance of a two-group lens of the optical head in the information recorder.

FIG. 35 shows a variant of the information recorder 260 shown in FIG. 33. This variant is generally indicated with a reference numeral 262 and has the same configuration as the latter except that the optical head 221 additionally includes a mechanism to increase or decrease the distance between the lenses in the two-group lens formed from the objective lens 222 and SIL 223 both included in the optical head 221 and the concave lens 216 provided in the information recorder 260 is not provided.

For example, when an adjusting voltage is supplied to the actuator 225 from the inter-lens distance adjusting voltage applicator 255, the objective lens 222 moves in relation to the SIL 223 so that the inter-lens distance of the two-group lens will be varied.

Supplied with a select signal for using the information recorder 262 as the near- or far-field recording system, the inter-lens distance adjusting voltage applicator 255 applies an adjusting voltage to the actuator 225.

Figure 36A:
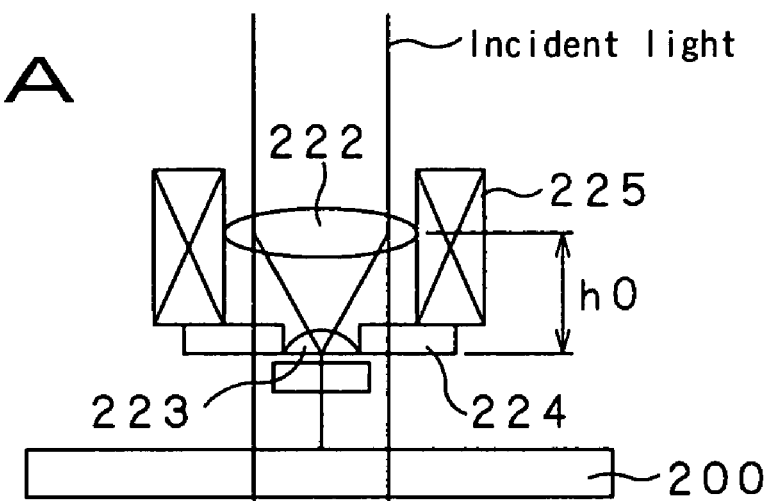
FIG. 36A is a side elevation showing the emission of evanescent light from the optical head.
Figure 36B:
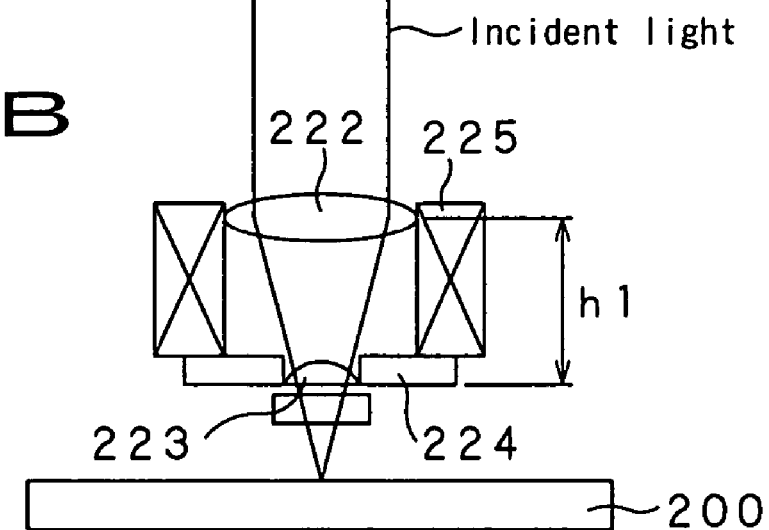
FIG. 36B is also a side elevation showing the condensation of the light beam emitted from the optical head onto an information recording surface.

As shown in FIGS. 36A and 36B, on the assumption that the distance between the objective lens 222 and end face of the SIL 223 is h0 when the optical head 221 is used in the near-field recording system, when an adjusting voltage which adjusts the distance between the objective lens 222 and end face of the SIL 223 to h1 (h1>h0) is applied to the actuator 225 from the inter-lens distance adjusting voltage applicator 255 when the optical head 221 is used in the far-field recording system, the light beam can be focused on the information recording surface of the disk-shaped optical recording medium 200.

Next, the present invention will be described concerning an information reproducing apparatus as a sixth embodiment thereof with reference to FIGS. 37 and 38. The information reproducing apparatus is generally indicated with a reference numeral 270.

The information reproducing apparatus 270 reads predetermined information recorded in the removable disk-shaped optical recording medium 200. It includes a near-field reproduction system in which evanescent light detected in the near field is projected to the disk-shaped optical recording medium 200 set in a disk mount (not shown) to read information and also a far-field reproduction system in which a light beam emitted from a light source is projected to the disk-shaped optical recording medium 200 to read information.

The near-field reproduction system of the information reproducing apparatus 270 is quite the same in control by the control system 230 etc. as that of the information recorder 260 shown in FIG. 26 except that the laser diode 203 is controlled by the APC 202 to emit laser light having a constant power and a near-field reproduction signal is acquired from the return part of the light beam projected to the disk-shaped optical recording medium 200. The same or similar function components of the information reproducing apparatus 270 as those in the information recorder 260 will be indicated with the same or similar reference numerals as or to those used in explanation of the information recorder 260 and will not be described any more.

Also, the information reproducing apparatus 270 as the far-field reproduction system is quite the same in control by the control system 230 etc. as the information recorder 260 as the far-field recording system shown in FIG. 1 except that the laser diode 213 is controlled by the APC 212 to emit laser light having a constant power and a far-field reproduction signal is acquired from the return part of the light beam projected to the disk-shaped optical recording medium 200 via the photodetector 220. The same or similar function components of the information reproducing apparatus 270 as those in the information recorder 260 will be indicated with the same or similar reference numerals as or to those used in explanation of the information recorder 260 and will not be described any more.

Figure 37:
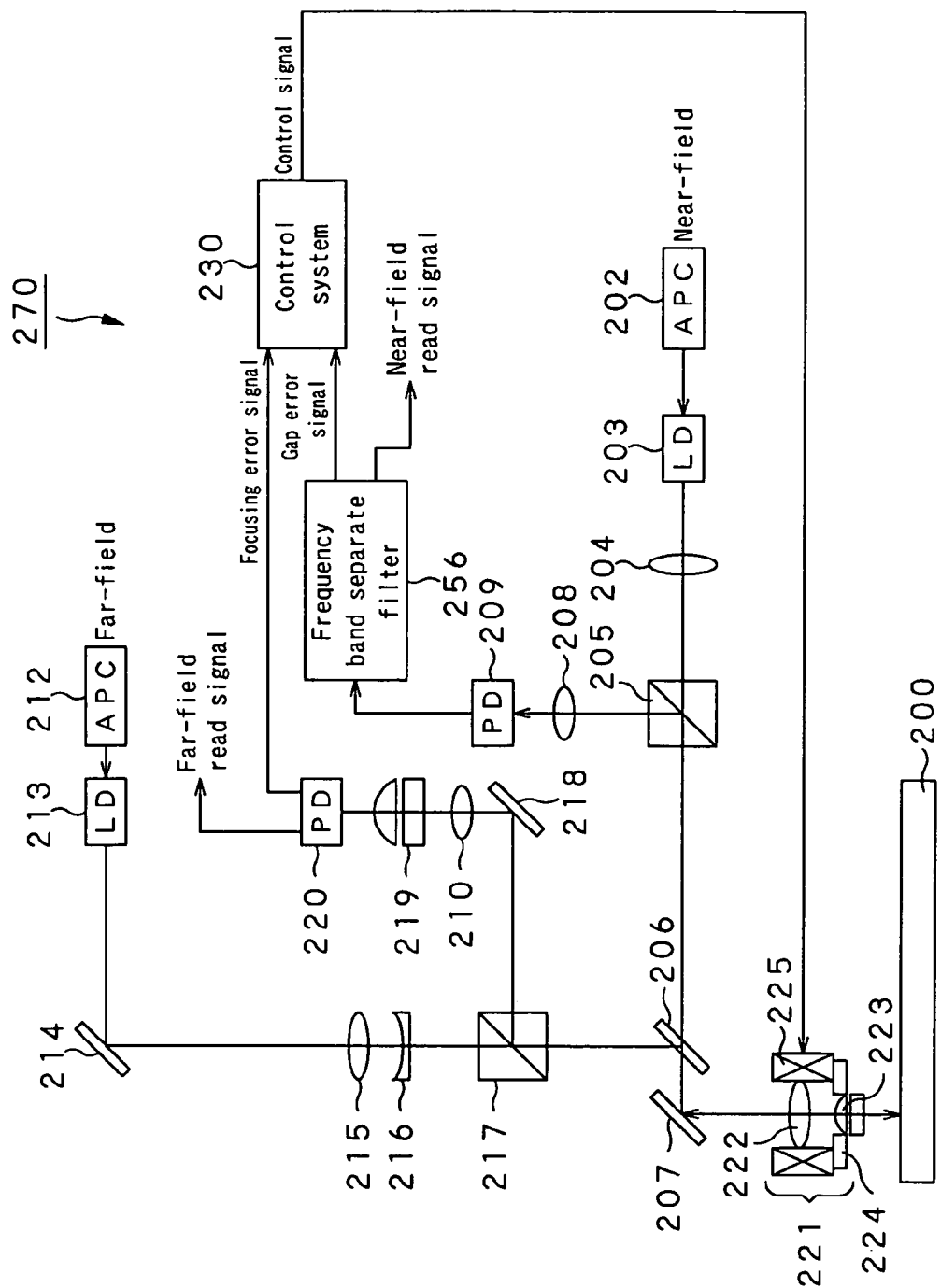
FIG. 37 is a block diagram of an information reproducing apparatus as a sixth embodiment of the present invention.
Figure 38:
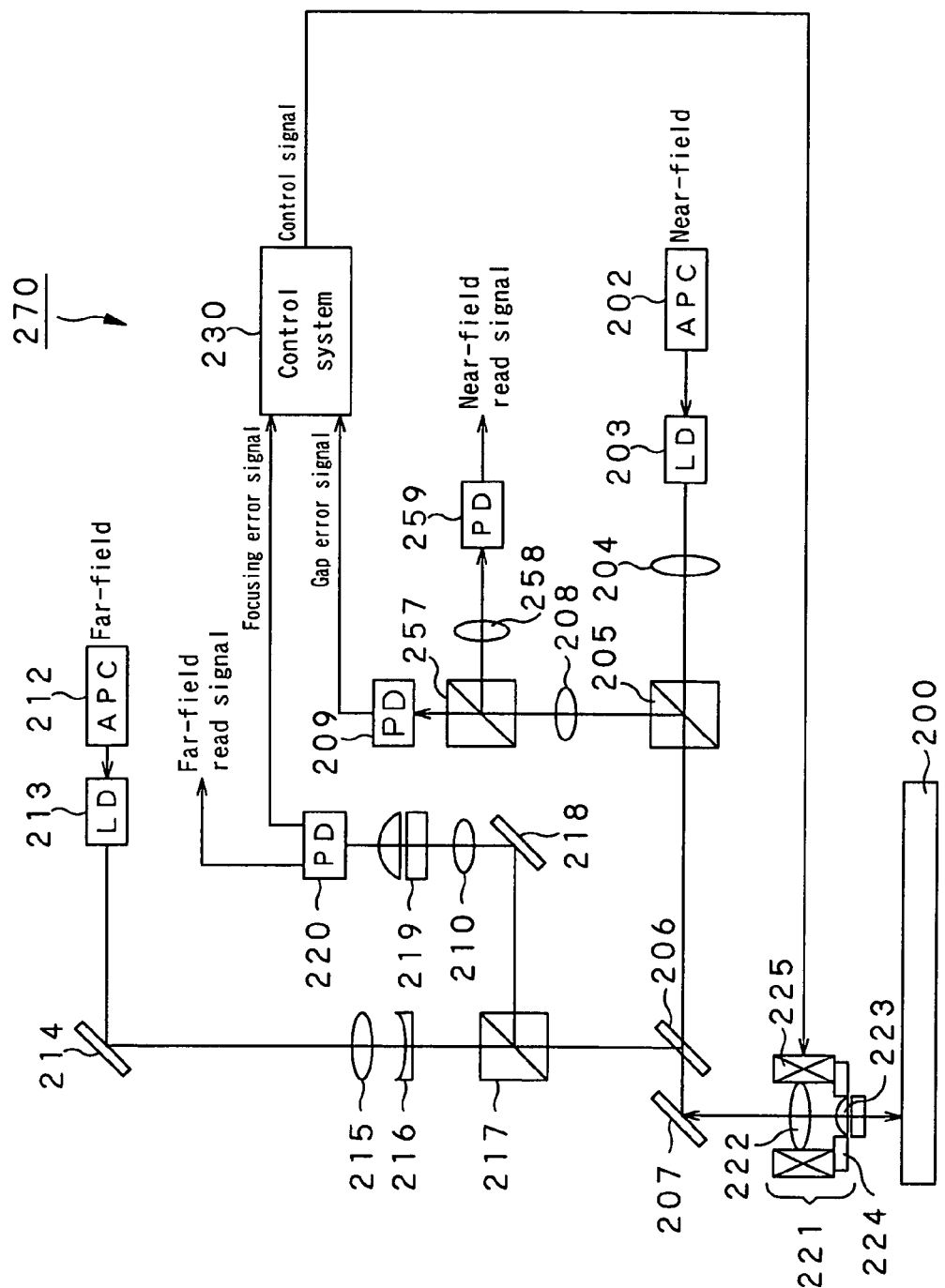
FIG. 38 is a block diagram of a variant of the information reproducing apparatus in FIG. 37.

In the near-field reproduction system of the information reproducing apparatus 270 as a sixth embodiment of the present invention, a read signal is acquired from the return light by using a difference in frequency band between the read signal and gap error signal as shown in FIG. 37 or by using a difference in polarization plane as shown in FIG. 38.

For the method of acquiring a read signal on the basis of a difference in frequency band between the read signal and gap error signal, a frequency band separation filter 256 is provided downstream of the photodetector 209 as shown in FIG. 37. The frequency band separation filter 256 separates the return light detected by the photodetector 209 to extract a near-field read signal that is information to be read and a gap error signal to be used in the gap control. The gap error signal is supplied to the control system 230 as in the information recorder 260.

For the method of acquiring a read signal on the basis of a difference in polarization plane, a polarization beam splitter 257 is provided between the condenser lens 208 and photodetector 209 as shown in FIG. 38. The return light condensed by the condenser lens 208 is allowed to pass by, or reflected by, the polarization beam splitter 257 depending upon the difference in polarization plane. The return light allowed to pass by the polarization beam splitter 257 is detected by the photodetector 209 as in the information recorder 260, and supplied as a gap error signal to the control system 230. Also, the return light reflected by the polarization beam splitter 257 passes through a condenser lens 258 and then is detected by a photodetector 259 to provide a near-field read signal.

Next, another method of focusing the light beam emitted from the optical head 221 on the information recording surface of the disk-shaped optical recording medium 200 in the far-field reproduction system will be described with reference to FIGS. 39, 40, 41 and 42.

In the information reproducing apparatus 270 shown in FIGS. 37 and 38, since it is constructed similarly to the information recorder 260 shown in FIG. 26, a concave lens 216 is used to direct the light beam coming from the collimator lens 215 somewhat divergently for focusing on the information recording surface of the disk-shaped optical recording medium 200.

Figure 39:
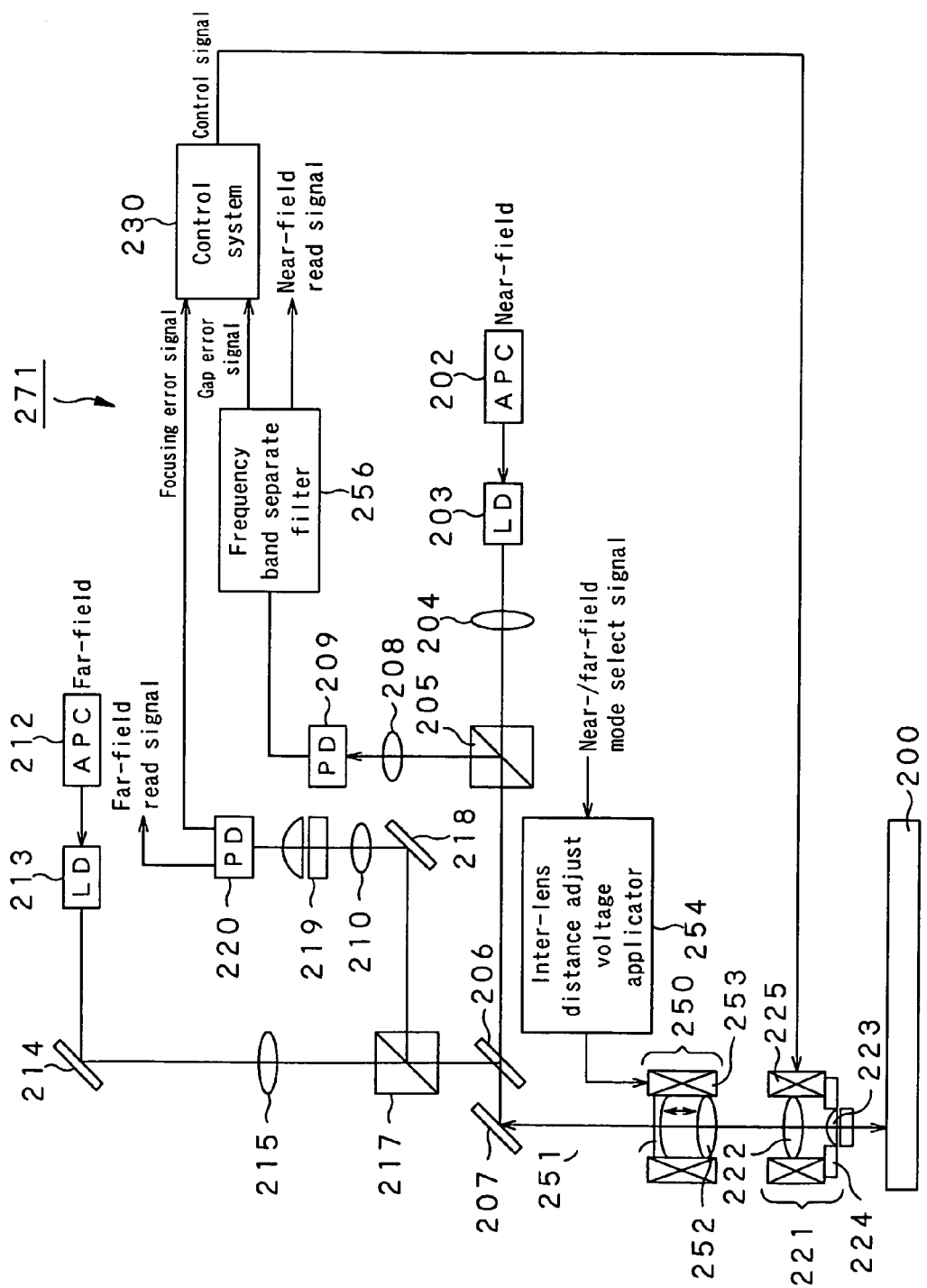
FIG. 39 is a first lock diagram of an expander included in the information reproducing apparatus.
Figure 40:
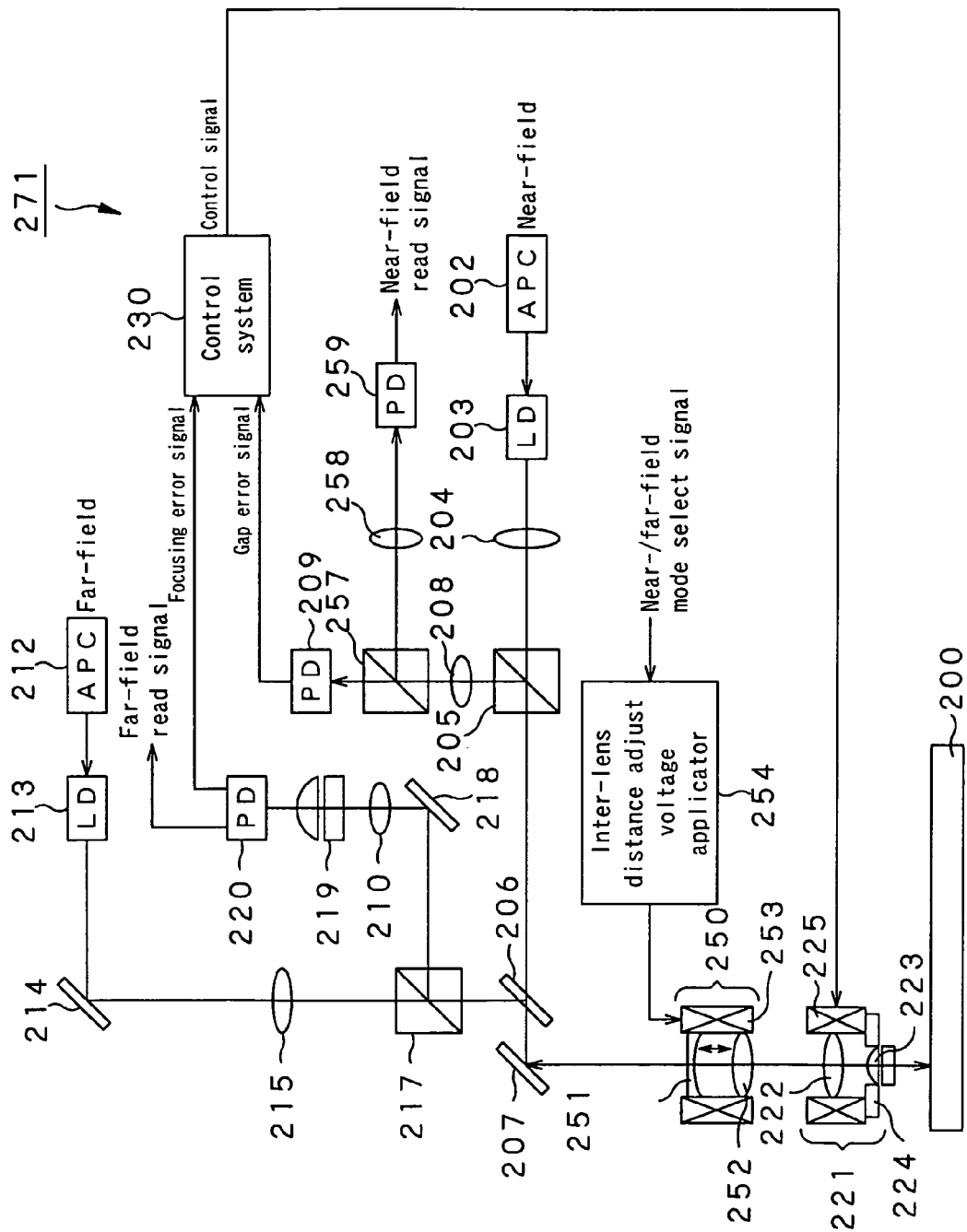
FIG. 40 is a second block diagram of the expander in the information reproducing apparatus.

FIGS. 39 and 40 show a variant of the information reproducing apparatus 270 shown in FIGS. 37 and 38, which has the same configuration except that an expander 250 is interposed between the mirror 207 and optical head 221 and the concave lens 216 provided in the information reproducing apparatus 270 is not provided. This variant is generally indicated with a reference numeral 271.

The expander 250 includes a two-group lens formed from a concave lens 251 and collimator lens 252. The distance between the concave lens 251 and collimator lens 252 in the two-group lens is increased or decreased by the actuator 253.

The actuator 253 is put into operation with an adjusting voltage being supplied from an inter-lens distance adjusting voltage applicator 254. Supplied with a select signal for using the information recorder 261 as the near- or far-field recording system, the inter-lens distance adjusting voltage applicator 254 applies an adjusting voltage to the actuator 253.

When the information recorder 261 is used as the far-field recording system, correctly adjusting the distance between the lenses in the two-group lens of the expander 250 permits to decrease the diameter of the light beam incident upon the objective lens 222 of the optical head 221 and focus the light beam on the information recording surface of the disk-shaped optical recording medium 200 as shown in FIGS. 36A and 36B.

Figure 41:
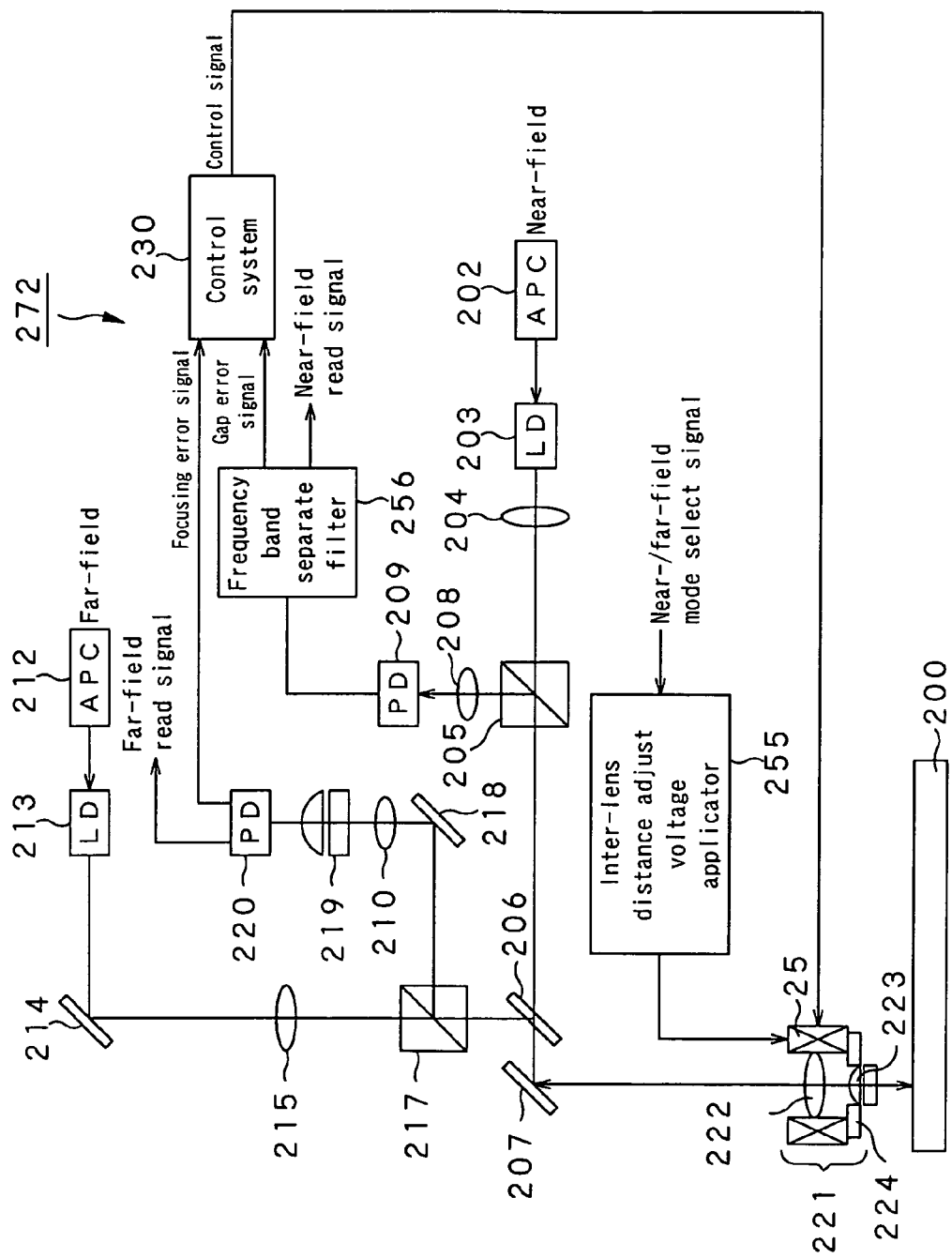
FIG. 41 is a first block diagram of a mechanism to adjust inter-lens distance of a two-group lens in the optical head in the information reproducing apparatus.
Figure 42:
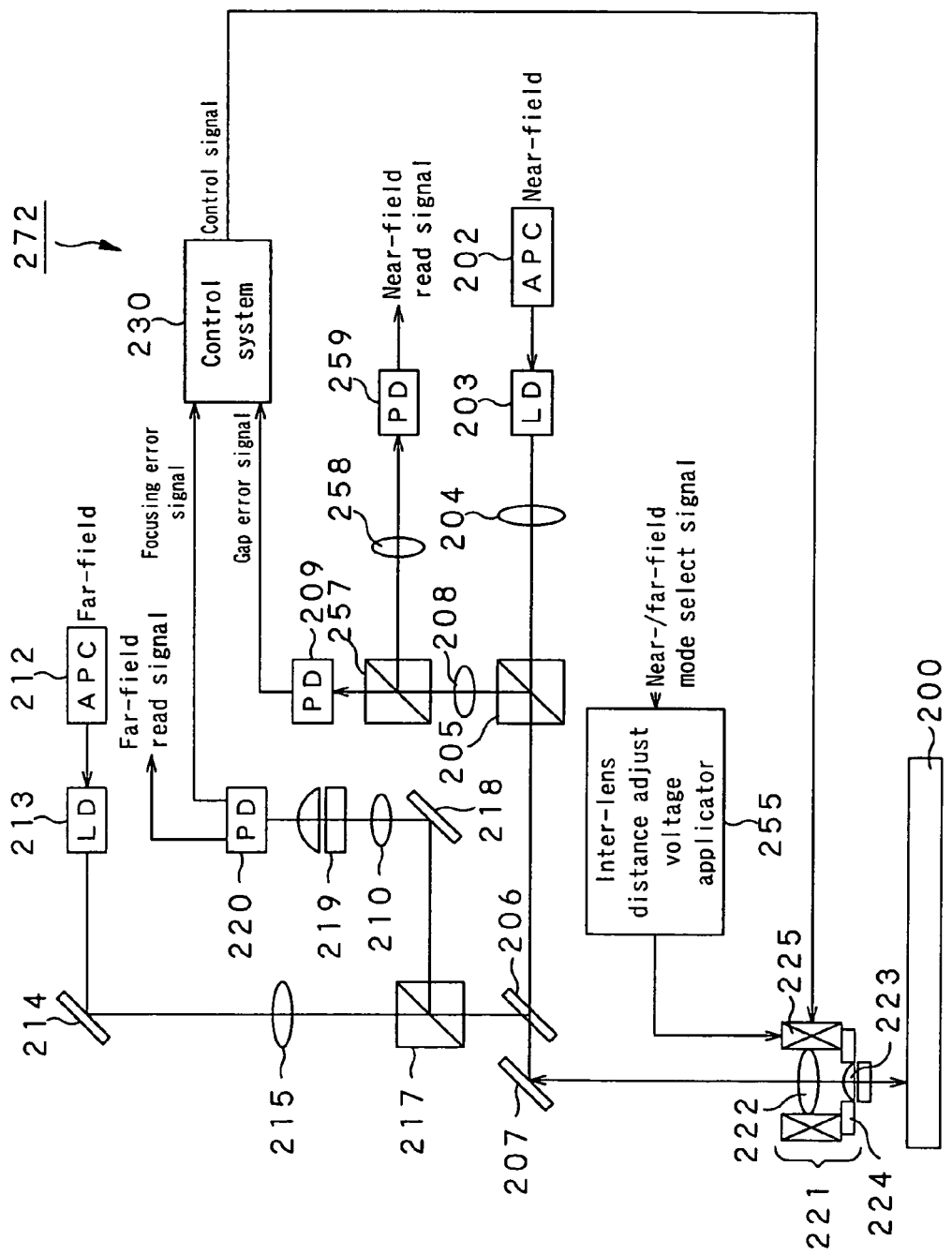
FIG. 42 is a second block diagram of the mechanism to adjust inter-lens distance of a two-group lens in the optical head in the information reproducing apparatus.

Also, FIGS. 41 and 42 shows a variant of the information reproducing apparatus 270 shown in FIGS. 37 and 38. This variant is an information recorder generally indicated with a reference numeral 272. It has the same configuration as the latter except that the optical head 221 additionally includes a mechanism to increase or decrease the distance between the lenses in the two-group lens formed from the objective lens 222 and SIL 223 both included in the optical head 221 and the concave lens 216 provided in the information reproducing apparatus 270 is not provided.

For example, when an adjusting voltage is supplied to the actuator 225 from the inter-lens distance adjusting voltage applicator 255, the objective lens 222 moves in relation to the SIL 223 so that the inter-lens distance of the two-group lens will be varied.

Supplied with a select signal for using the information recorder 272 as the near- or far-field recording system, the inter-lens distance adjusting voltage applicator 255 applies an adjusting voltage to the actuator 225.

As shown in FIGS. 36A and 36B, on the assumption that the distance between the objective lens 222 and end face of the SIL 223 is h0 when the optical head 221 is used in the near-field recording system, when an adjusting voltage which adjusts the distance between the objective lens 222 and end face of the SIL 223 to h1 (h1>h0) is applied to the actuator 225 from the inter-lens distance adjusting voltage applicator 255 when the optical head 221 is used in the far-field recording system, the light beam can be focused on the information recording surface of the disk-shaped optical recording medium 200.

Next, the present invention will be described concerning an information recorder as a seventh embodiment thereof with reference to FIG. 43. The information reproducing apparatus is generally indicated with a reference numeral 280.

The information recorder 280 includes a near-field recording system in which evanescent light detected in the near field is projected to a removable disk-shaped optical recording medium 200 set in a disk mount (not shown) to write information, and also a far-field recording system in which a light beam emitted from a light source is projected to the disk-shaped optical recording medium 200 to write information.

The information recorder 260 shown in FIG. 26 includes two light sources, one in the near-field recording system being a laser diode 203 while the other in the far-field recording system is a laser diode 213.

Figure 43:
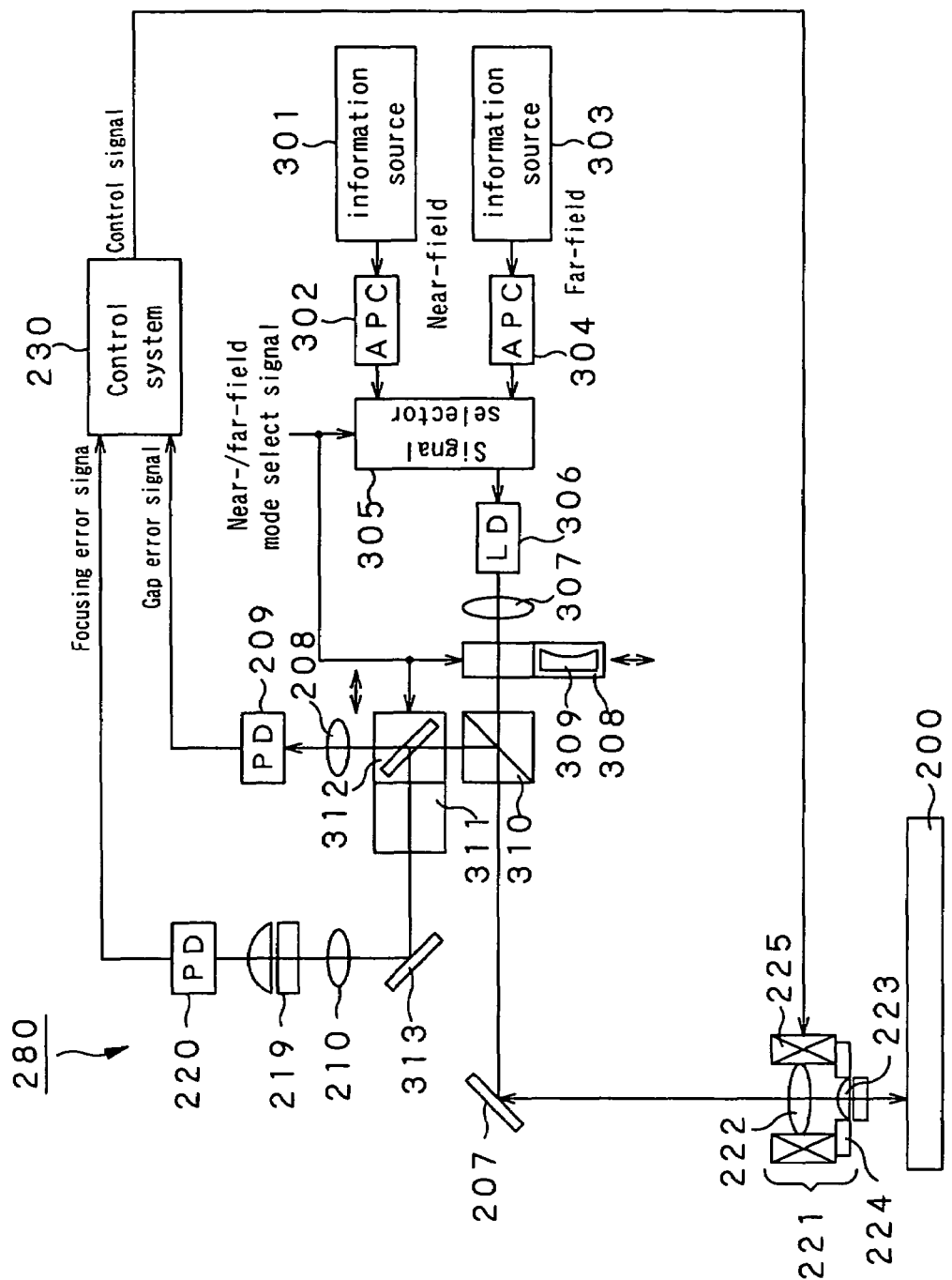
FIG. 43 is a block diagram of an information recorder as a seventh embodiment of the present invention.

The information recorder 280 shown in FIG. 43 includes a single light source to be shared by the near- and far-field recording systems.

The information recorder 280 includes an information source 301 which supplies information for recording to the disk-shaped optical recording medium 200 when the near-field recording system of the latter is used, APC (auto power controller) 302, information source 303 which supplies information for recording to the disk-shaped optical recording medium 200 when the far-field recording system of the latter is used, APC 304, signal selector 305, laser diode 306, collimator lens 307, lens block 308, beam splitter 310, mirror 207, optical head 221, mirror block 311, mirror 313, condenser lens 208, photodetector 209, condenser lens 210, cylindrical lens 219, photodetector 220 and control system 230.

Note that the functional components having the same or similar functions as or to those in the information recorder 260 in FIG. 26 will be indicated with the same or similar reference numerals as or to those used in illustration and explanation of the information recorder 260 and will not be described any more.

The APC 302 modulates laser light emitted from the laser diode 306 provided downstream according to information supplied from the information source 301.

The APC 304 modulates laser light emitted from the laser diode 306 provided downstream according to information supplied from the information source 303.

When supplied with a select signal for selection of the near-field recording system or far-field recording system of the information recorder 280, the signal selector 305 selects supply of an output from the APC 302 or 304 to the laser diode 306. For example, in case the near-field recording system of the information recorder 280 is used, a signal output from the APC 302 is supplied to the laser diode 306. When the far-field recording system is used, a signal output from the APC 304 is supplied to the laser diode 306.

The laser diode 306 emits laser light of a predetermined wavelength modulated according to the signal supplied from the APC 302 or 304. The laser diode 306 is a red semiconductor laser, blue-violet semiconductor laser or the like, for example. The laser diode 306 is common to both the near- and far-field recording systems.

The collimator lens 307 forms the laser light incident thereupon from the laser diode 306 into a light beam parallel to the optical axis thereof.

The lens block 308 incorporates a concave lens 309. Supplied with a far-field select mode signal or near-field mode select signal, the lens block 308 places the concave lens 309 onto the optical axis of the light beam coming from the collimator lens 307 or removes the concave lens 309 from on the optical axis.

The concave lens 309 is used in the far-field recording system to direct the light beam somehow divergently onto the objective lens 222. That is, the concave lens 309 has the same function as the concave lens 216 in the information recorder 260 shown in FIG. 26.

When the far-field mode select signal is supplied to the lens block 308, the concave lens 309 will be placed on the optical axis to direct the light beam coming from the collimator lens 307 somehow divergently for incidence upon the beam splitter 310.

Also, when the near-field mode select signal is supplied to the lens block 308, the concave lens 309 will be removed from on the optical axis and the light beam coming from the collimator lens 307 will be incident upon the beam splitter 310.

The beam splitter 310 allows the light beam incident thereupon from the lens block 308 to pass by and go to the mirror 207. Also, the beam splitter 310 reflects the return part, from the optical head 221, of the light beam coming from the mirror 207 or return light from the information recording surface of the disk-shaped optical recording medium 200 for incidence upon the mirror block 311.

The light beam incident upon the objective lens 222 in the optical head 221 via the mirror 207 is reflected by the mirror 207 again as return light from the optical head 221 when the near-field recording system of the information recorder 280 is used, or as return light from the information recording surface of the disk-shaped optical recording medium 200 when the far-field recording system is used, for incidence upon the beam splitter 310.

The mirror block 311 incorporates a mirror 312. Supplied with a far-field mode select signal or near-field mode select signal, the mirror block 311 will place the mirror 312 onto the optical axis of the light beam coming from the beam splitter 310 or remove the mirror 312 from on the optical axis.

The mirror 312 is used in the far-field recording system. When the far-field recording system of the information recorder 280 is used, the mirror 312 guides the return light from the information recording surface, coming from the beam splitter 310, to the photodetector used in the far-field recording system.

Supplied with a far-field mode select signal, the mirror block 311 will place the mirror 312 onto the optical axis of the light beam. Therefore, the light beam coming from the beam splitter 310, namely, the return light from the information recording surface, is reflected by the mirror 312 for incidence upon the mirror 313.

Also, supplied with a near-field mode select signal, the lens block 308 will remove the mirror 312 from on the optical axis. The return light, from the optical head 221, of the light beam coming from the beam splitter 310 is incident upon the condenser lens 208.

The mirror 313 reflects the light beam reflected by the mirror 312, that is, the return light from the information recording surface, for incidence upon the condenser lens 210.

The reflected light from the information recording medium, incident upon the condenser lens 210, is condensed by the condenser lens 210, detected by the photodetector 220 via the cylindrical lens 219, and supplied as a focusing error signal to the control system 230.

The return light from the optical head 221, incident upon the condenser lens 208, is condensed by the condenser lens 208 as above, detected by the photodetector 209, and supplied as a gap error signal to the control system 230.

Since the control of the optical head 221 with the gap error signal and control of the optical head 221 with the focusing error signal, made in the control system 230, are quite the same as those in the information recorder 260, so they will not be explained any more.

Also in the information recorder 280 shown in FIG. 43, any other method may be adopted in the far-field recording system to focus the light beam coming from the optical head 221 on the information recording surface of the disk-shaped optical recording medium 200.

Figure 44:
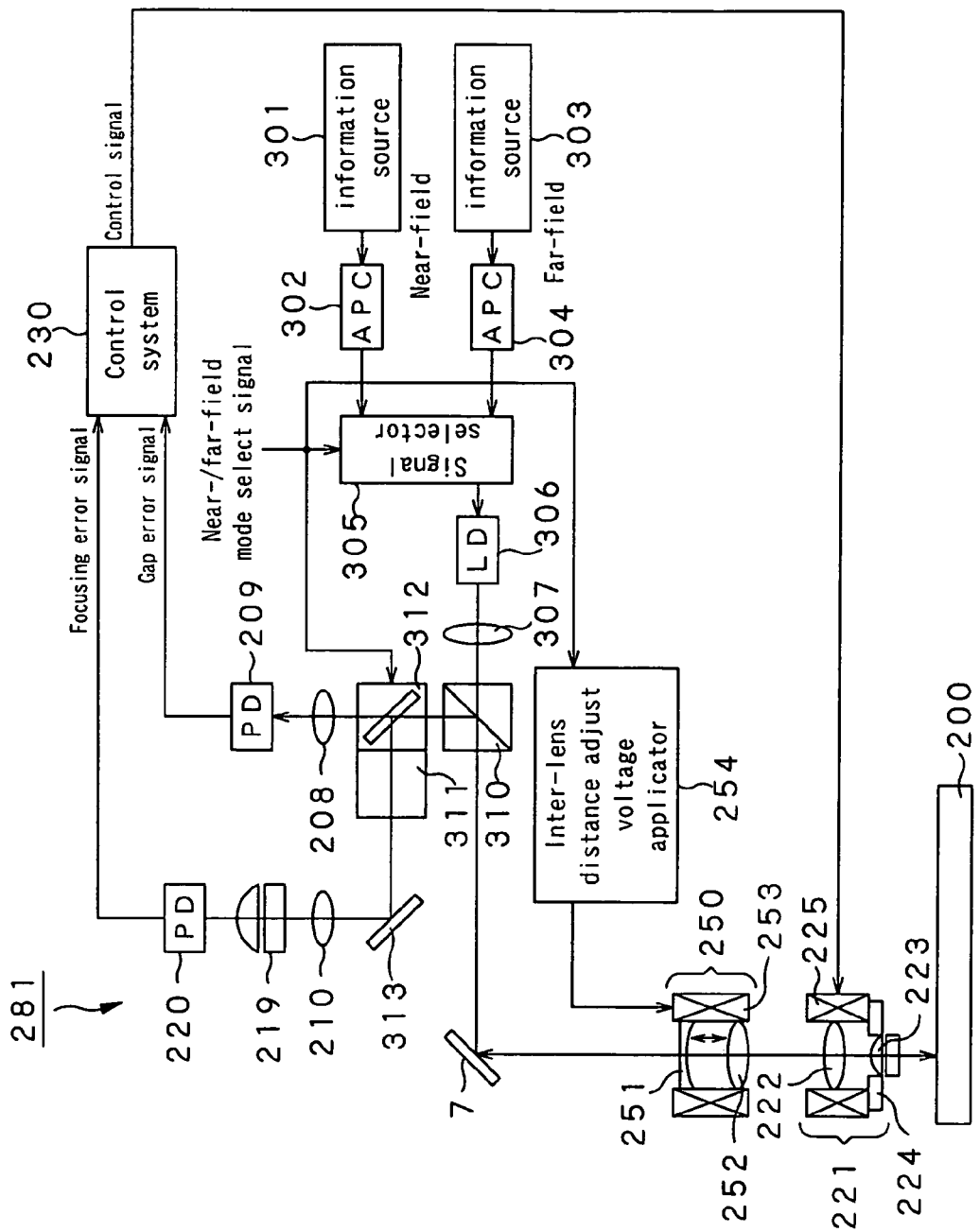
FIG. 44 is a block diagram of an expander included in the information recorder shown in FIG. 43.

FIG. 44 shows a variant of the information recorder 280 shown in FIG. 43. This variant is generally indicated with a reference numeral 281. It has the same configuration as the latter except that an expander 250 is interposed between the mirror 207 and optical head 221 and the lens block 308 including the concave lens 309 provided in the information recorder 280 shown in FIG. 43 is not provided. The expander 250 is put into operation by the inter-lens distance adjusting voltage applicator 254.

Since the method of focusing the light beam on the information recording surface of the disk-shaped optical recording medium 200 with the use of the expander 250 and inter-lens distance adjusting voltage applicator 254 is the quite the same as that having been explained in the foregoing with reference to FIGS. 33 and 34, so it will not be explained any more.

Figure 45:
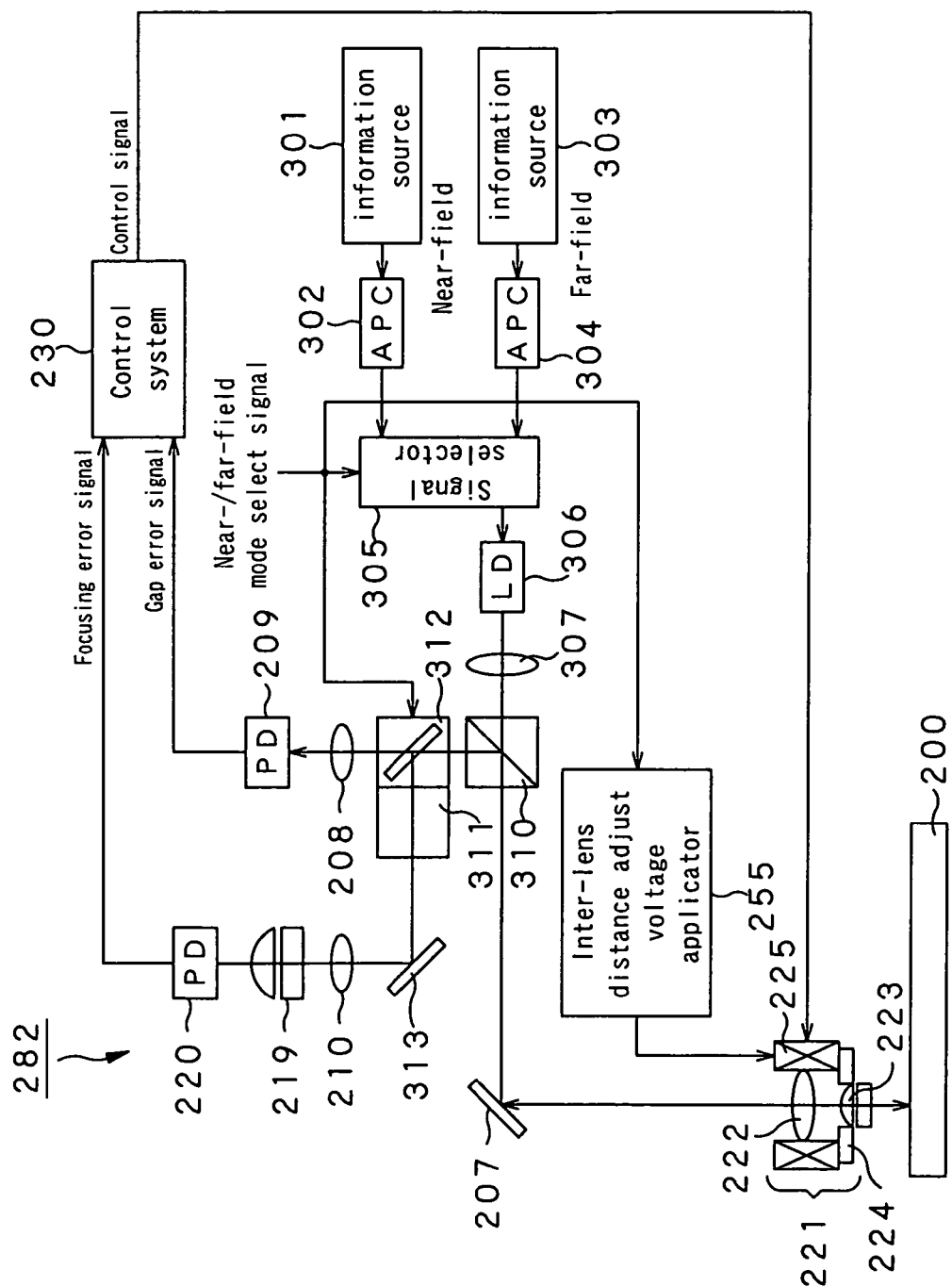
FIG. 45 is a block diagram of a mechanism to adjust inter-lens distance of a two-group lens in the optical head in the information reproducing apparatus.

FIG. 45 shows an information reproducing apparatus, generally indicated with a reference numeral 282. The information reproducing apparatus 282 is a version of the information recorder 280 shown in FIG. 43, in which there is additionally provided a mechanism to adjust inter-lens distance of the two-group lens by the objective lens 222 and SIL 223 included in the optical head 221 but the lens block 308 having the concave lens 309 is not provided. The inter-lens distance of the optical head 221 having the additional mechanism, namely, distance between the objective lens 222 and SIL 223, is varied by applying an inter-lens distance adjusting voltage to the actuator 225 from the inter-lens distance adjusting voltage applicator 255.

Since the method of focusing the light beam on the information recording surface of the disk-shaped optical recording medium 200 with the use of the optical head 221 and inter-lens distance adjusting voltage applicator 255 is quite the same as that having been described in the foregoing with reference to FIGS. 35 and 36, so it will not be explained any more.

Figure 46:
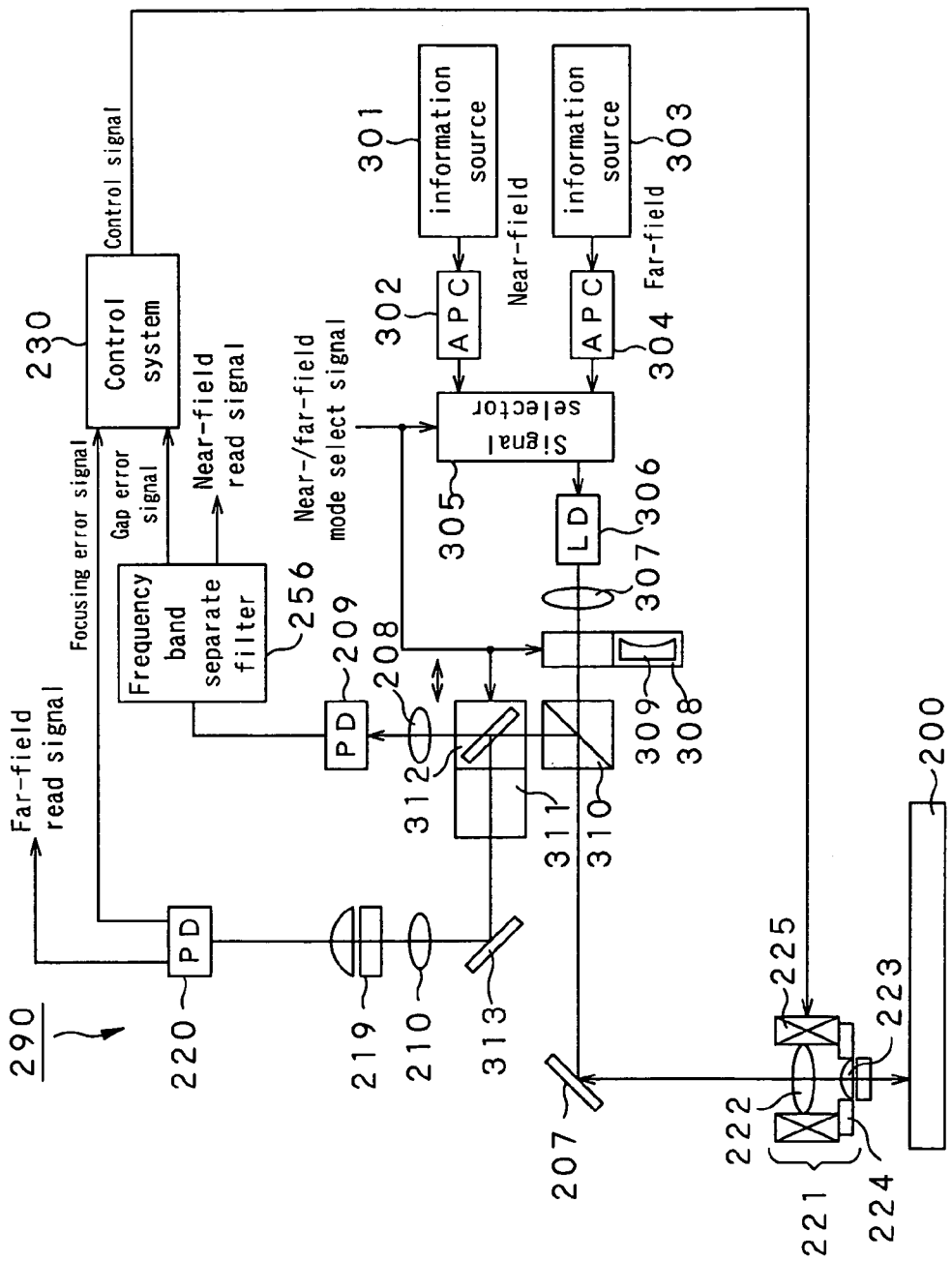
FIG. 46 is a block diagram of an information reproducing apparatus as an eighth embodiment of the present invention.
Figure 47:
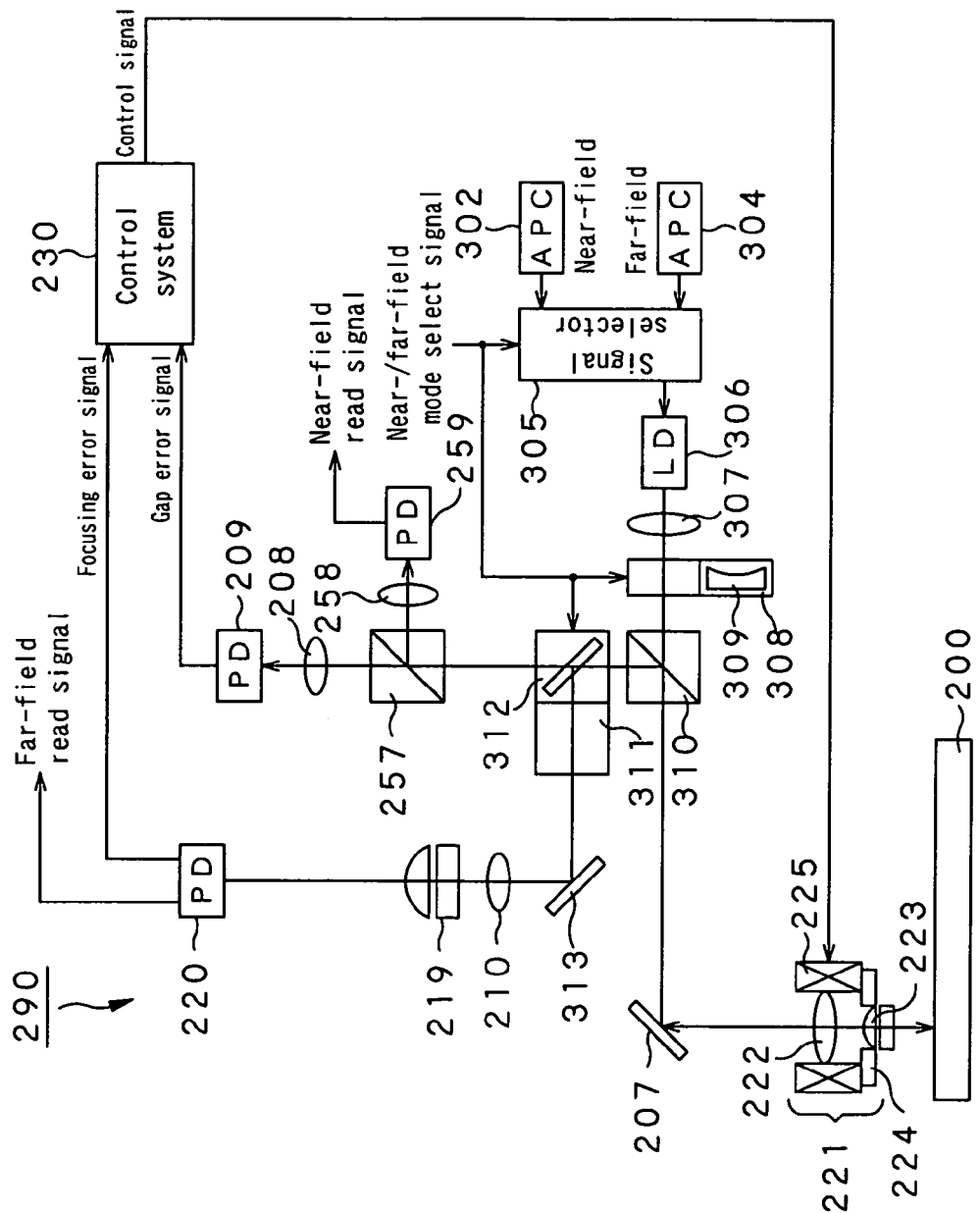
FIG. 47 is a block diagram of a variant of the information reproducing apparatus in FIG. 46.

Next, the present invention will be descried concerning an information reproducing apparatus as an eighth embodiment thereof with reference to FIGS. 46 and 47. The information reproducing apparatus is generally indicated with a reference numeral 290.

The information reproducing apparatus 290 reads predetermined information recorded in the disk-shaped optical recording medium 200. It includes a near-field reproduction system in which evanescent light detected in the near field is projected to the disk-shaped optical recording medium 200 set in a disk mount (not shown) to read information, and also a far-field reproduction system in which a light beam emitted from a light source is projected to the disk-shaped optical recording medium 200 to read information.

The near-field reproduction system of the information reproducing apparatus 290 is quite the same in control by the control system 230 etc. as that of the information recorder 280 shown in FIG. 43 except that the laser diode 306 is controlled by the APC 302 or 304 to emit laser light having a constant power, a near-field read signal is acquired from the return part of the light beam projected to the disk-shaped optical recording medium 200, or a far-field read signal is acquired from the reflected part of the light beam projected to the disk-shaped optical recording medium 200 via the photodetector 220. The same or similar function components of the information reproducing apparatus 290 as or to those in the information recorder 280 will be indicated with the same or similar reference numerals as or to those used in explanation of the information recorder 280 and will not be described any more.

In the near-field reproduction system of the information reproducing apparatus 290 as an eighth embodiment of the present invention, a read signal is acquired from the return light by using a difference in frequency band between the read signal and gap error signal as shown in FIG. 46 or by using a difference in polarization plane as shown in FIG. 47.

For the method of acquiring a read signal on the basis of a difference in polarization plane, a frequency band separation filter 256 is provided downstream of the photodetector 209 as shown in FIG. 46. The frequency band separation filter 256 separates and extracts the near-field read signal to be read and gap error signal used for gap control from the value of the return light detected by the photodetector 209. The gap error signal is supplied to the control system 230 as in the information recorder 260.

For the method of acquiring a read signal on the basis of a difference in polarization plane, a polarization beam splitter 257 is provided between the condenser lens 208 and photodetector 209 as shown in FIG. 47. The return light condensed by the condenser lens 208 is allowed to pass by, or reflected by, the polarization beam splitter 257 depending upon the difference in polarization plane. The return light allowed to pass by the polarization beam splitter 257 is detected by the photodetector 209 as in the information recorder 280, and supplied as a gap error signal to the control system 230. Also, the return light reflected by the polarization beam splitter 257 passes through a condenser lens 258 and then is detected by the photodetector 259 to provide a near-field read signal.

Next, another method of focusing the light beam emitted from the optical head 221 on the information recording surface of the disk-shaped optical recording medium 200 in the far-field reproduction system will be described with reference to FIGS. 48, 49, 50 and 51.

In the information reproducing apparatus 290 shown in FIGS. 46 and 47, since it is constructed similarly to the information recorder 280 shown in FIG. 43, a concave lens 216 is used to direct the light beam coming from the collimator lens 215 somewhat divergently for focusing on the information recording surface of the disk-shaped optical recording medium 200.

Figure 48:
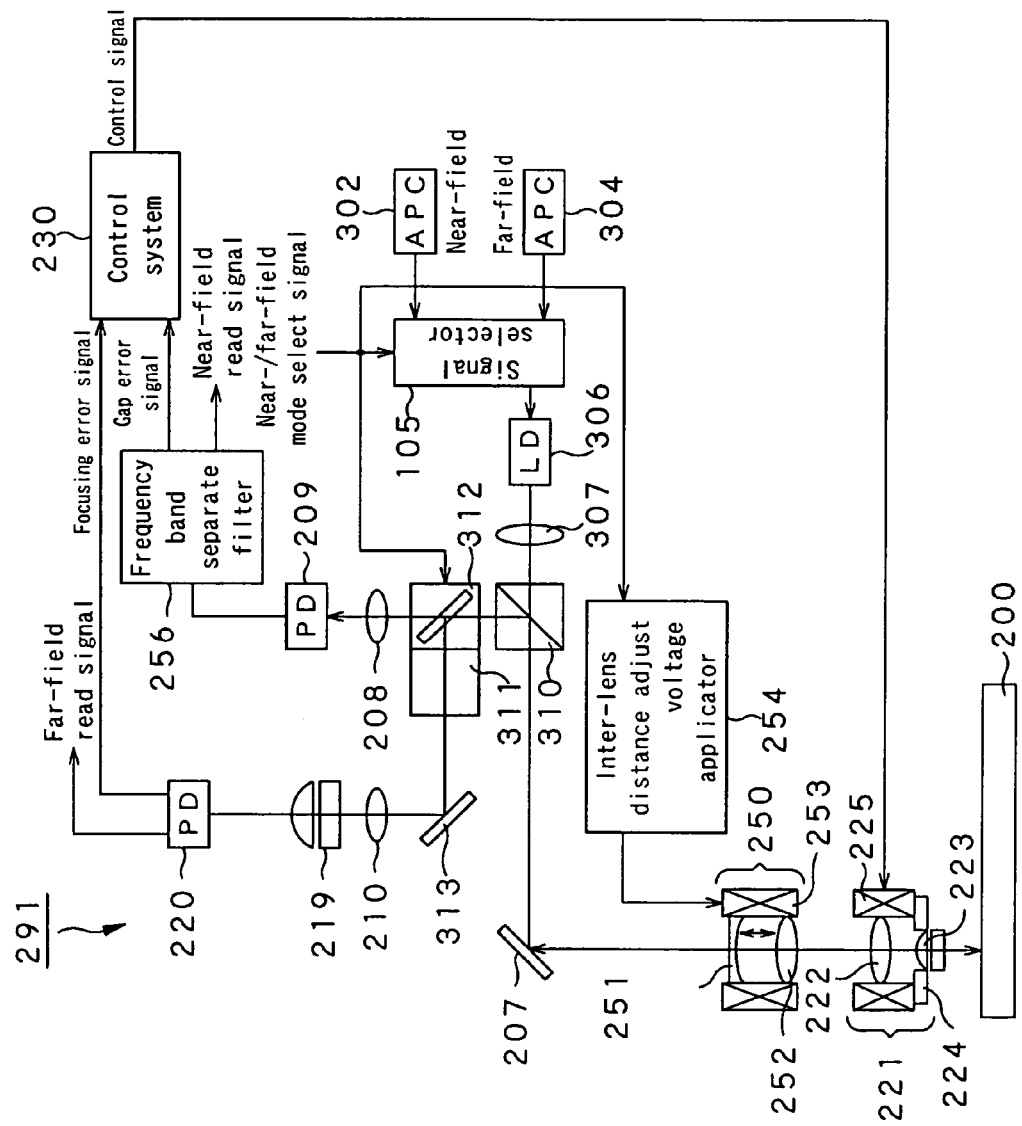
FIG. 48 is a block diagram of an expander included in the information reproducing apparatus.
Figure 49:
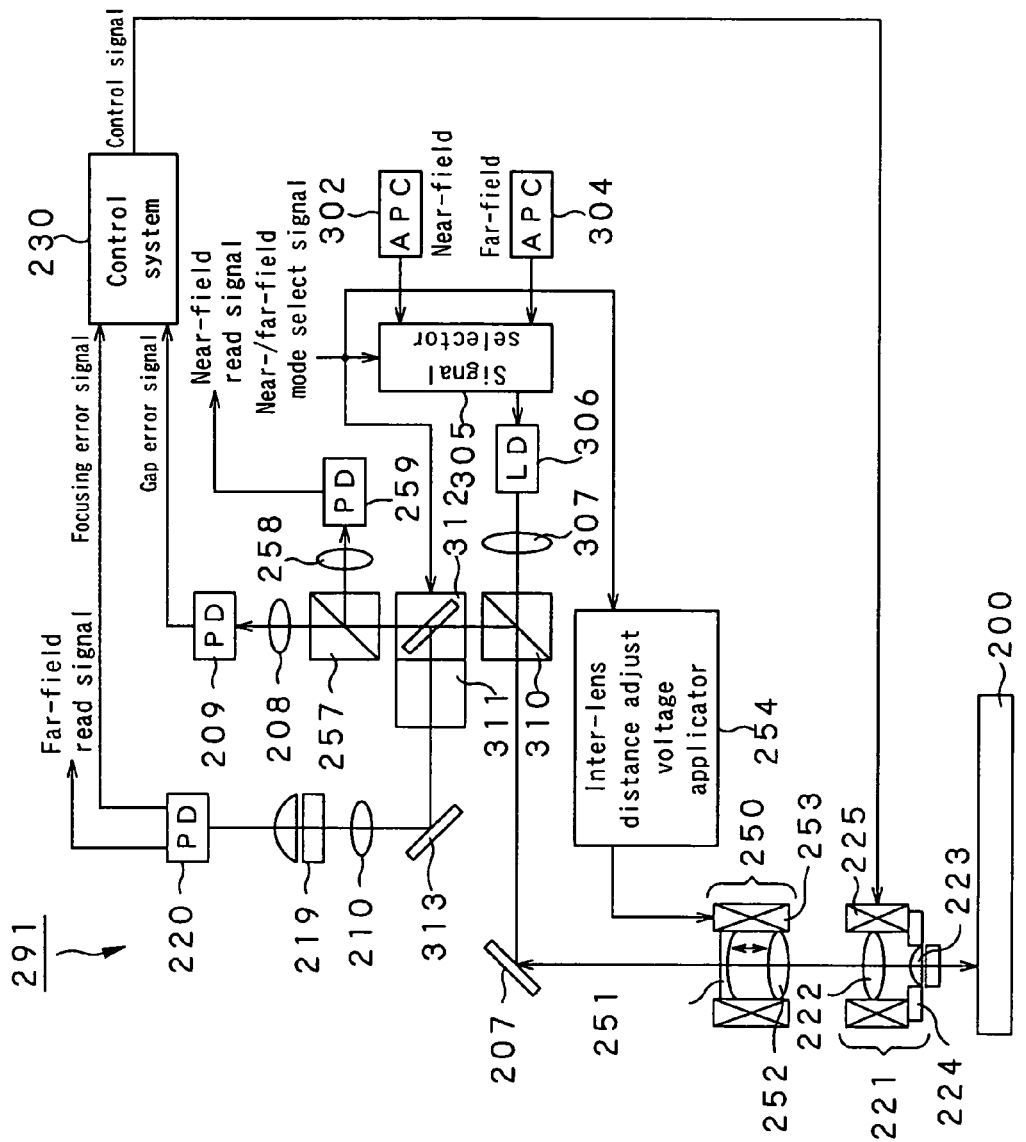
FIG. 49 is a block diagram of a variant of the expander included in the information reproducing apparatus.

FIGS. 48 and 49 show a variant of the information reproducing apparatus 290 shown in FIGS. 46 and 47, in which an expander 250 is interposed between the mirror 207 and optical head 221 in place of the lens block 308 included in the information reproducing apparatus. This variant is generally indicated with a reference numeral 291.

The expander 250 includes a two-group lens formed from a concave lens 251 and collimator lens 252. The distance between the concave lens 251 and collimator lens 252 in the two-group lens is increased or decreased by the actuator 253.

The actuator 253 is put into operation with an adjusting voltage being supplied from an inter-lens distance adjusting voltage applicator 254. Supplied with a select signal for using the near-field reproduction system or far-field reproduction system of the information reproducing apparatus 291, the inter-lens distance adjusting voltage applicator 254 applies an adjusting voltage to the actuator 253.

When the far-field recording system of the information reproducing apparatus 291 is used, correctly adjusting the distance between the lenses in the two-group lens of the expander 250 permits to decrease the diameter of the light beam incident upon the objective lens 222 of the optical head 221 and focus the light beam on the information recording surface of the disk-shaped optical recording medium 200 as shown in FIGS. 34A and 34B.

Figure 50:
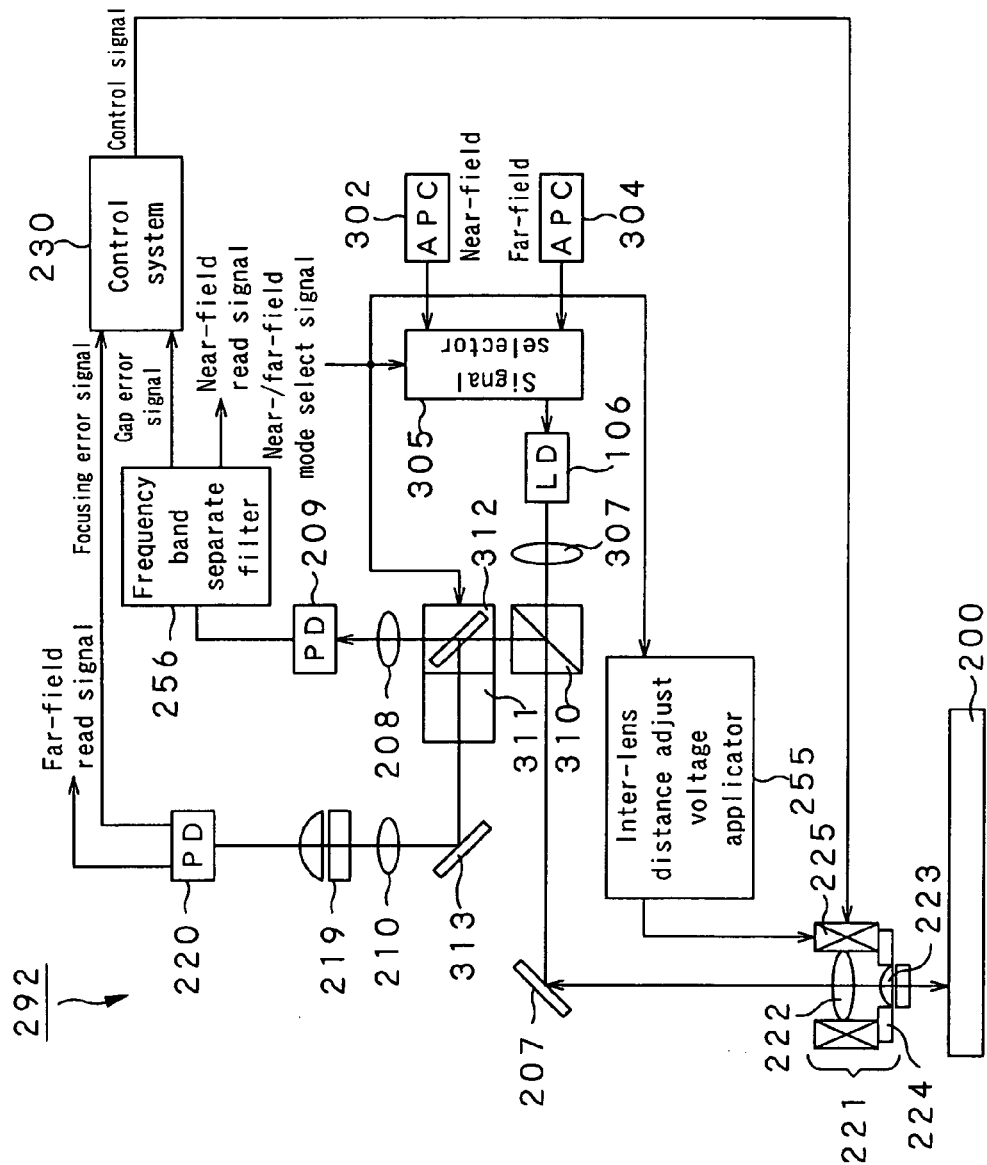
FIG. 50 is a block diagram showing adjustment of inter-lens distance of a two-group lens in the optical head in the information reproducing apparatus.
Figure 51:
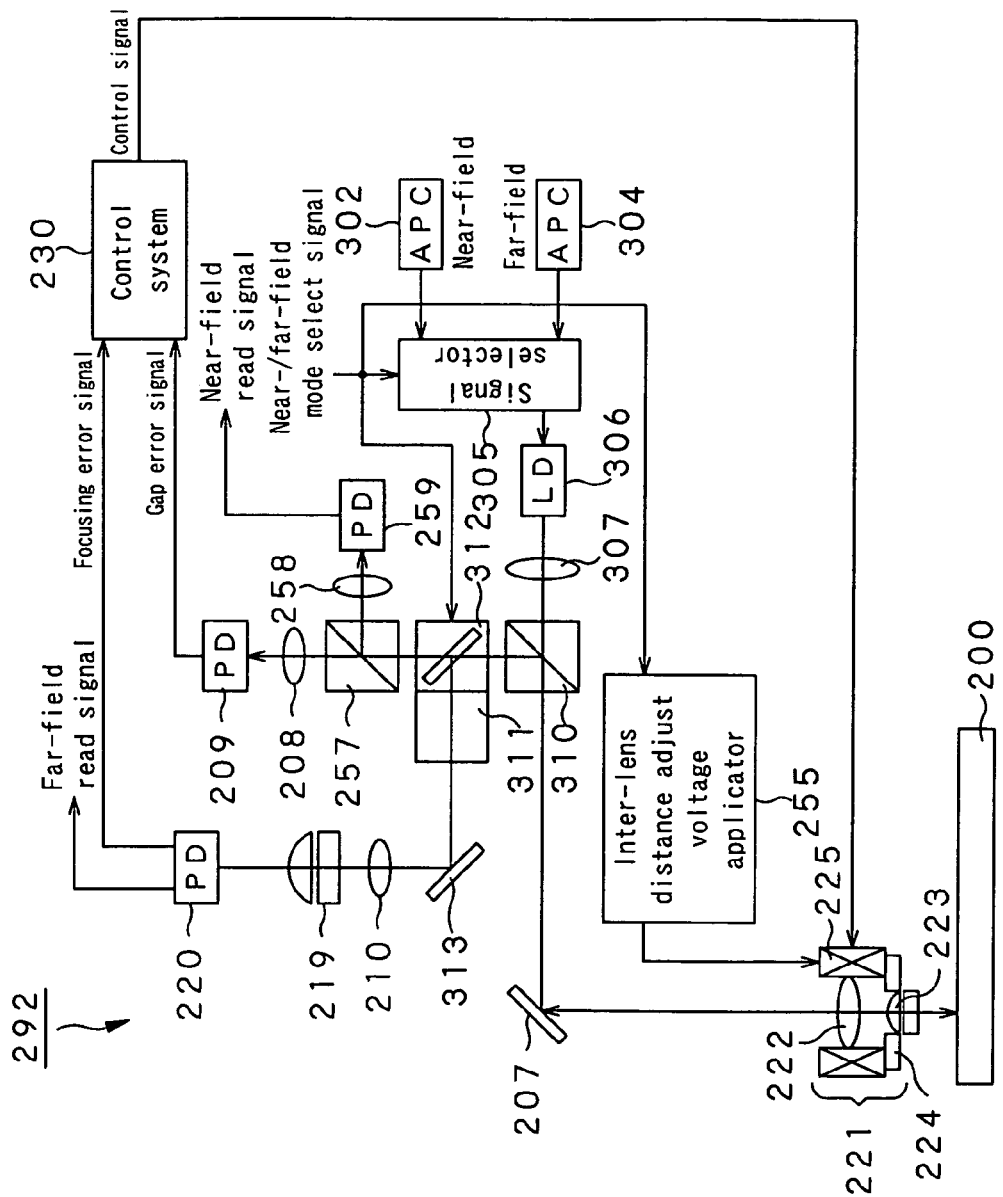
FIG. 51 is a block diagram of another adjustment of inter-lens distance of the two-group lens in the optical head in the information reproducing apparatus.

FIGS. 50 and 51 show a variant of the information reproducing apparatus 290 shown in FIGS. 46 and 47. This variant is generally indicated with a reference numeral 292. It has the same configuration as the information reproducing apparatus 290 except that the optical head 221 additionally includes a mechanism to increase or decrease the distance between the lenses in the two-group lens formed from the objective lens 222 and SIL 223 both included in the optical head 221 and the lens block 308 provided in the information reproducing apparatus 290 is not provided.

For example, when an adjusting voltage is supplied to the actuator 225 from the inter-lens distance adjusting voltage applicator 255, the objective lens 222 moves in relation to the SIL 223 so that the inter-lens distance of the two-group lens will be varied.

Supplied with a select signal for using of either the near- or far-field reproduction system of the information reproducing apparatus 292, the inter-lens distance adjusting voltage applicator 255 applies an adjusting voltage to the actuator 225.

As shown in FIG. 36, on the assumption that the distance between the objective lens 222 and end face of the SIL 223 is h0 when the optical head 221 is used in the near-field reproduction system, when an adjusting voltage which adjusts the distance between the objective lens 222 and end face of the SIL 223 to h1 (h1>h0) is applied to the actuator 225 from the inter-lens distance adjusting voltage applicator 255 when the optical head 221 is used in the far-field recording system, the light beam can be focused on the information recording surface of the disk-shaped optical recording medium 200.

Note here that when the gap controller 241 in the control system 230 is going to position the biaxial device such as the optical head 221 to a constant distance within the near field from the information recording surface of the disk-shaped optical recording medium 200, the main controller 244 is required for an extremely large DC gain.

For example, in case the primary resonant frequency of the actuator 225 in the optical head 221 is as high as 200 Hz, the DC gain will actually be limited to 260 dB or so unless an integration filter or the like is provided.

In case a digital servo control system is adopted, the sampling frequency will cause the phase to be rotated faster than in an analog servo control system so that it will be more difficult to assure any sufficient DC gain.

For a DC gain of more than 260 dB, the characteristic of the biaxial device is improved to lower the primary resonant frequency for easier assurance of a sufficient DC gain, an integration filter may be provided to assure a sufficient DC gain, an analog servo control system may be adopted to avoid the phase rotation caused by the digital servo control and make it easier to increase the DC gain while assuring the safety, or a digital servo control system is built in which a higher sampling frequency is used to rotate the phase in a frequency band as high as possible, for example.

Even if any of the above measures is taken, however, changing the characteristic of the biaxial device makes it necessary to review the system design, which requires much labor and cost. In case an analog servo control system is adopted, it is likely to adversely affected by a change of the temperature, the number of parts will be larger and the apparatus itself will be larger. An additional integration filter provided, if any, in a digital servo control system will cause a reset windup which will make the system unstable. Also, use of a higher sampling frequency will be limited by the time required for the analog-to-digital conversion and digital-to-analog conversion. For these reasons, no radical solution can be available.

Figure 52:
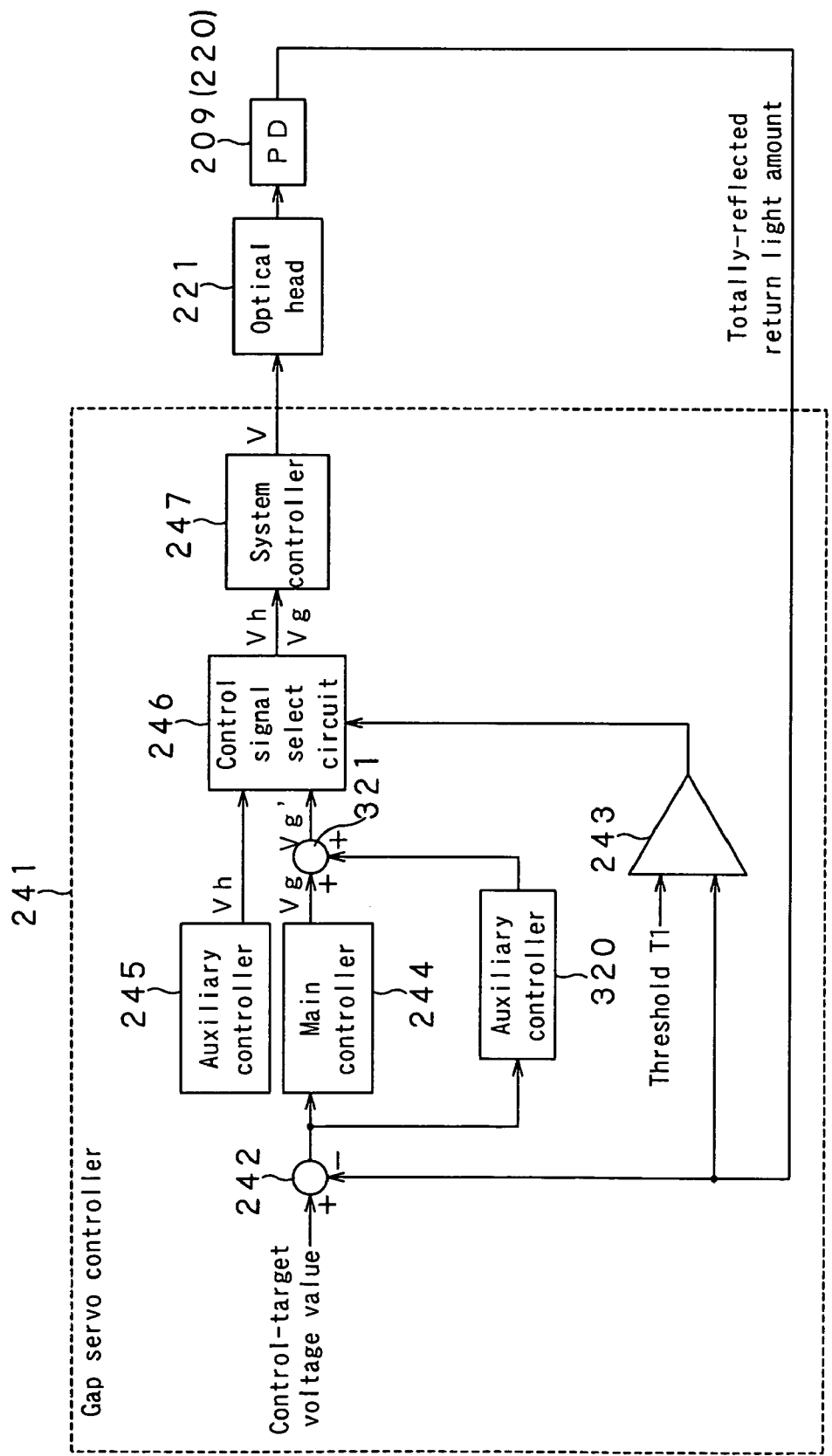
FIG. 52 is a block diagram of a variant of the gap servo controller included in the control system.

On this account, an auxiliary controller 320 may be connected in parallel to the main controller 244 included in the gap servo controller 241 of the control system 230 as shown in FIG. 52 in order to assure a larger DC gain.

The auxiliary controller 320 is supplied with a deviation between a control-target voltage value calculated by the adder 242 and a voltage value equivalent to the totally-reflected return light amount. The auxiliary controller 320 processes the deviation as predetermined, and supplies the result to the adder 321.

Figure 53:
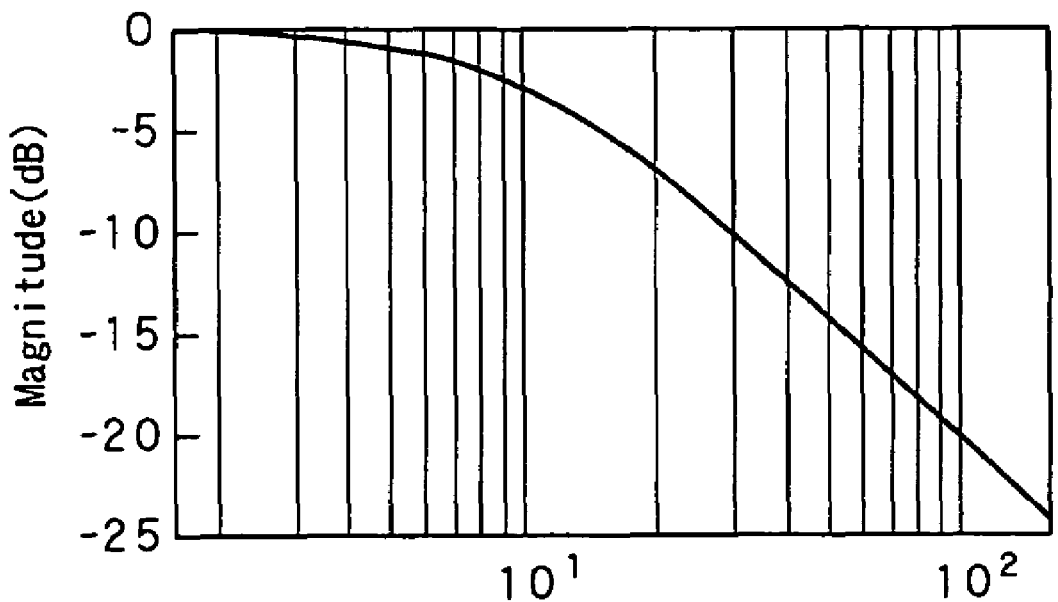
FIG. 53 shows the frequency curve of an auxiliary controller connected in parallel to a main controller included in a gap servo controller.
Figure 53:
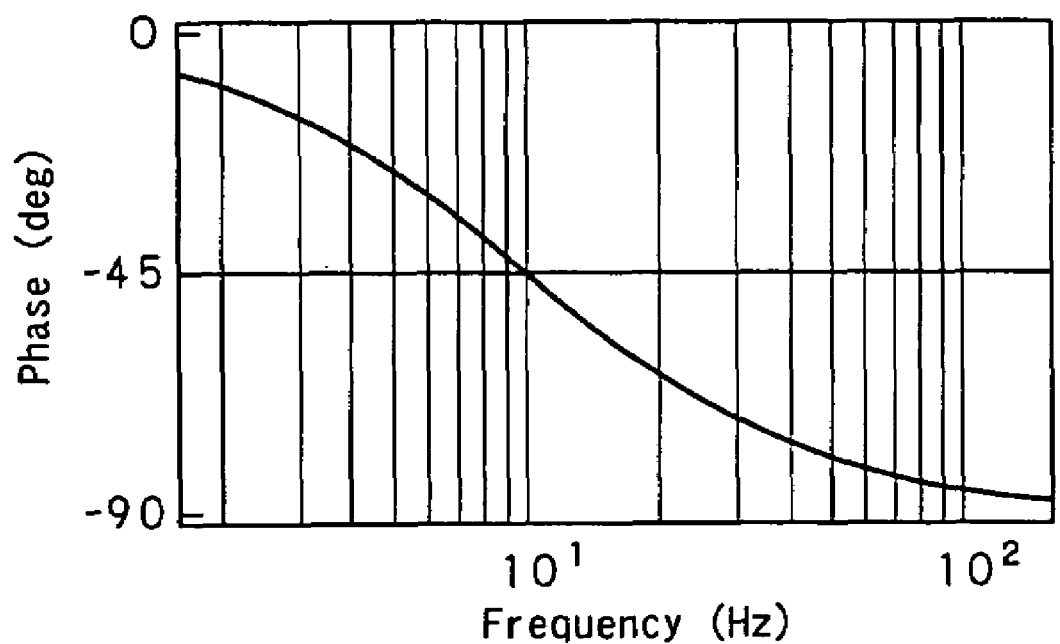

The auxiliary controller 320 is an LPF (cut-off frequency fc of 10 Hz) having a frequency characteristic as shown in FIG. 53, for example. The auxiliary controller 320 removes a high frequency-band component from the deviation supplied from the adder 242, and supplies the result to the adder 321.

Figure 54A:
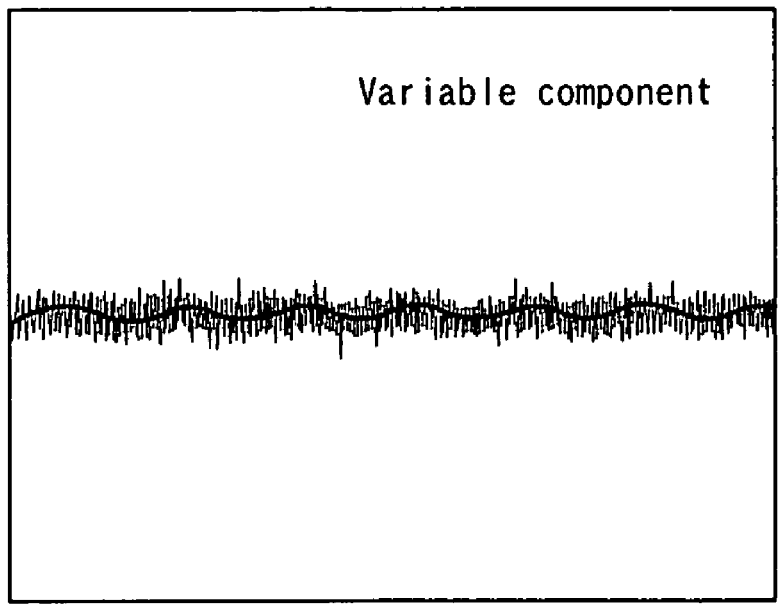
FIG. 54A shows the control voltage in case only the main controller is used.
Figure 54B:
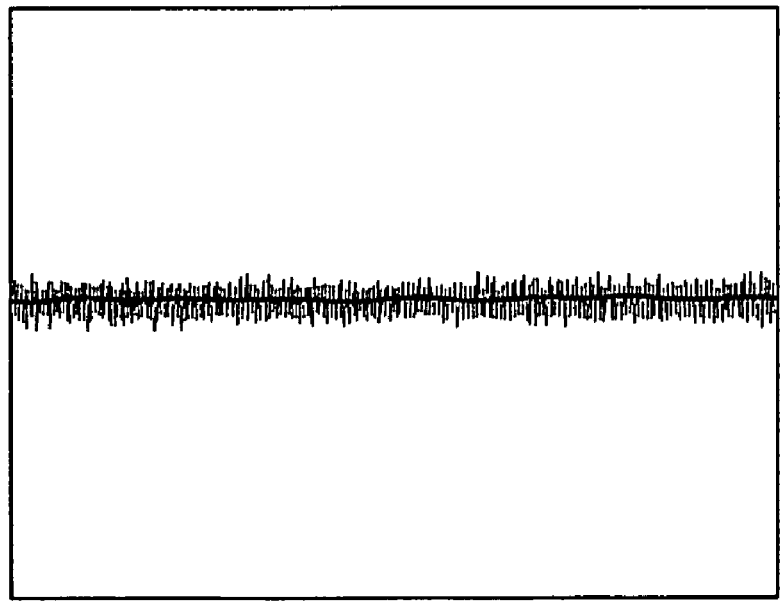
FIG. 54B shows the control voltage in case the auxiliary controller is connected in parallel to the main controller.

A control voltage is generated by the gap servo controller 241 having only the main controller 244 connected thereto as shown in FIG. 54A, and a control voltage is generated by the gap servo controller 241 having the auxiliary controller 320 connected thereto as shown in FIG. 54B.

In case the gap servo controller 242 has only the main controller 244 connected thereto, it will be seen from FIG. 54A that the control voltage contains many variable components based on a residual error. Also, it will be seen from FIG. 54B that in case the gap servo controller 242 has the auxiliary controller 320 connected thereto, no variable components exist and there is no influence of the residual error.

The adder 321 adds a value supplied from the auxiliary controller 320 to the control voltage supplied from the main controller 244 to generate a new control voltage.

Figure 55:
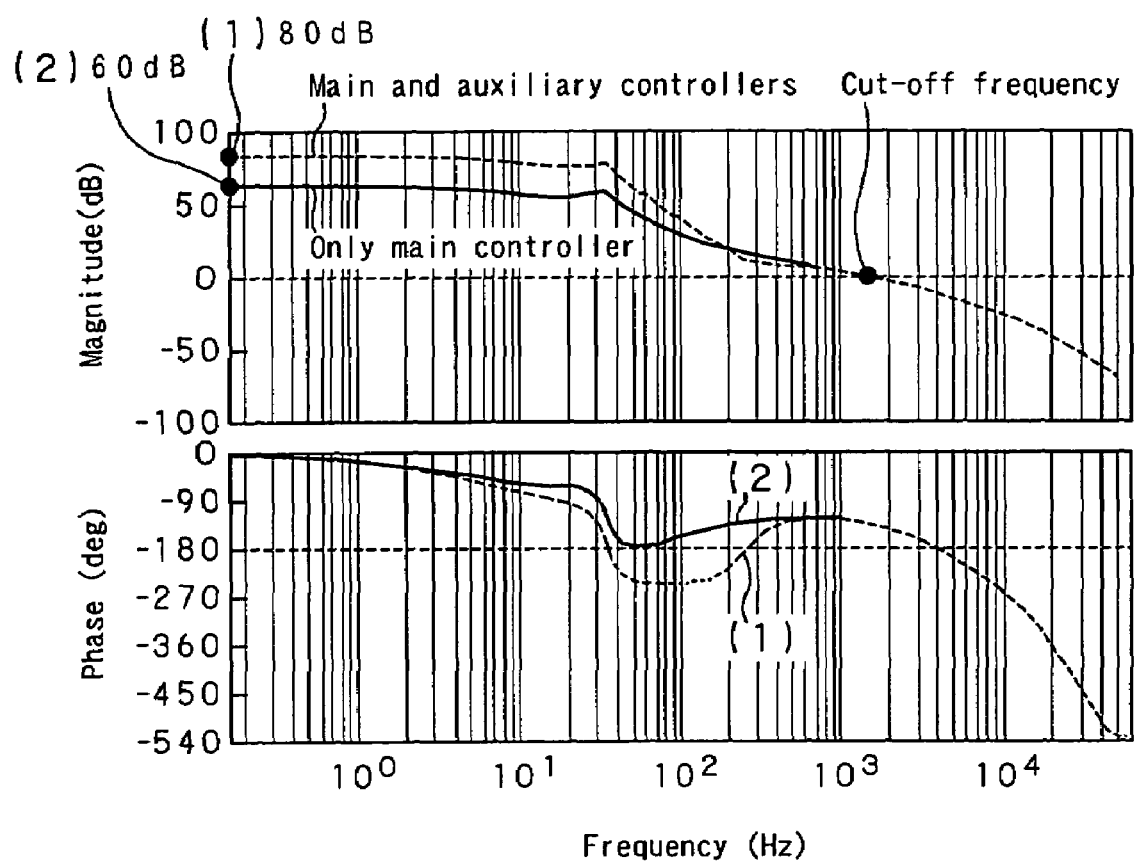
FIG. 55 shows the frequency curve in case the auxiliary controller is connected in parallel to the main controller.

FIG. 55 shows a frequency curve of the gap servo controller 241 having the auxiliary controller 320 connected thereto in parallel to the main controller 244 with the SIL being in the near field, and a frequency curve of the gap servo controller 241 having only the main controller 244 connected thereto.

In case the auxiliary controller 320 is connected to the gap servo controller 241 in parallel to the main controller 244 as shown in FIG. 55 (illustrated at (1)), the DC gain is 80 dB which is 20 dB higher than the DC gain (60 dB) attained when only the main controller 244 is connected to the gap servo controller 241 as shown in FIG. 55 (illustrated at (2)).

Also, in any case, the cutoff frequency is about 1.7 kHz which is negligible. Thus, it will be seen that the response to the control is not worse but stable.

In the gap servo controller 241 having the auxiliary controller 320 connected thereto, the phase is rotated 180 deg. with a cut-off frequency of about 35 Hz to 250 Hz and the DC gain at this time is larger than 0 dB. However, this range of frequency is a conditional, unstable range because the frequency is lower than the cut-off frequency of about 1.7 kHz, it is considered to be stable as a closed loop transfer function.

Note that in the information recorders and information reproducing apparatuses having been described in the foregoing, the beam splitters, collimator lenses may appropriately be located in any other positions, respectively.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

As having been described in the foregoing, according to the present invention, the axial runout of the optical recording medium is inhibited by the first controlling means before a feedback control is made by the second controlling means to keep constant in the near field the distance between the information recording surface of the optical recording medium and near-field light emitter. So, appropriate DC gains can be assured for the respective controlling means. Therefore, it is possible to prevent quality of information reproduction from being deteriorated by any insufficient DC gain and any error crucial to recording or reproduction of information with near-field light, such as a breakdown of the near-field state.

Also, by inhibiting the axial runout of the optical recording medium by means of the first controlling means, it is possible to record or read information to or from the optical recording medium with keeping the optical recording medium removable.

Further, according to the present invention, the gap servo control is started after the rotation control system for the disk-shaped optical recording medium gets the steady state of operation. So, the gap servo control can be effected positively and stably.

Also, according to the present invention, the first controlling means controls the distance between the information recording surface of the optical recording medium and light-emitting means to be constant in the near field when writing information to the optical recording medium with near-field light, and the second controlling means controls that distance constantly to a distance beyond the near field when writing information to the optical recording medium with any other than the near-field light. So, with a simple configuration of the information recorder in which only one light-emitting means is used, it is possible to correctly record predetermined information to the optical recording medium by appropriately selecting either the system to record the information to the information recording medium with the use of the near-field light or the system to record the information by focusing the light beam on the information recording surface.

Also, according to the present invention, the first controlling means controls the distance between the information recording surface of the optical recording medium and light-emitting means to be constant in the near field during reading of information from the optical recording medium with near-field light, and the second controlling means controls that distance constantly to a distance beyond the near field during reading of information from the optical recording medium with any other than the near-field light. So, with a simple configuration of the information reproducing apparatus in which only one light-emitting means is used, it is possible to correctly read predetermined information from the optical recording medium by appropriately selecting either the system to read the information from the information recording medium with the use of the near-field light or the system to read the information by focusing the light beam on the information recording surface.

The invention claimed is:

1. An information recording apparatus comprising:
  a mounting means on which a removable disk-shaped optical recording medium is set in place;
  a rotation driving means for rotating the disk-shaped optical recording medium set on the mounting means at a predetermined velocity;
  a pulse signal generating means for generating N (N is a natural number) pulse signals in a predetermined cycle while the disk-shaped optical recording medium is being rotated one full turn by the rotation driving means;
  a counting means for counting the N pulse signals generated by the pulse generating means;
  a storage means for storing an axial-runout amount detected in a predetermined radial position on the disk-shaped optical recording medium in timing of generation of the pulse signals by the pulse signal generating means in correspondence with the count value in the counting means;
  a light source to emit a light beam of a predetermined wavelength modulated with information to be written to the information recording surface of the disk-shaped optical recording medium;
  a near-field light projecting means for condensing a light beam emitted from the light source and projecting the condensed light beam as near-field light to the information recording surface when it is located in a field near the information recording surface of the disk-shaped optical recording medium;
  a radial-position information detecting means for detecting radial-position information indicative of a radial position on the information recording surface of the disk-shaped optical recording medium being irradiated with the light beam from the near-field light projecting means;
  a gain generating means for generating a predetermined gain corresponding to radial-position information detected by the radial-position information detecting means;
  an axial-runout amount reading means for reading an axial-runout amount stored in the storage means correspondingly to the count of pulse signals counted by the counting means;
  a first controlling means for generating a control signal by multiplying the axial-runout amount read by the axial-runout amount reading means by the predetermined gain generated by the gain generating means to control the near-field light projecting means to follow the axial-runout amount;
  a return-light amount detecting means for detecting a return-light amount of the near-field light projected to the information recording surface; and
  a second controlling means for controlling the near-field light projecting means on the basis of the linear characteristic of the return light amount of the near-field light detected by the return-light amount detecting means to keep a predetermined distance within the near field from the information recording surface.

2. The apparatus according to claim 1, further comprising a third controlling means for controlling, when the return-light amount detected by the return-light amount detecting means is larger than a predetermined threshold, the near-field light projecting means to be located in the field near the information recording surface of the disk-shaped optical recording medium.

3. The apparatus according to claim 1, further comprising:
an optical means for condensing the light beam emitted from the light source and projecting the condensed light beam to the information recording surface of the disk-shaped optical recording medium; and
an axial-runout amount detecting means for detecting an axial-runout amount of the disk-shaped optical recording medium from the return part of the light beam projected from the optical means,
the storage means storing an axial-runout amount in a predetermined radial position on the disk-shaped optical recording medium, detected by the axial-runout amount detecting means in timing of generation of the pulse signal by the pulse signal generating means, in correspondence with the count value in the counting means.

4. The apparatus according to claim 1, wherein:
the storage means stores the axial-runout amount at a radius Rm of the disk-shaped optical recording medium; and
the gain generating means generates a gain at a radius Rn detected by the radial-position information detecting means, as β×(Rn/Rm), from an amplitude β of the largest one of the axial-runout amount at a radius Rm stored in the storage means.

5. The apparatus according to claim 1, wherein the near-field light projecting means includes an SIL (solid immersion lens).

6. The apparatus according to claim 1, where the near-field light projecting means includes an SIM (solid immersion mirror).

7. An information recording controlling method comprising:
a mounting step in which a removable disk-shaped optical recording medium is set in place;
a rotation driving step in which the set disk-shaped optical recording medium is rotated at a predetermined velocity;
a pulse signal generating step in which N (N is a natural number) pulse signals are generated in a predetermined cycle while the disk-shaped optical recording medium is being rotated one full turn in the rotation driving step;
a counting step in which there are counted the N pulse signals generated in the pulse generating step;
a storing step in which an axial-runout amount detected in a predetermined radial position on the disk-shaped optical recording medium in timing of generation of the pulse signals in the pulse signal generating step is stored in correspondence with the count value counted in the counting step;
a near-field light projecting step in which there is condensed a light beam of a predetermined wavelength modulated with information to be written to the information recording surface of the disk-shaped optical recording medium and emitted from a light source and the condensed light beam is projected as near-field light to the information recording surface from a near-field light projecting means located in a field near the information recording surface of the disk-shaped optical recording medium;
a radial-position information detecting step in which there is detected radial-position information indicative of a radial position on the information recording surface of the disk-shaped optical recording medium being irradiated with the light beam from the near-field light projecting means;
a gain generating step in which there is generated a predetermined gain corresponding to radial-position information detected in the radial-position information detecting step;
an axial-runout amount reading step in which an axial-runout amount stored in the storing step is read correspondingly to the count of pulse signals counted in the counting step;
a first controlling step in which a control signal is generated by multiplying the axial-runout amount read in the axial-runout amount reading step by the predetermined gain generated in the gain generating step to control the near-field light projecting means to follow the axial-runout amount;
a return-light amount detecting step in which there is detected a return-light amount of the near-field light projected to the information recording surface; and
a second controlling step in which the near-field light projecting means is controlled based on the linear characteristic of the return light amount of the near-field light detected in the return-light amount detecting step to keep a predetermined distance within the near field from the information recording surface.

* * * * *